(12) United States Patent
Vorbach et al.

(10) Patent No.: US 9,141,390 B2
(45) Date of Patent: Sep. 22, 2015

(54) METHOD OF PROCESSING DATA WITH AN ARRAY OF DATA PROCESSORS ACCORDING TO APPLICATION ID

(71) Applicant: PACT XPP TECHNOLOGIES AG, Munich (DE)

(72) Inventors: Martin Vorbach, Lingenfeld (DE); Volker Baumgarte, Munich (DE); Frank May, Munich (DE); Armin Nuckel, Neupotz (DE)

(73) Assignee: PACT XPP TECHNOLOGIES AG, Munich (DE)

(*) Notice: Subject to any disclaimer, the term of this patent is extended or adjusted under 35 U.S.C. 154(b) by 0 days.

(21) Appl. No.: 14/500,618

(22) Filed: Sep. 29, 2014

(65) Prior Publication Data

US 2015/0026431 A1    Jan. 22, 2015

Related U.S. Application Data

(60) Continuation of application No. 14/318,211, filed on Jun. 27, 2014, which is a continuation-in-part of application No. 14/231,358, filed on Mar. 31, 2014, which is a continuation of application No. 13/043,102, (Continued)

(51) Int. Cl.
| | |
|---|---|
| *G06F 12/02* | (2006.01) |
| *G06F 9/345* | (2006.01) |
| *G06F 13/38* | (2006.01) |
| *G06F 12/08* | (2006.01) |
| *G06F 13/16* | (2006.01) |
| *G06F 13/28* | (2006.01) |
| *G06F 12/06* | (2006.01) |

(52) U.S. Cl.
CPC ............ *G06F 9/345* (2013.01); *G06F 12/0653* (2013.01); *G06F 12/0806* (2013.01); *G06F 12/0848* (2013.01); *G06F 13/1652* (2013.01); *G06F 13/28* (2013.01); *G06F 13/385* (2013.01); *G06F 2212/2532* (2013.01)

(58) Field of Classification Search
CPC .............. G06F 3/0671; G06F 12/0292; G06F 12/0806; G06F 13/1652
USPC .................................................. 711/147, 202
See application file for complete search history.

(56) References Cited

U.S. PATENT DOCUMENTS

| | | | |
|---|---|---|---|
| 347,316 | A | 10/1969 | Wahlstrom et al. |
| 353,166 | A | 9/1970 | Spandorfer et al. |
| 4,020,469 | A | 4/1977 | Manning |
| 4,412,303 | A | 10/1983 | Barnes et al. |

(Continued)

FOREIGN PATENT DOCUMENTS

| | | |
|---|---|---|
| DE | 4416881 A1 | 11/1994 |
| WO | WO9525306 | 9/1995 |
| WO | WO9528671 | 10/1995 |

OTHER PUBLICATIONS

New, Bernie, "Ultra-Fast Synchronous Counters", Xilinx Application Note, XAPP 014.001 (1994).

(Continued)

*Primary Examiner* — Than Nguyen
(74) *Attorney, Agent, or Firm* — Edward P. Heller, III

(57) ABSTRACT

A method wherein a plurality of data processors are associated with application IDs whereby the array processes a plurality of applications in parallel.

10 Claims, 32 Drawing Sheets

Related U.S. Application Data filed on Mar. 8, 2011, now abandoned, which is a division of application No. 12/944,068, filed on Nov. 11, 2010, now Pat. No. 9,037,807, which is a division of application No. 12/496,012, filed on Jul. 1, 2009, now abandoned, which is a continuation of application No. 10/471,061, filed as application No. PCT/EP02/02398 on Mar. 5, 2002, now Pat. No. 7,581,076, said application No. 14/318,211 is a continuation-in-part of application No. 12/389,116, filed on Feb. 19, 2009, which is a continuation of application No. 10/469,910, filed as application No. PCT/EP02/02403 on Mar. 5, 2002, now abandoned, which is a continuation-in-part of application No. 09/967,847, filed on Sep. 28, 2001, now Pat. No. 7,210,129.

(60) Provisional application No. 60/317,876, filed on Sep. 7, 2001.

(56) References Cited

U.S. PATENT DOCUMENTS

| | | | |
|---|---|---|---|
| 4,454,578 A | 6/1984 | Matsumoto et al. | |
| 4,577,293 A | 3/1986 | Matick et al. | |
| 4,642,487 A | 2/1987 | Carter | |
| 4,700,187 A | 10/1987 | Furtek | |
| 4,706,216 A | 11/1987 | Carter | |
| 4,722,084 A | 1/1988 | Morton | |
| 4,724,307 A | 2/1988 | Dutton et al. | |
| 4,748,580 A | 5/1988 | Ashton et al. | |
| 4,758,985 A | 7/1988 | Carter | |
| 4,768,196 A | 8/1988 | Jou et al. | |
| 4,786,904 A | 11/1988 | Graham, III et al. | |
| 4,791,603 A | 12/1988 | Henry | |
| 4,837,735 A | 6/1989 | Allen, Jr. et al. | |
| 4,862,407 A | 8/1989 | Fette et al. | |
| 4,918,440 A | 4/1990 | Furtek | |
| 4,959,781 A | 9/1990 | Rubinstein et al. | |
| 5,036,473 A | 7/1991 | Butts et al. | |
| 5,055,997 A | 10/1991 | Sluijter et al. | |
| 5,070,475 A | 12/1991 | Normoyle et al. | |
| 5,081,575 A | 1/1992 | Hiller et al. | |
| 5,103,311 A | 4/1992 | Sluijter et al. | |
| 5,113,498 A | 5/1992 | Evan et al. | |
| 5,119,499 A | 6/1992 | Tonomura et al. | |
| 5,123,109 A | 6/1992 | Hillis | |
| 5,144,166 A | 9/1992 | Camarota et al. | |
| 5,212,777 A | 5/1993 | Gove et al. | |
| 5,243,238 A | 9/1993 | Kean | |
| 5,245,227 A | 9/1993 | Furtek et al. | |
| RE34,444 E | 11/1993 | Kaplinsky | |
| 5,261,113 A | 11/1993 | Jouppi | |
| 5,287,511 A | 2/1994 | Robinson et al. | |
| 5,296,759 A | 3/1994 | Sutherland et al. | |
| 5,298,805 A | 3/1994 | Garverick et al. | |
| 5,336,950 A | 8/1994 | Popli et al. | |
| 5,355,508 A | 10/1994 | Kan | |
| 5,357,152 A | 10/1994 | Jennings, III et al. | |
| 5,361,373 A | 11/1994 | Gilson | |
| 5,386,154 A | 1/1995 | Goetting et al. | |
| 5,386,518 A | 1/1995 | Reagle et al. | |
| 5,394,030 A | 2/1995 | Jennings, III et al. | |
| 5,408,129 A | 4/1995 | Farmwald et al. | |
| 5,410,723 A | 4/1995 | Schmidt et al. | |
| 5,412,795 A | 5/1995 | Larson | |
| 5,421,019 A | 5/1995 | Holsztynski et al. | |
| 5,426,378 A | 6/1995 | Ong | |
| 5,430,885 A | 7/1995 | Kaneko et al. | |
| 5,440,711 A | 8/1995 | Sugimoto | |
| 5,448,496 A | 9/1995 | Butts et al. | |
| 5,469,003 A | 11/1995 | Kean | |
| 5,488,582 A | 1/1996 | Camarota | |
| 5,500,609 A | 3/1996 | Kean | |
| 5,504,439 A | 4/1996 | Tavana | |
| 5,525,971 A | 6/1996 | Flynn | |
| 5,572,680 A * | 11/1996 | Ikeda et al. | 709/243 |
| 5,574,930 A | 11/1996 | Halverson, Jr. et al. | |
| 5,581,778 A | 12/1996 | Chin et al. | |
| 5,596,743 A | 1/1997 | Bhat et al. | |
| 5,600,597 A | 2/1997 | Kean et al. | |
| 5,608,342 A | 3/1997 | Trimberger | |
| 5,619,720 A | 4/1997 | Garde et al. | |
| 5,625,836 A | 4/1997 | Barker et al. | |
| 5,631,578 A | 5/1997 | Clinton et al. | |
| 5,635,851 A | 6/1997 | Tavana | |
| 5,642,058 A | 6/1997 | Trimberger et al. | |
| 5,646,544 A | 7/1997 | Iadanza | |
| 5,646,546 A | 7/1997 | Bertolet et al. | |
| 5,652,529 A | 7/1997 | Gould et al. | |
| 5,656,950 A | 8/1997 | Duong et al. | |
| 5,659,785 A | 8/1997 | Pechanek et al. | |
| 5,671,432 A | 9/1997 | Bertolet et al. | |
| 5,675,262 A | 10/1997 | Duong et al. | |
| 5,675,777 A | 10/1997 | Glickman | |
| 5,682,491 A | 10/1997 | Pechanek et al. | |
| 5,687,325 A | 11/1997 | Chang | |
| 5,696,976 A | 12/1997 | Nizar et al. | |
| 5,701,091 A | 12/1997 | Kean | |
| 5,705,938 A | 1/1998 | Kean | |
| 5,715,476 A | 2/1998 | Kundu et al. | |
| 5,721,921 A | 2/1998 | Kessler et al. | |
| 5,734,869 A | 3/1998 | Chen | |
| 5,742,180 A | 4/1998 | DeHon et al. | |
| 5,748,979 A | 5/1998 | Trimberger | |
| 5,752,035 A | 5/1998 | Trimberger | |
| 5,761,484 A | 6/1998 | Agarwal et al. | |
| 5,765,009 A | 6/1998 | Ishizaka | |
| 5,774,704 A | 6/1998 | Williams | |
| 5,778,439 A | 7/1998 | Trimberger et al. | |
| 5,781,756 A | 7/1998 | Hung | |
| 5,805,477 A | 9/1998 | Perner | |
| 5,812,844 A | 9/1998 | Jones et al. | |
| 5,815,004 A | 9/1998 | Trimberger et al. | |
| 5,828,858 A | 10/1998 | Athanas et al. | |
| 5,832,288 A | 11/1998 | Wong | |
| 5,857,109 A | 1/1999 | Taylor | |
| 5,892,962 A | 4/1999 | Cloutier | |
| 5,894,565 A | 4/1999 | Furtek et al. | |
| 5,898,602 A | 4/1999 | Rothman et al. | |
| 5,913,925 A | 6/1999 | Kahle et al. | |
| 5,915,123 A | 6/1999 | Mirsky et al. | |
| 5,933,642 A | 8/1999 | Greenbaum et al. | |
| 5,943,242 A | 8/1999 | Vorbach et al. | |
| 5,956,518 A | 9/1999 | DeHon et al. | |
| 5,966,534 A | 10/1999 | Cooke et al. | |
| 5,978,583 A | 11/1999 | Ekanadham et al. | |
| 5,978,830 A | 11/1999 | Nakaya et al. | |
| 5,990,910 A | 11/1999 | Laksono et al. | |
| 6,011,407 A | 1/2000 | New | |
| 6,023,564 A | 2/2000 | Trimberger | |
| 6,023,742 A | 2/2000 | Ebeling et al. | |
| 6,034,542 A | 3/2000 | Ridgeway | |
| 6,049,859 A | 4/2000 | Gliese et al. | |
| 6,052,773 A | 4/2000 | DeHon et al. | |
| 6,058,465 A | 5/2000 | Nguyen | |
| 6,075,935 A | 6/2000 | Ussery et al. | |
| 6,076,157 A | 6/2000 | Borkenhagen et al. | |
| 6,077,315 A | 6/2000 | Greenbaum et al. | |
| 6,096,091 A | 8/2000 | Hartmann | |
| 6,104,696 A | 8/2000 | Kadambi et al. | |
| 6,122,720 A | 9/2000 | Cliff | |
| 6,124,868 A | 9/2000 | Asaro et al. | |
| 6,128,720 A | 10/2000 | Pechanek et al. | |
| 6,145,072 A | 11/2000 | Shams et al. | |
| 6,148,407 A | 11/2000 | Aucsmith | |
| 6,178,494 B1 | 1/2001 | Casselman | |
| 6,209,020 B1 * | 3/2001 | Angle et al. | 718/108 |
| 6,215,326 B1 | 4/2001 | Jefferson et al. | |
| 6,216,174 B1 | 4/2001 | Scott et al. | |
| 6,219,833 B1 | 4/2001 | Solomon et al. | |
| 6,226,717 B1 * | 5/2001 | Reuter et al. | 711/147 |
| 6,237,059 B1 * | 5/2001 | Dean et al. | 711/100 |
| 6,247,036 B1 | 6/2001 | Landers et al. | |

(56) References Cited

U.S. PATENT DOCUMENTS

| | | |
|---|---|---|
| 6,289,369 B1 | 9/2001 | Sundaresan |
| 6,308,191 B1 | 10/2001 | Dujardin et al. |
| 6,321,296 B1 | 11/2001 | Pescatore |
| 6,321,298 B1 | 11/2001 | Hubis |
| 6,374,286 B1 | 4/2002 | Gee et al. |
| 6,405,185 B1 | 6/2002 | Pechanek et al. |
| 6,421,757 B1 | 7/2002 | Wang et al. |
| 6,425,068 B1 | 7/2002 | Vorbach et al. |
| 6,501,999 B1 | 12/2002 | Cai |
| 6,526,430 B1 | 2/2003 | Hung et al. |
| 6,526,461 B1 | 2/2003 | Cliff |
| 6,538,470 B1 | 3/2003 | Langhammer et al. |
| 6,539,438 B1 | 3/2003 | Ledzius et al. |
| 6,587,939 B1 | 7/2003 | Takano |
| 6,633,181 B1 | 10/2003 | Rupp |
| 6,658,564 B1 | 12/2003 | Smith et al. |
| 6,665,758 B1 | 12/2003 | Frazier et al. |
| 6,708,325 B2 | 3/2004 | Cooke et al. |
| 6,757,892 B1 | 6/2004 | Gokhale et al. |
| 6,795,939 B2 | 9/2004 | Harris et al. |
| 6,799,265 B1 | 9/2004 | Dakhil |
| 6,865,662 B2 | 3/2005 | Wang |
| 6,871,341 B1 | 3/2005 | Shyr |
| 6,925,641 B1 | 8/2005 | Elabd |
| 7,000,161 B1 | 2/2006 | Allen et al. |
| 7,188,234 B2 | 3/2007 | Wu et al. |
| 7,210,129 B2 | 4/2007 | May et al. |
| 7,266,725 B2 | 9/2007 | Vorbach et al. |
| 7,340,596 B1 | 3/2008 | Crosland et al. |
| 7,581,076 B2 | 8/2009 | Vorbach |
| 7,928,763 B2 | 4/2011 | Vorbach |
| 8,156,284 B2 | 4/2012 | Vorbach et al. |
| 2001/0003834 A1 | 6/2001 | Shimonishi |
| 2001/0032305 A1 | 10/2001 | Barry |
| 2002/0004916 A1 | 1/2002 | Marchand et al. |
| 2002/0010840 A1 | 1/2002 | Barroso et al. |
| 2002/0145545 A1 | 10/2002 | Brown |
| 2003/0014743 A1 | 1/2003 | Cooke et al. |
| 2003/0033514 A1 | 2/2003 | Appleby-Allis et al. |
| 2003/0046530 A1 | 3/2003 | Poznanovic |
| 2003/0101307 A1 | 5/2003 | Gemelli et al. |
| 2003/0120904 A1 | 6/2003 | Sudharsanan et al. |
| 2005/0080994 A1 | 4/2005 | Cohen et al. |
| 2006/0095716 A1 | 5/2006 | Ramesh |
| 2006/0259744 A1 | 11/2006 | Matthes |
| 2007/0043965 A1 | 2/2007 | Mandelblat et al. |
| 2007/0143577 A1 | 6/2007 | Smith |
| 2007/0143578 A1 | 6/2007 | Horton et al. |
| 2010/0153654 A1 | 6/2010 | Vorbach et al. |
| 2011/0060942 A1 | 3/2011 | Vorbach |
| 2011/0145547 A1 | 6/2011 | Vorbach |
| 2012/0017066 A1 | 1/2012 | Vorbach et al. |
| 2014/0297914 A1 | 10/2014 | Vorbach |
| 2014/0297948 A1 | 10/2014 | Vorbach et al. |

OTHER PUBLICATIONS

Bolotski, Michael, DeHon, André, and Knight, Thomas, "Unifying FPGAs and SIMD Arrays", 2nd International Workshop on Field-Programmable Gate Arrays, Feb. 13-15, 1994.

Knapp, Steven K., "Using Programmable Logic to Accelerate DSP Functions", Xilinx, Inc. (1995).

New, Bernie, "Using the Dedicated Carry Logic in XC4000", Xilinx Application Note, XAPP 013.001 (1994).

Iwanczuk, Roman, "Using the XC4000 RAM Capability", Xilinx Application Note, XAPP 031.000 (1994).

"IEEE Workshop on FPGAs for Custom Computing Machines", IEEE Computer Society Technical Committee on Computer Architecture, Apr. 10-13, 1994.

Nobuyuki Yamashita, et.al., "A 3.84 GIPS Integrated Memory Array Processor with 64 Processing Elements and a 2-Mb SRAM", IEEE Journal of Solid-State Circuits, vol. 29, Nov. 1994.

Achour, C., "A Multiprocessor Implementation of a Wavelet Transforms", Proceedings on the 4th Canadian Workshop on Field-Programmable Devices, May 13-14, 1996.

Electronic Engineering Times, "Altera ships 100,000-gate EPLD", Electronic Engineering Times, Issue 917, Sep. 2-20, 1996.

Altera Corporation, "Embedded Programmable Logic Family Data Sheet", Altera Corporation, Jul. 1995, ver. 1.

Altera Corporation, "FLEX 10K 100, 000-Gate Embedded Array Programmable Logic Family", Altera Advantage News & Views, Newsletter for Altera Customers, Second Quarter, May 1995.

Altera Corporation, "Implementing Multipliers in FLEX 10K Devices", Altera Corporation, Mar. 1996, ver. 1, Application Note 53.

Intel 82375EB/82375SB PCI-EISA Bridge (PCEB) Advance Information, Xilinx Application Note, XAPP 063, v. 1.1 (Oct 9, 1996).

Proceedings of the Parallel Systems Fair, The International Parallel Processing Symposium, IEEE Computer Society Technical Committee for Parallel Processing, Apr. 27, 1994.

Proceedings of the Workshop on Reconfigurable Architectures, 8th International Parallel Processing Symposium, IEEE Computer Society, Apr. 26, 1994.

The Programmable Logic Conference & Exhibit Proceedings, Electronic Engineering Times, Apr. 25-27, 1995.

Britton, Barry K. et al., "Optimized Reconfigurable Cell Array Architecture for High-Performance Field Programmable Gate Arrays", IEEE Custom Integrated Circuits Conference 1993.

Landers, George, "Special Purpose Processor Speeds up DSP Functions, Reconfigurable Arithmetic Datapath Device", Professional Program Proceedings, Electro Apr. 30-May 2, 1996.

Proceedings of the Third Workshop on Reconfigurable Architectures, at Sheraton Waikiki Hotel, Honolulu, Hawai, Apr. 15, 1996.

Proceedings of the Third Workshop on Reconfigurable Architectures, at Sheraton Waikiki Hotel, Honolulu, Hawaii, Apr. 15, 1996.

Atmel Corporation, "Configurable Logic Design and Application Book 1993-1994—PLD, PFGA, Gate Array", 1993.

Atmel Corporation, "Configurable Logic Design and Application Book 1994-1995—PLD, PFGA, Gate Array", 1994.

N. Wirth, "An Extension-Board with an FPGA for Experimental Circuit Design", ETH Zurich, Department Informatik, Jul. 1993.

F. Furtek et al. "Labyrinth: A Homogeneous Computational Medium", IEEE 1990 Custom Integrated Circuits Conference, 1990.

Altera Corporation, "Altera 1998 Data Book", Altera Corporation (Jan. 1998).

Altera Corporation, "FLEX 10K—Embedded Programmable Logic Family", Data Sheet, ver.3.13, Oct. 1998.

Altera Corporation, "Implementing RAM Functions in FLEX 10K Devices", Application Note 52, Ver. 1, Nov. 1995.

Altera Corporation, "Altera 1993 Data Book", Altera Corporation (Aug. 1993).

Altera Corporation, "Altera 1995 Data Book", Altera Corporation (Mar. 1995).

Altera Corporation, "User-Configurable Microprocessor Peripheral EPB1400", Rev. 1.0, 1987.

Altera Corporation, "EPB2001—Card Interface Chip for PS/2 Micro Channel", Data Sheet, Dec. 1989.

Altera Corporation, "FLEX 8000 Handbook", May 1994.

File History of U.S. Appl. No. 08/388,230, filed Dec. 1, 2014.

File History of U.S. Appl. No. 60/010,317, filed Dec. 16, 2014.

File History of U.S. Appl. No. 60/022,131, filed Nov. 10, 2014.

Chan, Pak K., "A Field-Programmable Prototyping Board: XC4000 BORG User's Guide", University of California, Santa Cruz (Apr. 1994).

Hartenstein, Reiner W. et al., "A New FPGA Architecture for Word-Oriented Datapaths", Lecture Notes in Computer Science, vol. 849 (1994).

Knittel, Guntar, "A PCI-Compatible FPGA-Coprocessor for 2D/3D Image Processing", IEEE 1996.

Schue, Rick, "A Simple DRAM Controller for 25/16 MHz i960® CA/CF Microprocessors", Intel Corporation, Application Note AP•704 (Feb. 20, 1995).

Alike, Peter and New, Bernie, "Additional XC3000 Data", Xilinx, Inc., Xilinx Application Note, XAPP024.000 (1994).

Altera Corporation, "Altera 1996 Data Book", Altera Corporation (Jun. 1996).

(56) References Cited

OTHER PUBLICATIONS

Altera Corporation, "Altera Applications Handbook", Altera Corporation (Apr. 1992).
Electronic Engineering, "Altera puts memory into its FLEX PLDs", Electronic Engineering Times, Issue 840, Mar. 20, 1995.
Margolus, Norman, "An FPGA architecture for DRAM-based systolic computations", The 5th Annual IEEE Symposium on Field-Programmable Custom Computing Machines (Apr. 16, 1997).
Krishnamohan, K., "Applying Rambus Technology to Desktop Computer Main Memory Subsystems, Version 1.0", Rambus Inc. (Mar. 1992).
New, Bernie, "Boundary-Scan Emulator for XC3000", Xilinx, Inc. ,Xilinx Application Note, XAPP007.001 (1994).
New, Bernie, "Bus-Structured Serial Input/Output Device", Xilinx Application Note, XAPP010.001 (1994).
Berkeley Design Technology Group, "Buyer's Guide to DSP Processors", Berkeley Design Technology Group (1995).
Algotronix, Ltd., "CHS2x4 User Manual", Algotronix, Ltd. (1991).
Altera Corporation, "ClockLock & ClockBoost Circuitry for High-Density PLDS", The Altera Advantage News & Views, Newsletter for Altera Customers, Third Quarter, Aug. 1996.
Altera Corporation, "Configuring FLEX 10K Devices", Altera Corporation, Dec. 1995, ver. 1, Application Note 59.
Schmidt, Ulrich, and Knut, Cesar, "Datawave: A Single-Chip Multiprocessor for Video Applications", IEEE Micro (1991).
Electronic Design, "Embedded Configurable Memory and Logic Boost FPGA Functionality", Electronic Design, vol. 43, No. 14, Jul. 10, 1995.
Xilinix, Inc., "Fully Compliant PCI Interface in an XC3164A-2 FPGA", Xilinix, Inc. Application Note (Jan. 1995).
Epstein, Dave, "IBM Extends DSP Performance with Mfast", Microprocessor Reports, vol. 9, No. 16 (Dec. 4, 1995).
IEEE, "IEEE Standard Test Access Port and Boundary-Scan Architecture", IEEE Std 1149.1 Approved Feb. 15, 1990.
Alike, Peter and New, Bernie, "Implementing State Machines in LCA Devices", Xilinx, Inc., Xilinx Application Note, XAPP027.001 (1994).
Camilleri, Nick, and Lockhard, Chris, "Improving XC4000 Design Performance", Xilinx Application Note, XAPP043.000 (1994).
Intel Corporation, "Intel 82375EB/82375SB PCI-EISA Bridge (PCEB) Advance Information", Intel Corporation (Mar. 1996).
Wilkie, Bill, "Interfacing XC6200 to Microprocessors (MC68020 Example)", Xilinx Application Note, XAPP 063, v. 1.1 (Oct. 9, 1996).
Wilkie, Bill, "Interfacing XC6200 to Microprocessors (TMS320C50 Example)", Xilinx Application Note, XAPP064 (Oct. 9, 1996).
XCELL, "Introducing the XC6200 FPGA Architecture: The First FPGA Architecture Optimized for Coprocessing in Embedded System Applications", XCELL, Iss. 18, 3d Quarter, 1995.
Altera Corporation, "JTAG Boundary—Scan Testing in Altera Devices", Altera Corporation, Nov. 1995, ver. 3, Application Note 39.
Margolus, Norman, "Large-scale logic-array computation", Boston University Center for Computational Science, SPIE vol. 2914 (May 1996).
Alfke, Peter, "Megabit FIFO in Two Chips: One LCA Device and One DRAM", Xilinx Application Note, XAPP030.000 (1994).
del Corso, D. et al., "Microcomputer Buses and Links", Academic Press (1996).
Bakkes, P.J. and du Plessis, J.J., "Mixed Fixed and Reconfigurable Logic for Array Processing", IEEE (1996).
Altera Corporation, "PCI Bus Applications in Altera Devices", Altera Corporation, Apr. 1995, ver. 1, Application Note 41.
Altera Corporation, "PCI Bus Target Megafunction", Altera Corporation, Solution Brief 6, ver. 1, Nov. 1996.
Altera Corporation, "PCI Compliance of Altera Devices", Altera Corporation, May 1995, ver. 2, Application Brief 140.
SIG, "PCI Local Bus Specification", PCI Special Interest Group, Production Version, Revision 2.1 (Jun. 1, 1995).
Rambus Inc., "Rambus Architectural Overview", Rambus Inc. (1992).
Rambus Inc., "Rambus Product Catalog", Rambus Inc. (1993).
Cartier, Lois, "System Design with New XC4000EX I/O Features", Xilinx Application Note, XAPP056 (Feb. 21, 1996).
Xilinx, Inc., "Technical Data—XC5200 Logic Cell Array Family, Preliminary, v.1.0", Xilinx, Inc., (Apr. 1995).
Xilinx, Inc., "The Programmable Logic Data Book (1993)", Xilinx, Inc.
Xilinx, Inc., "The Programmable Logic Data Book (1994)", Xilinx, Inc.
Xilinx, Inc., "The Programmable Logic Data Book (1996)", Xilinx, Inc. (Jan. 1996).
Churcher, Stephen et al., "The XC6200 FastMap Processor Interface", FPL (Aug. 1995).
Texas Instruments Incorporated, "TMS320C80 (MVP) Parallel Processor User's Guide", Texas Instruments Incorporated (1995).
Texas Instruments Incorporated, "TMS320C8x System-Level Synopsis", Texas Instruments Incorporated (Sep. 1995).
Xilinx, Inc., "XC6200 Field Programmable Gate Arrays, Advance Product Specification, v. 1.0, Jun. 1, 1996", Xilinx, Inc.
Xilinx, Inc., "Xilinx XC6200 Field Programmable Gate Arrays, Product Specification, v.1.10, Apr. 24, 1997", Xilinx, Inc.
Altera Corporation, "Universal Asynchronous Receiver/Transmitter a16450, Sep. 1996, ver. 1", Altera Corporation, ver. 1.
Altera Corporation, "Asynchronous Communications Interface Adapter a6850, Sep. 1996, ver. 1", Altera Corporation, ver. 1.
Schmit, Herman et al., "Behavioral Synthesis for FPGA-based Computing", IEEE (1994).
Allaire, Bill and Knapp, Steve, "A Plug and Play Interface Using Xilinx FPGAs", Xilinx, Inc. (May 1995).
Goslin, Greg and Newgard, Bruce, "16-Tap, 8-Bit FIR Filter Applications Guide", Xilinx Application Note v. 1.01 (Nov. 21, 1994).
Veendrick, H., "A 1.5 GIPS Video Signal Processor (VSP)", IEEE 1994 Custom Integrated Circuits Conference.
Yeung, Alfred K. and Rabaey, Jan M., "A 2.4GOPS Data-Driven Reconfigurable Multiprocessor IC for DSP", IEEE International Solid-State Circuits Conference (1995).
Duncan, Ann, "A 32x16 Reconfigurable Correlator for the XC6200", Xilinx Application Note, XAPP 084, v. 1.0 (Jul. 25, 1997).
Yeung, Kwok Wah, "A Data-Driven Multiprocessor Architecture for High Throughput Digital Signal Processing", U.C. Berkeley (Jul. 10, 1995).
Koren, Israel et al., "A Data-Driven VLSI Array for Arbitrary Algorithms", IEEE (1988).
Xilinx, Inc., "A Fast Constant Coefficient Multiplier", Xilinx, Inc., Xilinx Application Note, XAPP 082, v. 1.0 (Aug. 24, 1997).
Sutton, Roy A. et al., "A Multiprocessor DSP System Using PADDI-2", U.C. Berkeley (1998).
Chen, Dev C. and Rabaey, Jan M., "A Reconfigurable Multiprocessor IC for Rapid Prototyping of Algorithmic-Specific High-speed DSP Data Paths", IEEE Journal of Solid State Circuits (Dec. 1992).
Minnick, Robert, "A Survey of Microcellular Research", J. of the Association for Computing Machinery, vol. 14, No. 2 (Apr. 1967).
Trimberger, Steve et al., "A Time-Multiplexed FPGA", IEEE (1997).
New, Bernie, "Accelerating Loadable Counters in XC4000", Xilinx Application Note, XAPP 023.001 (1994).
Athanas, Peter, "An Adaptive Machine Architecture and Compiler for Dynamic Processor Reconfiguration", Brown University (May 1992).
Atmel Corporation, "Application Note AT6000 Series Configuration", Published in May 1993.
Agarwal, Anant et al., "APRIL: A Processor Architecture for Multiprocessing", IEEE (1990).
Allaire, Bill and Fischer, Bud, "Block Adaptive Filter", Xilinx Application Note, XAPP 055, v. 1.0 (Aug. 15, 1996).
Bittner, Jr., Ray A. et al., "Colt: An Experiment in Wormhole Run-Time Reconfiguration", Proc. of SPIE, vol. 2914 (Oct. 21, 1996).
New, Bernie, "Complex Digital Waveform Generator", Xilinx Application Note, XAPP 008.002 (1994).
Alike, Peter, "Dynamic Reconfiguration", Xilinx Application Note, XAPP 093, v. 1.1 (Nov. 10, 1997).
Canadian Microelectronics Corp, "Field-Programmable Devices", 1994 Canadian Workshop on Field-Programmable Devices, Jun. 13-16, 1994, Kingston, Ontario.

(56) References Cited

OTHER PUBLICATIONS

S. Brown et al., Published by Kluwer Academic Publishers, "Field Programmable Gate Arrays", Atmel Corporation, 1992.
Atmel Corporation, "Field Programmable Gate Arrays, AT6000 Series", Atmel Corporation, 1993.
International Society for Optical Engineering, "Field Programmable Gate Arrays (FPGAs) for Fast Board Development and Reconfigurable Computing", International Society for Optical Engineering, vol. 2607, Oct. 25-26, 1995.
Trimberger, Stephen M., "Field-Programmable Gate Array Technology", Kluwer Academic Publishers (1994).
Hartenstein, Reiner Servit, Michal (Eds.), "Field-Programmable Logic—Architectures, Synthesis and Applications", 4th Intl Workshop on Field-Prgrammable Logic and Applications, FPL '94, Prague, Czech Republic, Sep. 7-9, 1994.
IEEE Computer Society, "FPGAs for Custom Computing Machines", FCCM '93, IEEE Computer Society, Apr. 5-7, 1993.
Cowie, Beth, "High Performance, Low Area, Interpolator Design for the XC6200", Xilinx Application Note, XAPP 081, v. 1.0 (May 7, 1997).
IEEE Computer Society Technical Committee on Computer Architecture, "IEEE Symposium on FPGAs for Custom Computing Machines", IEEE Computer Society Technical Committee on Computer Architecture, Apr. 19-21, 1995.
B. Schoner, C. Jones and J. Villasenor, "Issues in wireless video coding using run-time-reconfigurable FPGAs", Proceedings of the IEEE Symposium on FPGAs for Custom Computing Machines (Apr. 19, 1995).
Moore, Will and Luk, Wayne, "More FPGAs", Abingdon EE&Cs Books (1994).
Fawcett, Bradly K., "New SRAM-Based FPGA Architectures Address New Applications", IEEE (Nov. 1995).
Department of Electrical and Computer Engineering, The University of Toronto, "Proceedings of the 4th Canadian Workshop on Field-Programmable Devices", Proceedings of the 4th Canadian Workshop on Field-Programmable Devices, Department of Electrical and Computer Engineering, The University of Toronto, May 13-14, 1996.
Chen, Devereaux C., "Programmable Arithmetic Devices for High Speed Digital Signal Processing", U.C. Berkeley (1992).
Vasell, Jasper, et al., "The Function Processor: A Data-Driven Processor Array for Irregular Computations", Future Generations Computer Systems, vol. 8, Issue 4 (Sep. 1992).
T. Korpiharju, J. Viitanen, H. Kiminkinen, J. Takala, K. Kaski, "TUTCA configurable logic cell array architecture", IEEE (1991).
Goldberg D: "What Every Computer Scientist Should Know About Floating-Point Arithmetic", ACM Computing Surveys, ACM, New York, NY, US, US, vol. 23, No. 1, Mar. 1, 1991, pp. 5-48.
Hauser et al. "Garp: A MIPS Processor with a Reconfigurable Coprocessor", Apr. 1997, pp. 12-21.
Mirsky E. et al., "MATRIX: A Reconfigurable Computing Architecture with Configurable Instruction Distribution and Deployable Resources", 1996, IEEE, pp. 157-166.
Shirazi et al., "Quantitative analysis of floating point arithmetic on FPGA based custom computing machines," IEEE Symposium on FPGAs for Custom Computing Machines, I EEE Computer Society Press, Apr. 19-21, 1995, pp. 155-162.
Vermeulen et al., Silicon Debug of a Co-Processor Array for Video Applications, 2000, IEEExplore, 0-7695-0786-7/00, pp. 47-52, [retrieved on Feb. 1, 2015], retrieved from URL http://ieeexplore.ieee.org/stamp/stamp.jsp?tp=&arnumber=889558&tag=1>.

* cited by examiner

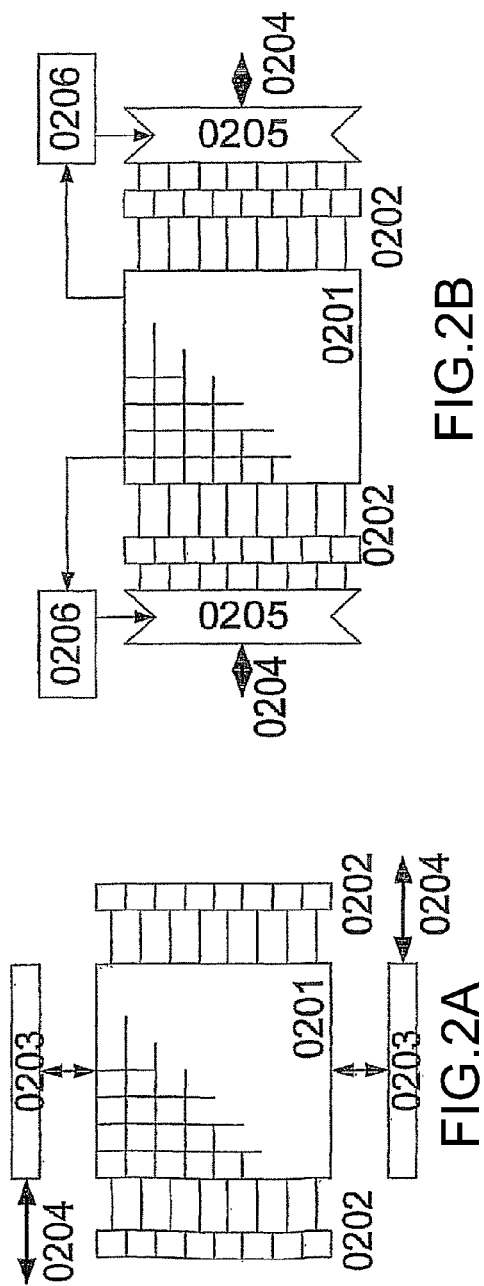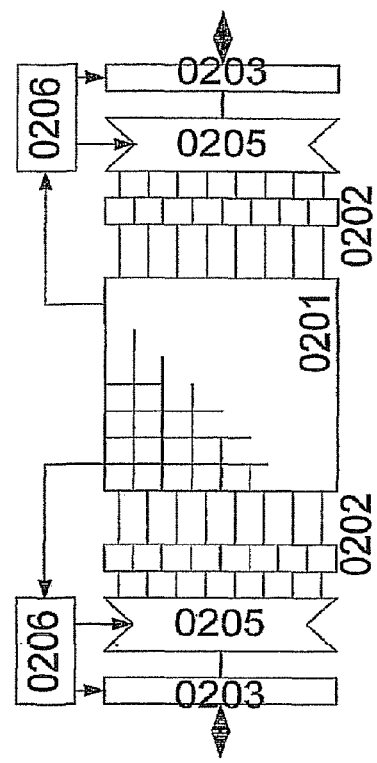

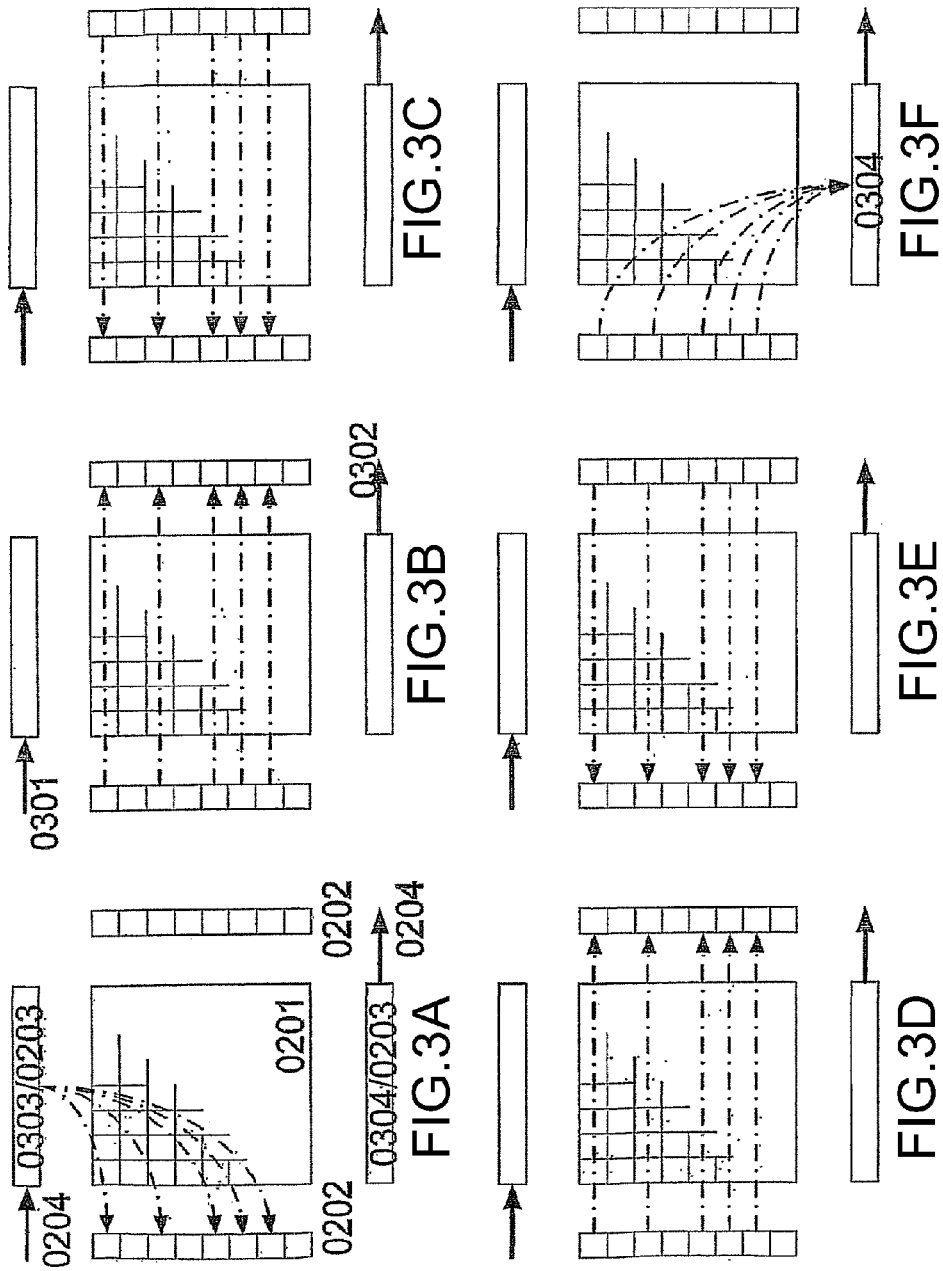

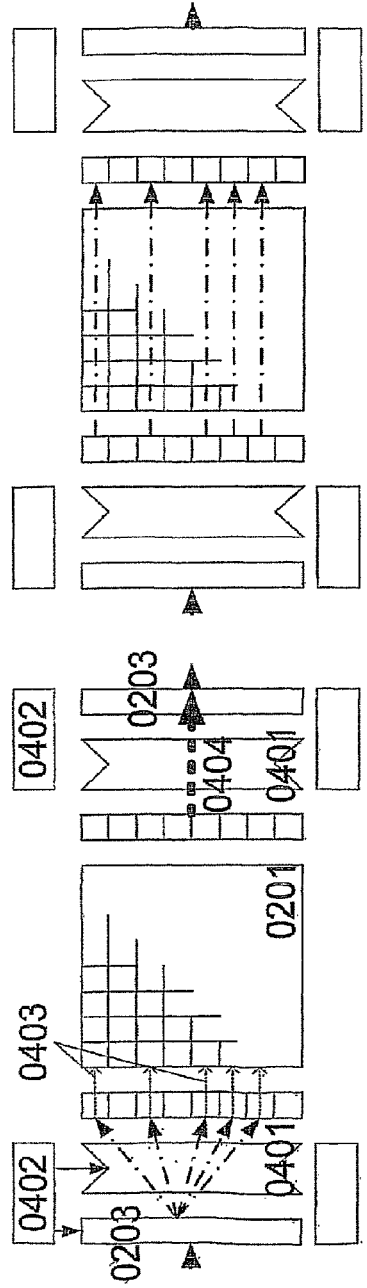
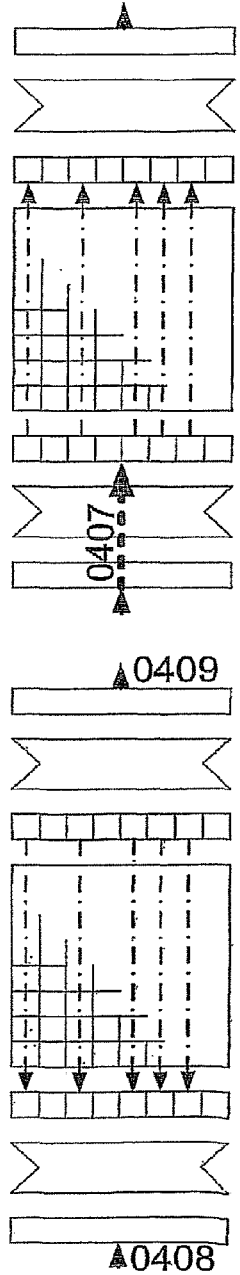
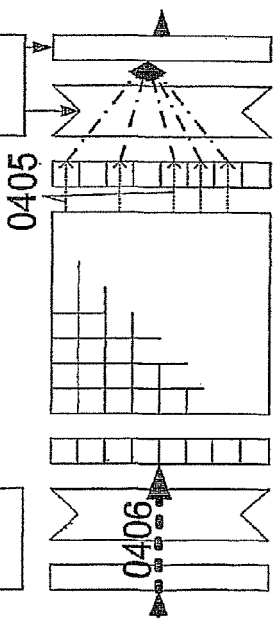
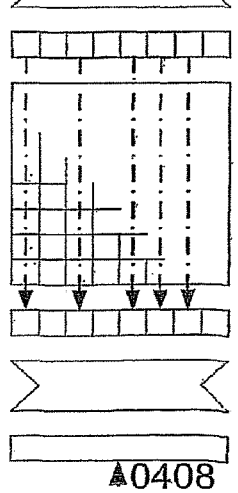

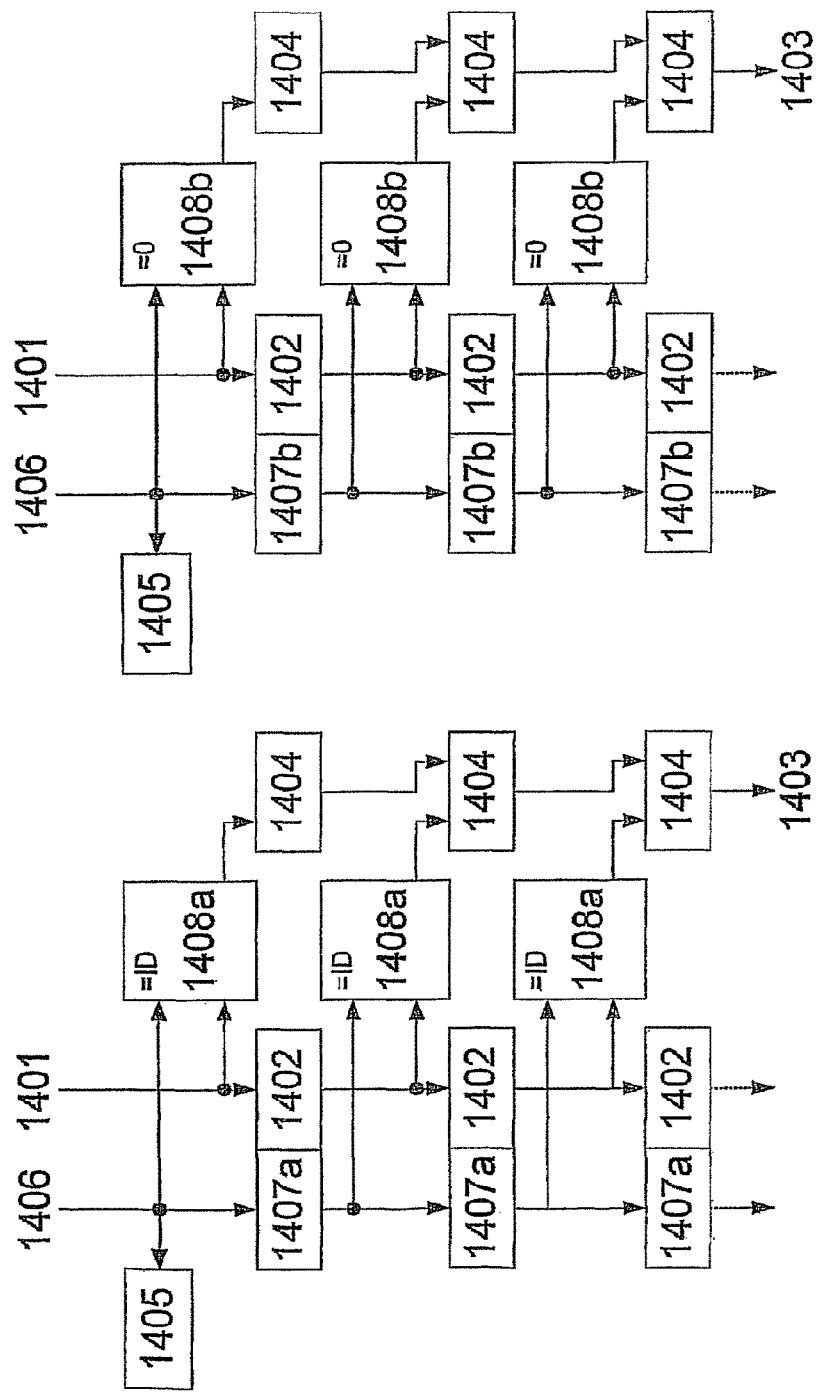

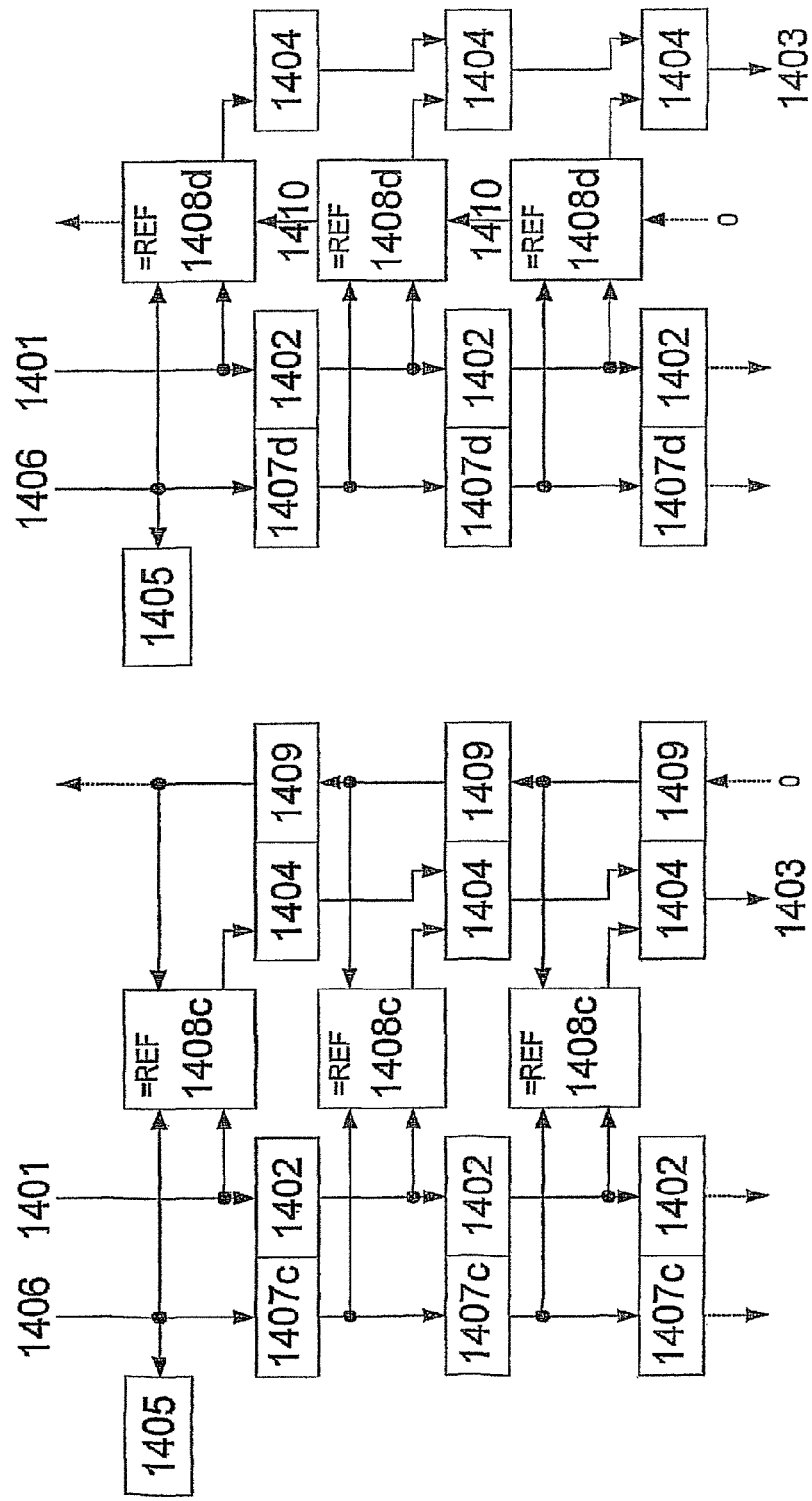

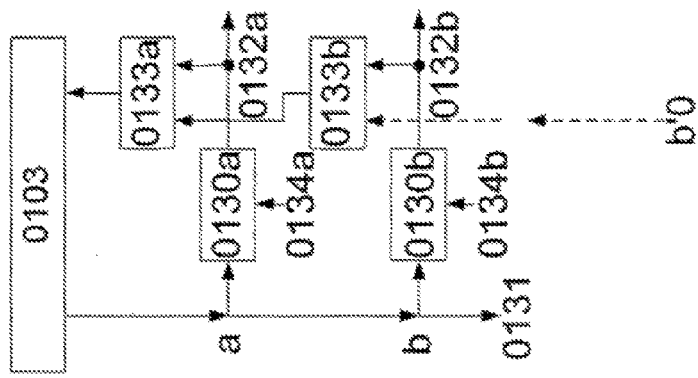
FIG.16D
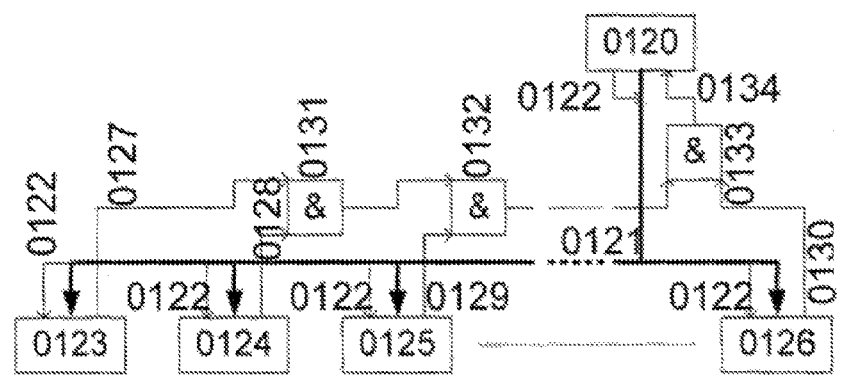
FIG.16C
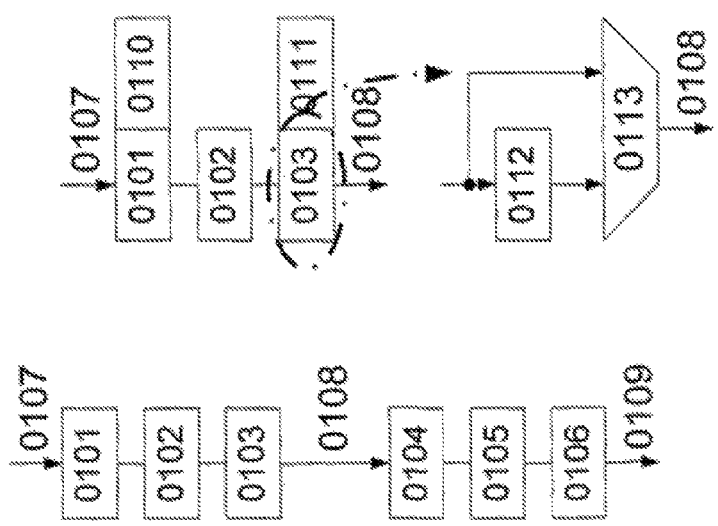
FIG.16B
FIG.16A

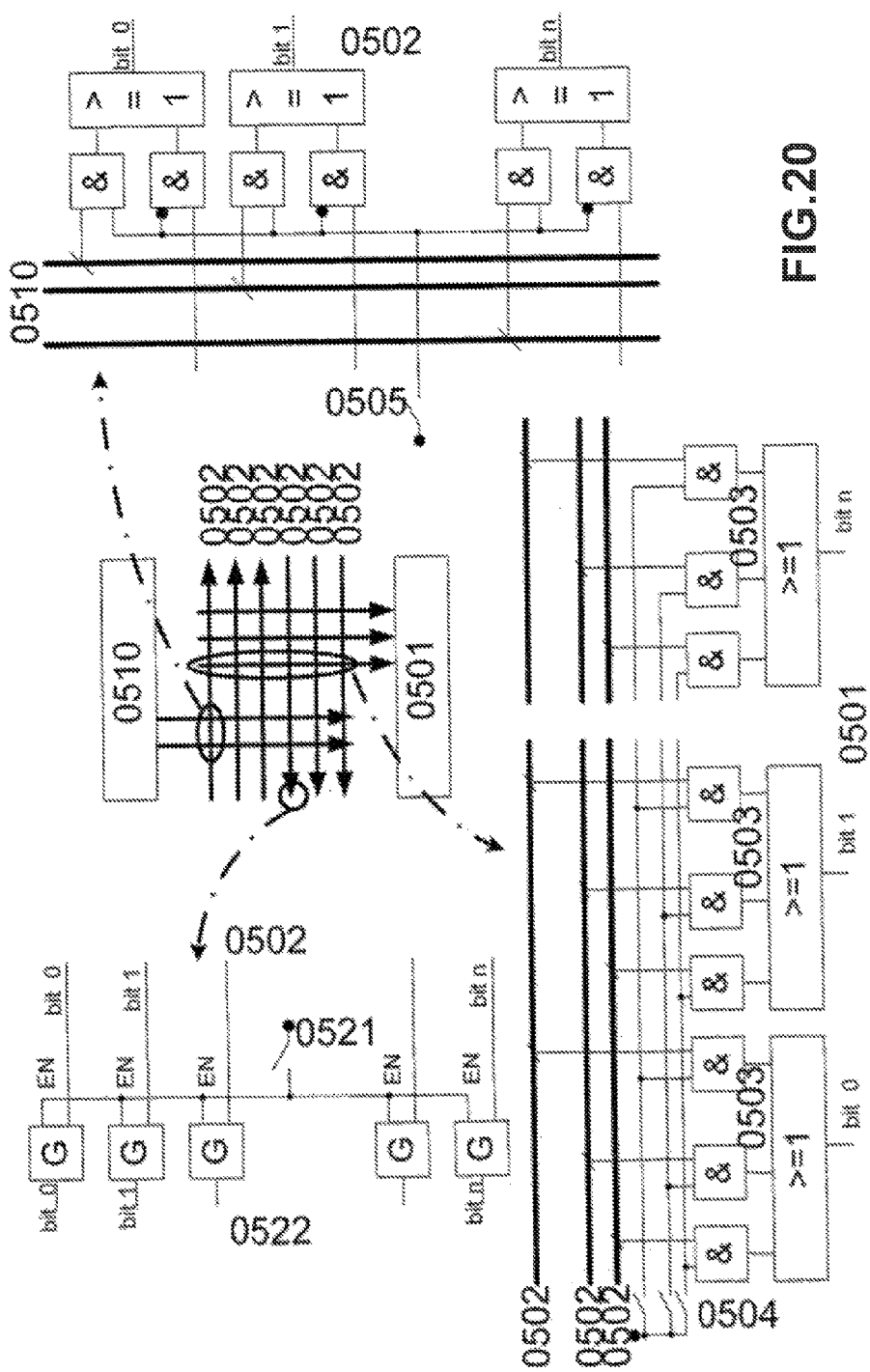

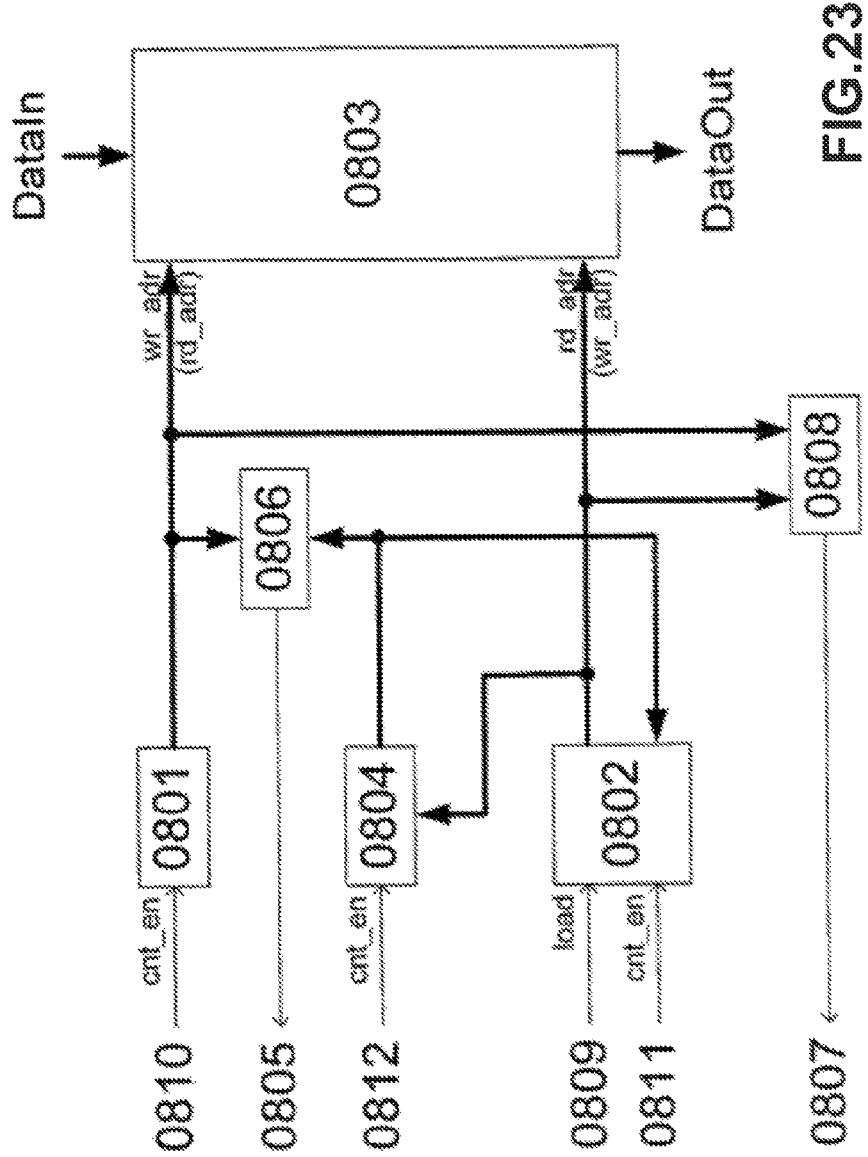

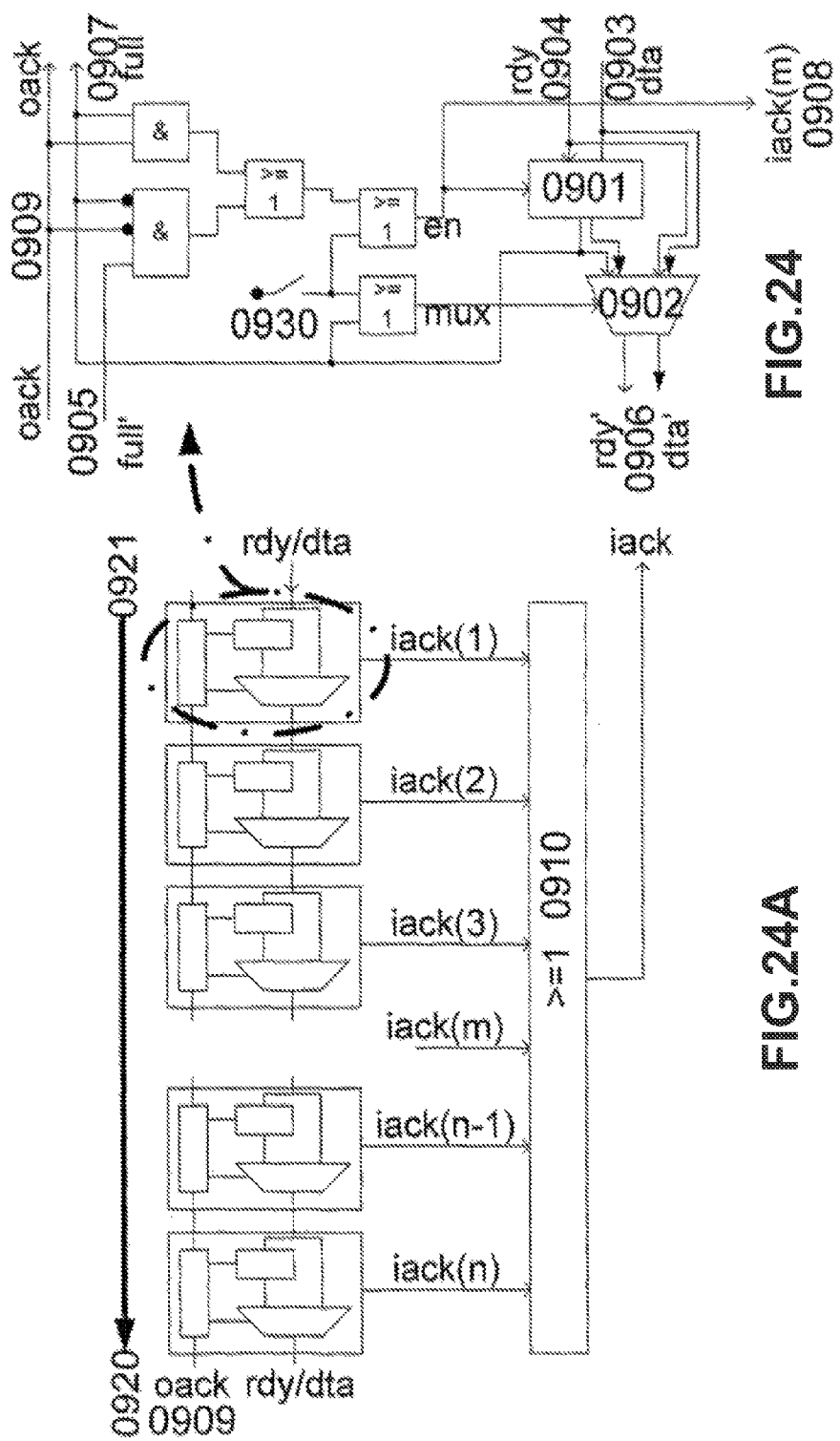

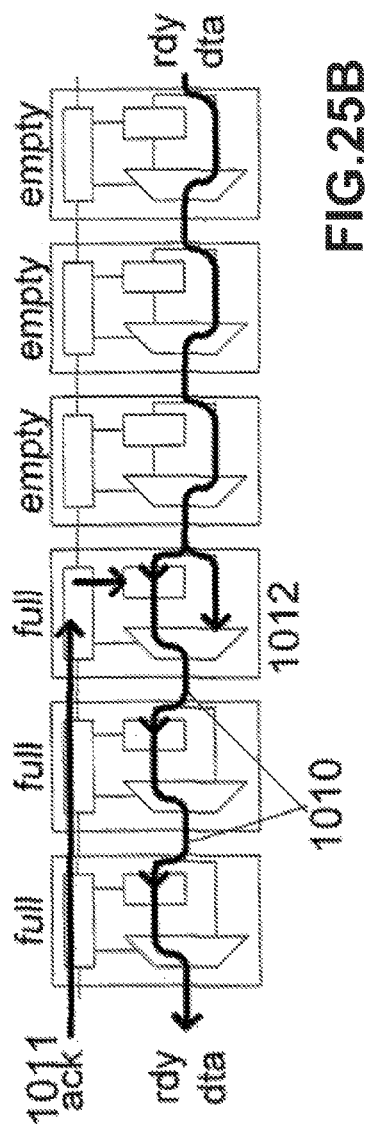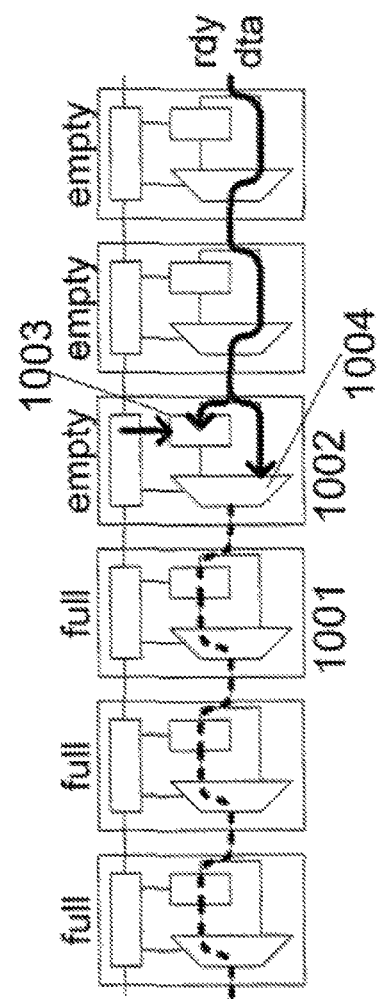

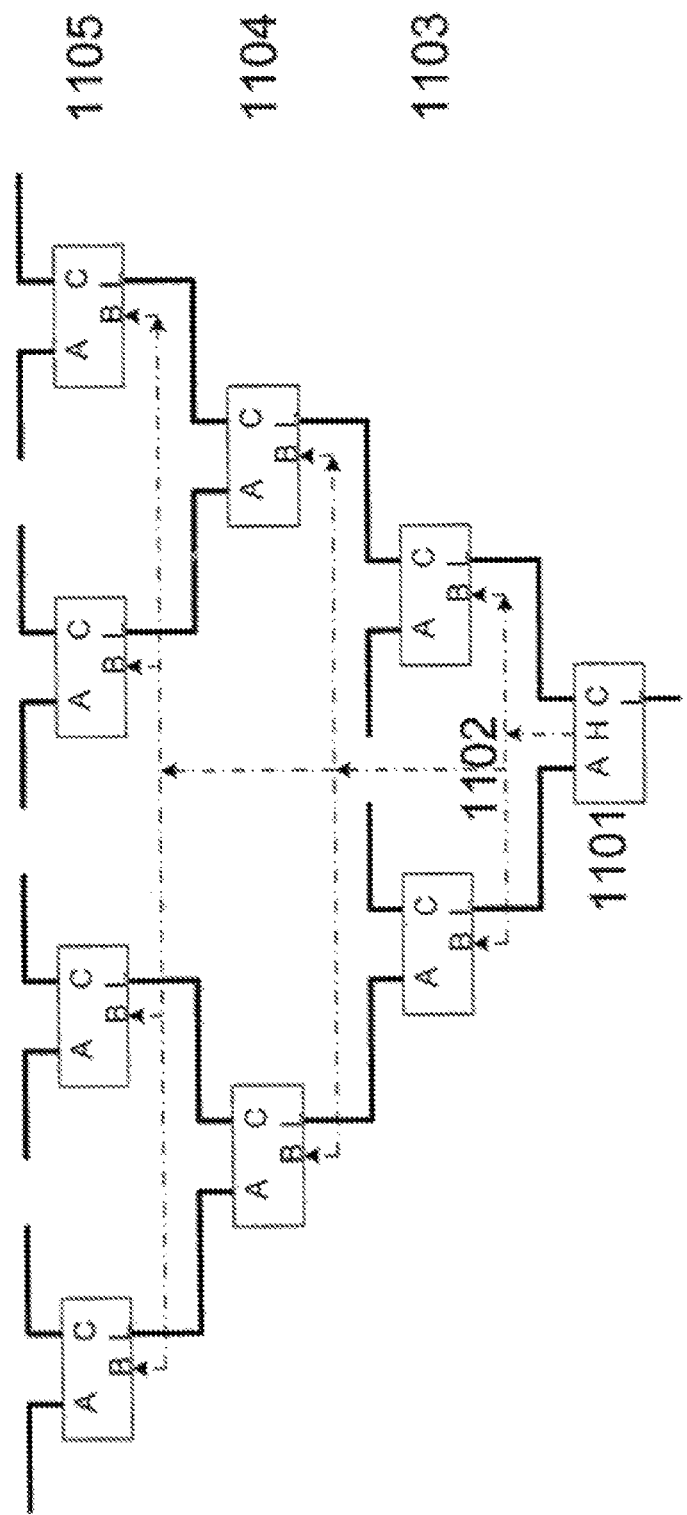

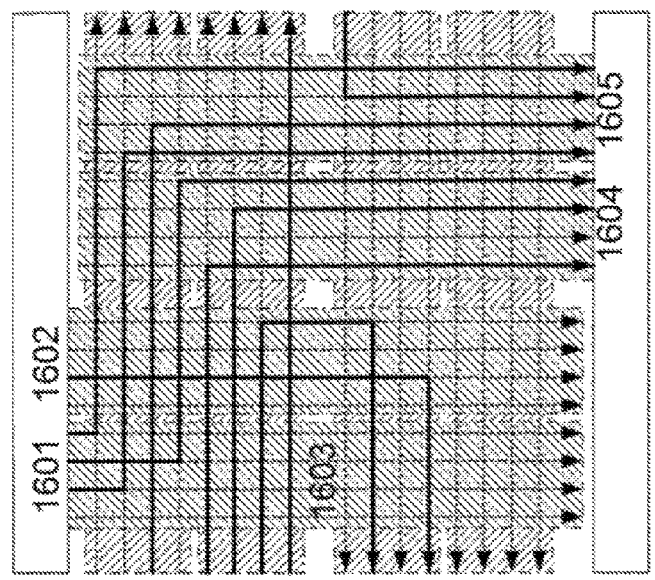
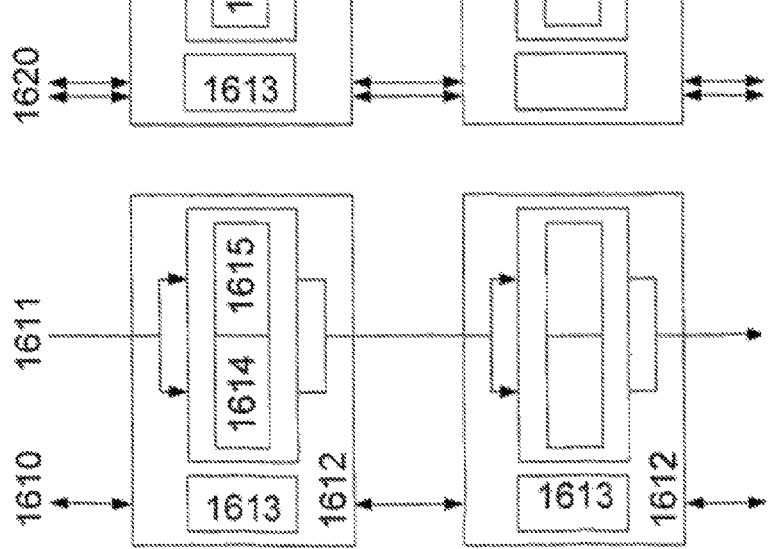
FIG.31C  FIG.31B  FIG.31A

METHOD OF PROCESSING DATA WITH AN ARRAY OF DATA PROCESSORS ACCORDING TO APPLICATION ID

BACKGROUND INFORMATION

The present invention relates to reconfigurable components in general, and in particular but not exclusively the decoupling of data processing within the reconfigurable component and/or within parts of the reconfigurable component and data streams, specifically both within the reconfigurable component and also to and from peripherals, mass memories, host processors, and the like (see, e.g., German Patent Application Nos. DE 101 10 530.4 and DE 102 02 044.2).

Memories are assigned to a reconfigurable module (VPU) at the inputs and/or outputs to achieve decoupling of internal data processing, the reconfiguration cycles in particular, from the external data streams (to/from peripherals, memories, etc.).

Reconfigurable architecture includes modules (VPUs) having a configurable function and/or interconnection, in particular integrated modules having a plurality of unidimensionally or multidimensionally positioned arithmetic and/or logic and/or analog and/or storage and/or internally/externally interconnecting modules, which are interconnected directly or via a bus system.

The above-mentioned architecture is used as an example to illustrate the present invention and is referred to hereinafter as VPU. The architecture includes an arbitrary number of arithmetic, logic (including memory) and/or memory cells and/or networking cells and/or communication/peripheral (IO) cells (PAEs—Processing Array Elements), which may be positioned to form a unidimensional or multidimensional matrix (PA); the matrix may have different cells of any desired configuration. Bus systems are also understood here as cells. A configuration unit (CT) which affects the interconnection and function of the PA is assigned to the entire matrix or parts thereof.

Memory access methods for reconfigurable modules which operate according to a DMA principle are described in German Patent No. P 44 16 881.0, where one or more DMAs are formed by configuration. In German Patent Application No. 196 54 595.1, DMAs are fixedly implemented in the interface modules and may be triggered by the PA or the CT.

German Patent Application No. DE 196 54 846.2 describes how internal memories are written by external data streams and data is read out of the memory back into external units.

German Patent Application No. DE 199 26 538.0 describes expanded memory concepts according to DE 196 54 846.2 for achieving more efficient and easier-to-program data transmission. U.S. Pat. No. 6,347,346 describes a memory system which corresponds in all essential points to German Patent Application No. DE 196 54 846.2, having an explicit bus (global system port) to a global memory. U.S. Pat. No. 6,341,318 describes a method for decoupling external data streams from internal data processing by using a double-buffer method, in which one buffer records/reads out the external data while another buffer records/reads out the internal data; as soon as the buffers are full/empty, depending on their function, the buffers are switched, i.e., the buffer formerly responsible for the internal data now sends its data to the periphery (or reads new data from the periphery) and the buffer formerly responsible for the external data now sends its data to the PA (reads new data from the PA). These double buffers are used in the application to buffer a cohesive data area.

Such double-buffer configurations have enormous disadvantages in the data-stream area in particular, i.e., in data streaming, in which large volumes of data streaming successively into a processor field or the like must always be processed in the same way.

The present invention additionally relates to procedures and methods for managing and transferring data within multidimensional systems of transmitters and receivers. Splitting a data stream into a plurality of independent branches and subsequent merging of the individual branches to form a data stream is to be performable in a simple manner, the individual data streams being recombined in the correct sequence This method may be of importance, in particular, for executing reentrant code. The method described herein may be well suited, in particular, for configurable architectures; particular attention is paid to the efficient control of configuration and reconfiguration.

Reconfigurable architecture includes modules (VPU) having a configurable function and/or interconnection, in particular integrated modules having a plurality of unidimensionally or multidimensionally positioned arithmetic and/or logic and/or analog and/or storage and/or internally/externally interconnecting modules, which are connected to one another directly or via a bus system.

These generic modules include in particular systolic arrays, neural networks, multiprocessor systems, processors having a plurality of arithmetic units and/or logic cells and/or communication/peripheral cells (IO), interconnecting and networking modules such as crossbar switches, as well as conventional modules including FPGA, DPGA, Chameleon, XPUTER, etc. Reference is also made in particular in this context to the following patents and patent applications of the same applicant: P 44 16 881.0-53, DE 197 81 412.3, DE 197 81 483.2, DE 196 54 846.2-53, DE 196 54 593.5-53, DE 197 04 044.6-53, DE 198 80 129.7, DE 198 61 088.2-53, DE 199 80 312.9, PCT/DE00/01869, now U.S. Pat. No. 8,230,411, DE 100 36 627.9-33, DE 100 28 397.7, DE 101 10 530.4, DE 101 11 014.6, PCT/EP00/10516, EP 01 102 674.7, DE 196 51 075.9, DE 196 54 846.2, DE 196 54 593.5, DE 197 04 728.9, DE 198 07 872.2, DE 101 39 170.6, DE 199 26 538.0, DE 101 42 904.5, DE 101 10 530.4, DE 102 02 044.2, DE 102 06 857.7, DE 101 35 210.7, EP 02 001 331.4, EP 01 129 923.22 As well as the particular parallel patent applications thereto. The entire disclosure of these documents are incorporated herein by reference.

The above-mentioned architecture is used as an example to illustrate the present invention and is referred to hereinafter as VPU. The architecture includes an arbitrary number of logic (including memory) and/or memory cells and/or networking cells and/or communication/peripheral (IO) cells (PAEs—Processing Array Elements) which may be positioned to form a unidimensional or multidimensional matrix (PA); the matrix may have different cells of any desired configuration. Bus systems are also understood here as cells. A configuration unit (CT) which affects the interconnection and function of the PA is assigned to the entire matrix or parts thereof.

BRIEF DESCRIPTION OF THE DRAWINGS

FIG. 2A shows a direct FIFO to PA coupling.
FIG. 2B shows IO connected via RAM-PAEs.
FIG. 2C shows FIFOs connected upstream from the IOs.
FIGS. 3A-3F show an example data processing method in a VPU.
FIGS. 4A-4E show another example data processing method in a VPU.

FIGS. 14A-14D show memory connections according to example embodiments of the present invention.

FIG. 16A shows a configuration of a pipeline within a VPU.

FIG. 16B shows a section of stages.

FIG. 16C shows the principle of the example method.

FIG. 16D shows an example embodiment having two receivers.

FIG. 20 shows an example configuration of a bus system.

FIG. 23 shows an example FIFO.

FIGS. 24 and 24A show an example FIFO stage, and an example of cascaded FIFO stages.

FIGS. 25A and 25B show appending and removing a data word.

FIG. 26 shows an example tree.

FIGS. 31A-C show an example of re-sorting of an SIMD-WORD.

DETAILED DESCRIPTION

Figure 1:
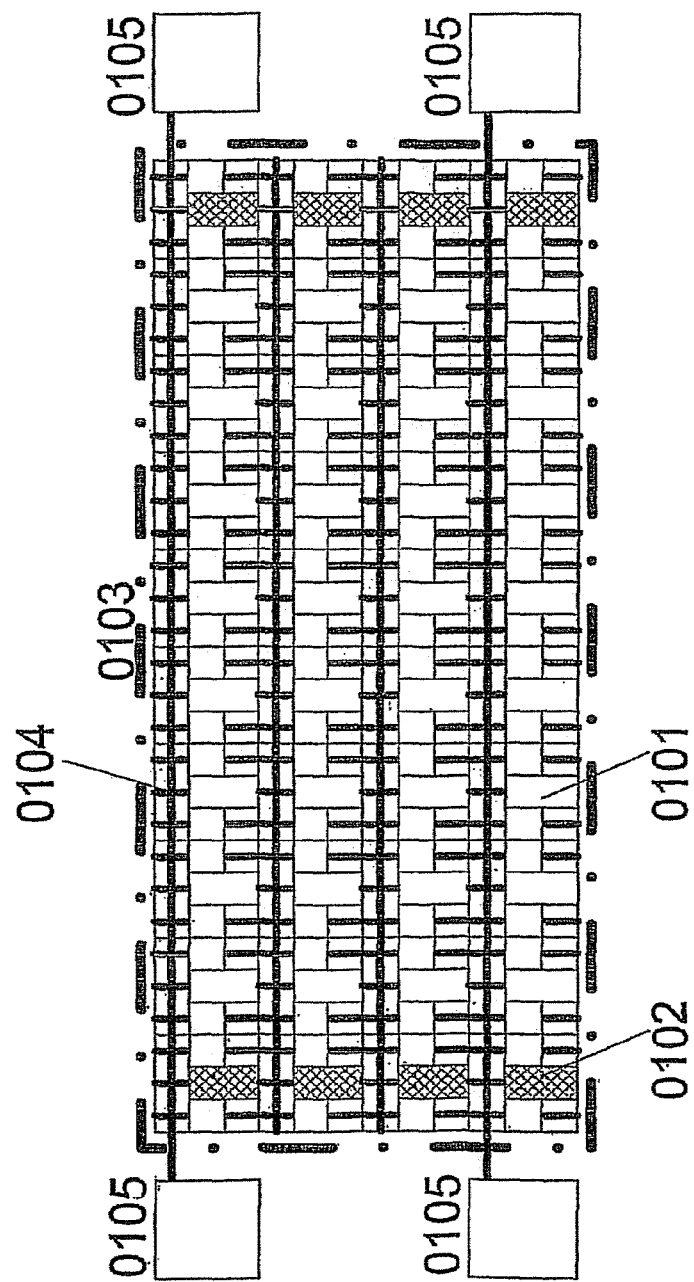
FIG. 1 shows an example reconfigurable processor.

An object of the present invention is to provide a novel approach for commercial use.

A method according to an example embodiment of the present invention, in contrast to the previously known related art, allows a significantly simpler means of controlling the buffers, i.e., memories, connected in between; the related art is disadvantageous in the core area of typical applications of reconfigurable processors in particular. External and internal bus systems may be operated at different transfer rates and/or clock frequencies with no problem due to the memory devices connected in between because data is stored temporarily by the buffers. In comparison with inferior designs from the related art, this method requires fewer memory devices, typically only half as many buffers, i.e., data transfer interface memory devices, thus greatly reducing the hardware costs. The estimated reduction in hardware costs amounts to 25% to 50%. It is also simpler to generate addresses and to program the configuration because the buffers are transparent for the programmer. Hardware is simpler to write and to debug.

A paging method which buffers various data areas in particular for different configurations may be integrated.

It should first be pointed out that various memory systems are known as interfaces to the IO. Reference is made to German Patent No. and German Patent Application Nos. P 44 16 881.0, DE 196 54 595.1, and DE 199 26 538.0. In addition, a method is described in German Patent Application No. DE 196 54 846.2 in which data is first loaded from the IO, (1) data is stored within a VPU after being computed, (2) the array (PA) is reconfigured, (3) data is read out from the internal memory and written back to another internal memory, (4) this is continued until the fully computed result is sent to the IO. Reconfiguration means, for example, that a function executed by a part of the field of reconfigurable units or the entire field and/or the data network and/or data and/or constants which are necessary in data processing is/are determined anew. Depending on the application and/or embodiment, VPUs are reconfigured only completely or also partially, for example. Different reconfiguration methods are implementable, e.g., complete reconfiguration by switching memory areas (see, e.g., German Patent Application Nos. DE 196 51 075.9, DE 196 54 846.2) and/or wave reconfiguration (see, e.g., German Patent Application Nos. DE 198 07 872.2, DE 199 26 538.0, DE 100 28 397.7, DE 102 06 857.7) and/or simple configuring of addressable configuration memories (see, e.g., German Patent Application Nos. DE 196 51 075.9, DE 196 54 846.2, DE 196 54 593.5). The entire disclosure of each of the particular patent specifications is expressly incorporated herewith.

In one example embodiment, a VPU is entirely or partially configurable by wave reconfiguration or by directly setting addressable configuration memories.

Thus, one of the main operating principles of VPU modules is to copy data back and forth between multiple memories, with additional and optionally the same operations (e.g., long FIR filter) and/or other operations (e.g., FFT followed by Viterbi) being performed with the same data during each copying operation. Depending on the particular application, data is read out from one or more memories and written into one or more memories.

For storing data streams and/or states (triggers, see, e.g., German Patent Application Nos. DE 197 04 728.9, DE 199 26 538.0), internal/external memories (e.g., as FIFOs) are used and corresponding address generators are utilized. Any appropriate memory architecture may be fixedly implemented specifically in the algorithm and/or flexibly configured.

For performance reasons, the internal memories of the VPU are preferably used, but basically external memories may also be used.

Assuming this, the following comments shall now be made regarding the basic design:

Interface modules which communicate data between the bus systems of the PA and external units are assigned to an array (PA) (see, e.g., German Patent No. P 44 16 881.0, and German Patent Application No. DE 196 54 595.1). Interface modules connect address buses and data buses in such a way as to form a fixed allocation between addresses and data. Interface modules may preferably generate addresses or parts of addresses independently.

Interface modules are assigned to FIFOs which decouple internal data processing from external data transmission. A FIFO here is a data-streamable buffer, i.e., input/output data memory, which need not be switched for data processing, in particular during execution of one and the same configuration. If other data-streamable buffers are known in addition to FIFO memories, they will subsequently also be covered by the term where applicable. In particular, ring memories having one or more pointers, in particular at least one write memory and one read memory, should also be mentioned. Thus, for example, during multiple reconfiguration cycles for processing an application, the external data stream may be maintained as largely constant, regardless of internal processing cycles. FIFOs are able to store incoming/outgoing data and/or addresses. FIFOs may be integrated into an interface module or assigned to one or more of them. Depending on the design, FIFOs may also be integrated into the interface modules, and at the same time additional FIFOs may be implemented separately. It is also possible to use data-streamable buffers integrated into the module, e.g., by integration of FIFO groups into a chip which forms a reconfigurable processor array.

In one example embodiment, multiplexers for free allocation of interface modules and FIFOs may also be present between the FIFOs (including those that are separate) and the interface modules. In one configuration, the connection of FIFOs to external modules or internal parts of the processor field performed by a multiplexer may be specified based on the processor field, e.g., by the PAE sending and/or receiving data, but it may also be determined, if desired, by a unit at a higher level of the hierarchy, such as a host processor in the case of division of data processing into a highly parallel part of the task and a poorly parallelizable part of the task and/or the multiplexer circuit may be determined by external specifications, which may be appropriate if for example, it is indicated with the data which type of data is involved and how it is to be processed.

With regard to the external connection, units for protocol conversion between the internal and external bus protocols (e.g., RAMBUS, AMBA, PCI, etc.) are also provided. A plurality of different protocol converters may also be used within one embodiment. The protocol converters may be designed separately or integrated into the FIFOs or interface modules.

In one possible embodiment, multiplexers for free assignment of interface modules/FIFOs and protocol converters may be provided between the (separate) protocol converters and the interface modules/FIFOs. Downstream from the protocol converters there may be another multiplexer stage, so that a plurality of AMBA bus interfaces may be connected to the same AMBA bus, for example. This multiplexer stage may also be formed, for example, by the property of an external bus of being able to address a plurality of units.

In one example embodiment, the circuit operates in master and slave operating modes. In the master mode, addresses and bus accesses are generated by the circuit and/or the assigned PA; in slave mode, external units access the circuit, i.e., the PA.

In other embodiments, additional buffer memories or data collectors may be provided within the circuit, depending on the application, for exchanging data between interface modules. These buffer memories preferably operate in a random access mode and/or an MMU paging mode and/or a stack mode and may have their own address generators. The buffer memories are preferably designed as multi-port memories to permit simultaneous access of a plurality of interface modules. It is possible to access the buffer memories from a higher-level data processing unit, in particular from processors such as DSPs, CPUs, microcontrollers, etc., assigned to the reconfigurable module (VPU).

Now the decoupling of external data streams in particular will be described. According to one aspect of the present invention, the external data streams are decoupled by FIFOs (input/output FIFO, combined as IO-FIFO) which are used between protocol converters and interface modules.

The data processing method functions as follows:

Through one or more input FIFOs, incoming data is decoupled from data processing in the array (PA). Data processing may be performed in the following steps:

1. The input FIFO(s) is (are) read out, processed by the array (PA) and/or written into one or more (other) memories (RAM bank 1) assigned locally to the array and/or preferably connected laterally to the array. The lateral connection has the advantage that the chip architecture and/or its design is/are simplified.
2. The array (PA) is reconfigured. The memories (e.g., RAM bank 1) are read out, data is processed and written into one or more memories (e.g., RAM bank2 and/or RAM bank 1) or, as an alternative, data may already be written to the output FIFOs according to step 4.
3. The array (PA) is reconfigured again and data is again written into a memory.
4. This is continued until the result is sent to one or more output FIFOs for output.
5. Then new data is again read out from the input FIFO(s) and processed accordingly, i.e., data processing is continued in step 1.

With the preferred design of the input/output FIFOs (IO-FIFOs) as multi-ported FIFOs, data processing may be performed by protocol converters simultaneously with writing into and/or reading out from the particular FIFOs. The method described above yields a time decoupling which permits "quasi-steady-state" processing of constant data streams in such a way that there is only a latency but no interruption in the data stream when the first data packets have passed through. In an expanded embodiment, the IO-FIFOs may be designed so that the number of IO-FIFOs and their depth may be selected according to the application. In other words, IO-FIFOs may be distributed or combined (e.g., via a transmission gate, multiplexer/demultiplexer, etc.) so that there are more IO-FIFOs or they are deeper. For example, 8 FIFOs of 1,024 words each may be implemented and configured so that 8 FIFOs of 1,024 words or 2 FIFOs of 4,096 words are configured or, for example, 1 FIFO may be configured with 4,096 words and 4 with 1,024 words.

Modifications of the data processing method described here are possible, depending on the design of the system and the requirements of the algorithms.

In an expanded embodiment, the FIFOs function in such a way that in the case of output FIFOs the addresses belonging to the data inputs are also stored in the FIFOs and/or input FIFOs are designed so that there is one FIFO for the reading addresses to be sent out/already sent out and one FIFO for the incoming data words assigned to the addresses.

Below is a discussion of how a FIFO-RAM bank coupling, which is possible according to the present invention, may be implemented in a particularly preferred variant of the present invention.

Depending on the application, it is possible to conduct the data transfer with the IO-FIFOs via one or more additional memory stages (RAM bank) which are assigned locally to the array or are preferably coupled laterally to the array and only then relay data to the data processing PAEs (e.g., ALU-PAEs described in, e.g., German Patent Application No. DE 196 51 075.9).

In a preferred embodiment, RAM-PAEs have a plurality of data interfaces and address interfaces, they are thus designed as multi-port arrays. Designability of a data interface and/or address interface as a global system port should also be mentioned as a possibility.

Additional memory stage(s) (RAM banks) may be implemented, for example, by memory modules corresponding to the RAM-PAEs, as described in, for example, German Patent Application No. DE 196 54 846.2 and/or German Patent Application No. DE 199 26 538.0 and/or International Patent Application No. PCT/EP00/10516.

In other words, a RAM-PAE may constitute a passive memory which is limited (essentially) to the memory function (see, e.g., German Patent Application No. DE 196 54 846.2) or an active memory which automatically generates and controls functions such as address computation and/or bus accesses (see, e.g., German Patent Application No. DE 199 26 538.0). In particular, in one possible embodiment, active address generation functions and/or data transfer functions may also be implemented for a "global system port." Depending on the design, active memories may actively manage one or more data interfaces and address interfaces (active interfaces). Active interfaces may be implemented, for example, by additional modules such as sequencers/state machines and/or ALUs and/or registers, etc., within a RAM-PAE and/or by suitable hardwiring of an active interface to other PAEs whose function and networking are configured in one or more RAM-PAEs in accordance with the functions to be implemented. Different RAM-PAEs may be assigned to different other PAEs.

RAM-PAEs preferably have one or more of the following functions, i.e., modes of operation: random access, FIFO, stack, cache, MMU paging. In a preferred embodiment, RAM-PAEs are connected via a bus to a higher-level configuration unit (CT) and may be configured by it in their function and/or interconnection and/or memory depth and/or mode of operation. In addition, there is preferably also the possibility of preloading and reading out the memory contents by the CT, for example, to set constants and/or lookup tables (cos/sin).

Due to the use of multi-ported memories for the RAM-PAEs, writing and/or reading out of data into/from the IO-FIFOs and data access by the array (PA) may take place simultaneously, so that the RAM-PAEs may in turn again have a buffer property, as described in German Patent Application No. DE 196 54 846.2, for example.

RAM-PAEs may be combined (as discussed in International Patent Application No. PCT/EP 00/10516, for example) in such a way that larger memory blocks are formed and/or the RAM-PAEs operate so that the function of a larger memory is obtained (e.g., one 1,024-word RAM-PAE from two 512-word RAM-PAEs).

In an example embodiment, the units may be combined so that the same address is sent to multiple memories. The address is subdivided so that one portion addresses the entries in the memories and another portion indicates the number of the memory selected (SEL). Each memory has a unique number and may be selected unambiguously by comparing it with SEL. In a preferred embodiment, the number for each memory is configurable.

In another and/or additional example embodiment, an address is relayed from one memory to the next. This address is subdivided so that one portion addresses the entries in the memories and another portion indicates the number (SEL) of the memory selected. This is modified each time data is relayed; for example, a 1 may be subtracted from this each time data is relayed. The memory in which this address part has a certain value (e.g., zero) is activated.

In an example embodiment, the units may be combined so that the same address is sent to a plurality of memories. The address is subdivided so that one part addresses the entries in the memories and another part indicates the number (SEL) of the memory selected. A bus runs between memories, namely from one memory to the next, which has a reference address such that the address has a certain value (e.g., zero) in the first memory and this value is modified each time data is relayed (e.g., incremented by 1). Therefore, each memory has a different unique reference address. The portion of the address having the number of the selected memory is compared with the reference address in each case. If they are identical, the particular memory is selected. Depending on the design, the reference bus may be constructed using the ordinary data bus system or a separated bus.

In an example embodiment, there may be an area check of the address part SEL to rule out faulty addressing.

It should now be pointed out that RAM-PAEs may be used as FIFOs. This may be preferred in particular when a comparatively large memory capacity is provided by RAM-PAEs. Thus, in particular when using multi-ported memories for the RAM-PAEs, this yields the design option of dispensing with explicit IO-FIFOs and/or configuring a corresponding number of RAM-PAEs as FIFOs in addition to the IO-FIFOs and sending data from the IO to the corresponding memory ports. This embodiment may be regarded as particularly cost efficient because no additional memories need be provided, but instead the memories of the VPU architecture, which are configurable in their function and/or interconnection (see, e.g., German Patent Application No. DE 196 54 846.2, DE 199 26 538.0 and International Patent Application No. PCT/EP 00/10516), are configured corresponding to the character of configurable processors.

It is also possible to provide a multiplexer/demultiplexer upstream and/or downstream from the FIFO. Incoming and/or outgoing data streams may be formed from one or more data records. For example, the following function uses two incoming data streams (a and b) and one outgoing data stream (x):

```
function example (a, b : integer) -> x : integer
for i:= 1 to 100
for j:= 1 to 100
x[i]:= a[i] * b[j].
```

This requirement may be met by using two approaches, for example:

a) The number of IO channels implemented is exactly equal to the number of data streams required (see, e.g., German Patent No. P 44 16 881.0; German Patent Application No. DE 196 54 595.1); in the stated function, for example, three I/O channels would thus be necessary; or b) By using internal memories for decoupling data streams, more or less as a register set (see, e.g., German Patent Application Nos. DE 199 26 538.0, DE 196 54 846.2). The different data streams are exchanged between one or more memories and the IO (e.g., memory, peripheral, etc.) by a time multiplex method, for example. Data may then be exchanged internally in parallel with a plurality of memories, if necessary, if the IO data is sorted (split) accordingly during the transfer between these memories and the IO.

Approach a) is supported according to the present invention by making available a sufficient number of IO channels and IO-FIFOs. However, this simple approach is unsatisfactory because an algorithm-dependent and very expensive number of IO channels, which cannot be determined precisely, must be made available.

Therefore, approach b) or a suitable combination of a) and b) may be preferred, e.g., two IO channels, one input and one output, data streams being multiplexed on each channel if necessary. It should be pointed out that the interfaces should be capable of processing data streams, i.e., a sufficiently high clock frequency and/or sufficiently short latencies should be provided on the internal and/or external buses. This may be the reason why a combination of the two variants may be particularly preferred, because by providing a plurality of parallel IO channels, the required clocking of external and/or internal buses may be reduced accordingly.

For approach b) or approaches based at least partially on approach b), it may be necessary to provide multiplexers and/or demultiplexers and to separate the data streams of one data channel (e.g., a) and b) should be separated from the input channel) or to combine a plurality of result channels on one output channel.

One or more multiplexers/demultiplexers (MuxDemux stage) may be located at different positions, depending on the technical hardware implementation and/or the functions to be executed. For example,
a) a MuxDemux stage may be connected between the input/output interface (e.g., described in German Patent Application No. DE 196 54 595.1) and the FIFO stage (IO-FIFO and/or RAM-PAE as FIFO),
b) a MuxDemux stage may be connected downstream from the FIFO stage (IO-FIFO and/or RAM-PAE as FIFO), i.e., between the FIFO stage and the PA,
c) a MuxDemux stage may be connected between the IO-FIFO and the RAM-PAEs.

The MuxDemux stage may in turn either be fixedly implemented in the hardware and/or formed by a suitable configuration of any PAEs designed accordingly.

The position of the multiplexers/demultiplexers of the MuxDemux stage is determined by the configuration by a CT and/or the array (PA) and/or the IO itself, which may also be dynamically influenced, e.g., on the basis of the degree of filling of the FIFO(s) and/or on the basis of pending data transfers (arbitration).

In an example embodiment, the multiplexer/demultiplexer structure is formed by a configurable bus system (e.g., according to or resembling the bus system between the RAM/ALU/etc.—PAEs), whereby the bus system may in particular also be physically the same which is also used either by resource sharing or by a time multiplex method which may be implemented through a suitable reconfiguration.

It may be particularly preferred if addresses are generated in a particular manner, as is evident from the following discussion. Addresses for internal or external memories may be computed by address generators. For example, groups of PAEs may be configured accordingly and/or explicit address generators, implemented separately and specially, if necessary (e.g., DMAs such as those described in German Patent No. DE 44 16 881) or within interface cells (such as those described in German Patent Application No. DE 196 54 595.1) may be used. In other words, either fixedly implemented address generators, which are integrated into a VPU or are implemented externally, may be used and/or the addresses may be calculated by a configuration of PAEs according to the requirements of an algorithm.

Simple address generators are preferably fixedly implemented in the interface modules and/or active memories (e.g., RAM-PAEs). For generation of complex address sequences (e.g., nonlinear, multidimensional, etc.), PAEs may be configured accordingly and connected to the interface cells. Such methods having the corresponding configurations are described in International Patent Application No. PCT/EP 00/10516.

Configured address generators may belong to another configuration (ConfigID, see, e.g., German Patent Application Nos. DE 198 07 872.2, DE 199 26 538.0 and DE 100 28 397.7) other than data processing. This makes a decoupling of address generation from data processing possible, so that in a preferred method, for example, addresses may already be generated and the corresponding data already loaded before or during the time when the data processing configuration is being configured. It should be pointed out that such data preloading and/or address pregeneration is particularly preferred for increasing processor performance, in particular by reducing latency and/or the wait clock cycle. Accordingly, the result data and its addresses may still be processed during or after removal of the data processing/generating configuration. In particular, it is possible through the use of memories and/or buffers such as the FIFOs described here, for example, to further decouple data processing from memory access and/or IO access.

In a preferred procedure, it may be particularly effective to combine fixedly implemented address generators (HARD-AG) (see, e.g., German Patent Application No. DE 196 54 595.1) and configurable address generators in the PA (SOFT-AG) in such a way that HARD-AGs are used for implementation of simple addressing schemes, while complex addressing sequences are computed by the SOFT-AG and then sent to the HARD-AG. In other words, individual address generators may overload and reset one another.

Interface modules for reconfigurable components are described in German Patent Application No. DE 196 54 595.1. The interface modules disclosed therein and their operation could still be improved further to increase processor efficiency and/or performance. Therefore, within the scope of the present invention, a particular embodiment of interface modules is proposed below such as that disclosed in particular in German Patent Application No. DE 196 54 595.1.

Each interface module may have its own unique identifier (IOID) which is transmitted from/to a protocol converter and is used for assigning data transfers to a certain interface module or for addressing a certain interface module. The IOID is preferably CT-configurable.

For example, the IOID may be used to select a certain interface module for a data transfer in the case of accesses by an external master. In addition, the IOID may be used to assign the correct interface module to incoming read data. To do so, the IOID is, for example, transmitted with the address of a data-read access to the IO-FIFOs and either stored there and/or relayed further to the external bus. IO-FIFOs assign the IOIDs of the addresses sent out to the incoming read data and/or the IOIDs are also transmitted via the external bus and assigned by external devices or memories to the read data sent back.

IOIDs may then address the multiplexers (e.g., upstream from the interface modules) so that they direct the incoming read data to the correct interface module.

Interface modules and/or protocol converters conventionally operate as bus masters. In a special embodiment, it is now proposed that interface modules and/or protocol converters shall function alternatively and/or fixedly and/or temporarily as bus slaves, in particular in a selectable manner, e.g., in response to certain events, states of state machines in PAEs, requirements of a central configuration administration unit (CT), etc. In an additional embodiment, the interface modules are expanded so that generated addresses, in particular addresses generated in SOFT-AGs, are assigned a certain data packet.

A preferred embodiment of an interface module is described below:

A preferred coupling of an interface module is accomplished by connecting any PAEs (RAM, ALU, etc.) and/or the array (PA) via a bus (preferably configurable) to interface modules which are either connected to the protocol converters or have the protocol converters integrated into them.

In a variant embodiment, IO-FIFOs are integrated into the interface modules.

For write access (the VPU sends data to external 10 s, e.g., memories/peripherals, etc.) it is advantageous to link the address output to the data output, i.e., a data transfer takes place with the IO precisely when a valid address word and a valid data word are applied at the interface module, the two words may be originating from different sources. Validity may be identified by a handshake protocol (RDY/ACK) according to German Patent Application Nos. DE 196 51 075.9 or DE 101 10 530.4, for example. Through suitable logic gating (e.g., AND) of RDY signals of address word and data word, the presence of two valid words is detectable, and IO access may be executed. On execution of the IO access, the data words and the address words may be acknowledged by generating a corresponding ACK for the two transfers. The IO access including the address and data, as well as the associated status signals, if necessary, may be decoupled in output FIFOs according to the present invention. Bus control signals are preferably generated in the protocol converters.

For read access (the VPU receives data from external 10 s, e.g., memories/peripherals, etc.), the addresses for the access are first generated by an address generator (HARD-AG and/or SOFT-AG) and the address transfer is executed. Read data may arrive in the same clock cycle or, at high frequencies, may arrive pipelined one or more clock cycles later. Both addresses and data may be decoupled through IO-FIFOs.

The conventional RDY/ACK protocol may be used for acknowledgment of the data, and it may also be pipelined (see, e.g., German Patent Application Nos. DE 196 54 595.1, DE 197 04 742.4, DE 199 26 538.0, DE 100 28 397.22And DE 101 10 530.4).

The conventional RDY/ACK protocol may also be used for acknowledgment of the addresses. However, acknowledgment of the addresses by the receiver results in a very long latency, which may have a negative effect on the performance of VPUs. The latency may be bypassed in that the interface module acknowledges receipt of the address and synchronizes the incoming data assigned to the address with the address.

Acknowledgment and synchronization may be performed by any suitable acknowledgment circuit. Two possible embodiments are explained in greater detail below, although in a non-limiting fashion:

a) FIFO

A FIFO stores the outgoing address cycles of the external bus transfers. With each incoming data word as a response to an external bus access, the FIFO is instructed accordingly. Due to the FIFO character, the sequence of outgoing addresses corresponds to the sequence of outgoing data words. The depth of the FIFO (i.e., the number of possible entries) is preferably adapted to the latency of the external system, so that any outgoing address may be acknowledged without latency and optimum data throughput is achieved. Incoming data words are acknowledged according to the FIFO entry of the assigned address. If the FIFO is full, the external system is no longer able to accept any additional addresses and the current outgoing address is not acknowledged and is thus held until data words of a preceding bus transfer have been received and one FIFO entry has been removed. If the FIFO is empty, no valid bus transfer is executed and possibly incoming data words are not acknowledged.

b) Credit Counter

Each outgoing address of external bus transfers is acknowledged and added to a counter (credit counter). Incoming data words as a response to an external bus transfer are subtracted from the counter. If the counter reaches a defined maximum value, the external system can no longer accept any more addresses and the current outgoing address is not acknowledged and is thus held until data words of a preceding bus transfer have been received and the counter has been decremented. If the counter content is zero, no valid bus transfer is executed and incoming data words are not acknowledged.

To optimally support burst transfers, the method using a) (FIFO) is particularly preferred, and in particular FIFOs may be used like the FIFOs described below for handling burst accesses and the assignment of IOIDs to the read data.

The IO-FIFOs described here may be integrated into the interface modules. In particular, an IO-FIFO may also be used for embodiment variant a).

The optional possibility of providing protocol converters is discussed above. With regard to particularly advantageous possible embodiments of protocol converters, the following comments should be made:

A protocol converter is responsible for managing and controlling an external bus. The detailed structure and functioning of a protocol converter depend on the design of the external bus. For example, an AMBA bus requires a protocol converter different from a RAMBUS. Different protocol converters are connectable to the interface modules, and within one embodiment of a VPU, a plurality of, in particular, different protocol converters may be implemented.

In one preferred embodiment, the protocol converters are integrated into the IO-FIFOs of the present invention.

It is possible according to the present invention to provide burst bus access. Modern bus systems and SoC bus systems transmit large volumes of data via burst sequences. An address is first transmitted and data is then transmitted exclusively for a number of cycles (see AMBA Specification 2.0, ARM Limited).

For correctly executing burst accesses, several tasks are to be carried out:

1) Recognizing Burst Cycles

Linear bus accesses, which may be converted into bursts, must be recognized to trigger burst transfers on the external bus. For recognizing linear address sequences, a counter (TCOUNTER) may be used; it is first loaded with a first address of a first access and counts linearly up/down after each access. If the subsequent address corresponds to the counter content, there is a linear and burst-capable sequence.

2) Aborting at Boundaries

Some bus systems (e.g., AMBA) allow bursts (a) only up to a certain length and/or (b) only up to certain address limits (e.g., 1024 address blocks). For (a), a simple counter may be implemented according to the present invention, which counts from the first desired or necessary bus access the number of data transmissions and at a certain value which corresponds to the maximum length of the burst transfer, signals the boundary limits using a comparator, for example.

For (b), the corresponding bit (e.g., the $10^{th}$ bit for 1024 address limits) which represents the boundary limit may be compared between TCOUNTER and the current address (e.g., by an XOR function). If the bit in the TCOUNTER is not equal to the bit in the current address, there has been a transfer beyond a boundary limit which is signaled accordingly.

3) Defining the Length

If the external bus system does not require any information regarding the length of a burst cycle, it is possible and preferable according to the present invention to perform burst transfers of an indefinite length (cf. AMBA). If length information is expected and/or certain burst lengths are predetermined, the following procedure may be used according to the present invention. Data and addresses to be transmitted are written into a FIFO, preferably with the joint use of the IO-FIFO, and are known on the basis of the number of addresses in the (IO-)FIFO. For the addresses, an address FIFO is used, transmitting in master mode the addresses from the interface modules to the external bus and/or operating conversely in slave mode. Data is written into a data FIFO, which transmits data according to the transmission (read/write). In particular, a different FIFO may be used for write transfers and for read transfers. The bus transfers may then be subdivided into fixed burst lengths, so that they are known before the individual burst transfers and may be stated on initiation of the burst, burst transfers of the maximum burst length preferably being fowled first and if the number of remaining (IO-)FIFO entries is smaller than the current burst length, a next smaller burst length is used in each case. For example, ten (IO-)FIFO entries may be transmitted at a maximum burst length of 4 with 4, 4, 2 burst transfers.

4) Error Recovery

Many external bus systems (cf. AMBA) provide methods for error elimination in which failed bus transfers are repeated, for example. The information as to whether a bus transfer has failed is transmitted at the end of a bus transfer, more or less as an acknowledgment for the bus transfer. To repeat a bus transfer, it is now necessary for all the addresses to be available, and in the case of write access, the data to be written away must also be available. According to the present invention, the address FIFOs (preferably the address FIFOs of the IO-FIFOs) are modified so that the read pointer is stored before each burst transfer. Thus, a FIFO read pointer position memory means is provided, in particular an address FIFO read pointer position memory means. This may form an integral part of the address FIFO in which, for example, a flag is provided, indicating that information stored in the FIFO represents a read pointer position or it may be provided separately from the FIFO. As an alternative, a status indicating deletability could also be assigned to data stored in the FIFO, this status also being stored and reset to "deletable" if successful data transmission has been acknowledged. If an error has occurred, the read pointer is reset at the position stored previously and the burst transfer is repeated. If no error has occurred, the next burst transfer is executed and the read pointer is restored accordingly. To prevent the write pointer from arriving at a current burst transfer and thus overwriting values which might still be needed in a repeat of the burst transfer, the full status of the FIFOs is determined by comparing the stored read pointer with the write pointer.

IO-FIFOs and/or FIFOs for managing burst transfers may preferably be expanded to incoming read data using the function of address assignment, which is known from the interface modules. Incoming read data may also be assigned the IOID which is preferably stored in the FIFOs together with the addresses. Through the assignment of the IOID to incoming read data, the assignment of the read data to the corresponding interface modules is possible by switching the multiplexers according to the IOIDs, for example.

According to the present invention, it is possible to use certain bus systems and/or to design bus systems in different ways. This is described in further detail below. Depending on the design, different bus systems may be used between the individual units, in particular the interface modules, the IO-FIFOs, the protocol converters, and a different bus system may be implemented between each of two units. Different designs are implementable, the functions of a plurality of designs being combinable within one design. A few design options are described below.

The simplest possible design is a direct connection of two units.

In an expanded embodiment, multiplexers are provided between the units, which may have different designs. This example embodiment is preferred in particular when using a plurality of the particular units.

A multiplex function may be obtained using a configurable bus, which is configurable by a higher-level configuration unit (CT), specifically for a period of time for the connection of certain units.

In an example embodiment, the connections are defined by selectors which decode a portion of an address and/or an IOID, for example, by triggering the multiplexers for the interconnection of the units. In a particularly preferred embodiment, the selectors are designed in such a way that a plurality of units may select a different unit at the same time, each of the units being arbitrated for selection in chronological sequence. An example of a suitable bus system is described in, e.g., German Patent Application No. DE 199 26 538.0. Additional states may be used for arbitration. For example, data transfers between the interface modules and the IO-FIFOs may be optimized as follows:

In each case one block of a defined size of data to be transmitted is combined within the FIFO stages. As soon as a block is full/empty, a bus access is signaled to the arbiter for transmitting the data. Data is transmitted in a type of burst transfer, i.e., the entire data block is transmitted by the arbiter during a bus allocation phase. In other words, a bus allocation may take place in a manner determined by FIFO states of the connected FIFOs, data blocks being used for the determination of state within a FIFO. If a FIFO is full, it may arbitrate the bus for emptying; if a FIFO is empty, it may arbitrate the bus for filling. Additional states may be provided, e.g., in flush, which is used for emptying only partially full FIFOs and/or for filling only partially empty FIFOs. For example, flush may be used in a change of configuration (reconfiguration).

In a preferred embodiment, the bus systems are designed as pipelines in order to achieve high data transfer rates and clock rates by using suitable register stages and may also function as FIFOs themselves, for example.

In a preferred embodiment, the multiplexer stage may also be designed as a pipeline.

According to the present invention, it is possible to connect a plurality of modules to one IO and to provide communication among the modules. In this regard, the following should be pointed out:

configuration modules which include a certain function and are reusable and/or relocatable within the PA are described in, for example, German Patent Application Nos. DE 198 07 872.2, DE 199 26 538.0, and DE 100 28 397.7.

A plurality of these configuration modules may be configured simultaneously into the PA, dependently and/or independently of one another.

The configuration modules must be hardwired to a limited IO, which is typically provided in particular only at certain locations and is therefore not relocatable, in such a way that the configuration modules are able to use the IOs simultaneously and data is assigned to the correct modules. In addition, configuration modules that belong together (dependent) must be hardwired together in such a way that free relocation of the configuration modules is possible among one another in the PA.

Such a flexible design is in most cases not possible through the conventional networks (see, e.g., German Patent Nos. P 44 16 881.0, 02, 03, 08), because this network must usually be explicitly allocated and routed through a router.

German Patent Application No. DE 197 04 742.4 describes a method of constructing flexible data channels within a PAE matrix according to the algorithms to be executed so that a direct connection through and in accordance with a data transmission is created and subsequently dismantled again. Data to be transmitted may be precisely assigned to one source and/or one destination.

In addition and/or as an alternative to German Patent Application No. DE 197 04 742.4 and the procedures and configurations described therein, additional possibilities are now provided through the present invention, and methods (hereinafter referred to jointly as GlobalTrack) that permit flexible allocation and interconnection during run time may be used, e.g., serial buses, parallel buses and fiber optics, each with suitable protocols (e.g., Ethernet, Firewire, USB). Reference is made here explicitly to transmission by light using a light-conducting substrate, in particular with appropriate modulation for decoupling of the channels. Another particular feature of the present invention with respect to memory addressing, in particular paging and MMU options, is described below.

Data channels of one or multiple GlobalTracks may be connected via mediating nodes to an ordinary network, e.g., according to German Patent Nos. P 44 16 881.0, 02, 03, 08. Depending on the implementation, the mediating nodes may be configured differently in the PA, e.g., assigned to each PAE, to a group and/or hierarchy of PAEs, and/or to every $n^{th}$ PAE.

In a particularly preferred embodiment, all PAEs, interface modules, etc., have a dedicated connection to a GlobalTrack.

A configuration module is designed in such a way that it has access to one or a plurality of these mediating nodes.

A plurality of configuration modules among one another and/or configuration modules and IOs may now be connected via the GlobalTrack. With proper implementation (e.g., German Patent Application No. DE 197 04 742.4) a plurality of connections may now be established and used simultaneously. The connection between transmitters and receivers may be established in an addressed manner to permit individual data transfer. In other words, transmitters and receivers are identifiable via GlobalTrack. An unambiguous assignment of transmitted data is thus possible.

Using an expanded IO, which also transmits the transmitter address and receiver address—as is described in German Patent Application No. DE 101 10 530.4, for example—and the multiplexing methods described in German Patent Application No. DE 196 54 595.1, data for different modules may be transmitted via the IO and may also be assigned unambiguously.

In a preferred embodiment, data transfer is synchronized by handshake signals, for example. In addition, data transfer may also be pipelined, i.e., via a plurality of registers implemented in the GlobalTrack or assigned to it. In a very complex design for large-scale VPUs or for their interconnection, a GlobalTrack may be designed in a network topology using switches and routers; for example, Ethernet could be used.

It should be pointed out that different media may be used for GlobalTrack topologies, e.g., the method described in German Patent Application No. DE 197 04 742.4 for VPU-internal connections and Ethernet for connections among VPUs.

Memories (e.g., RAM-PAEs) may be equipped with an MMU-like paging method. For example, a large external memory could then be broken down into segments (pages), which in the case of data access within a segment would be loaded into one of the internal memories and, at a later point in time, after termination of data access, would be written back into the external memory.

In a preferred embodiment, addresses sent to a (internal) memory are broken down into an address area, which is within the internal memory (MEMADR) (e.g., the lower 25 Bits in a 1,024-entry memory) and a page address (the bits above the lower 10). The size of a page is thus determined by MEMADR.

The page address is compared with a register (page register) assigned to the internal memory. The register stores the value of the page address last transferred from a higher-level external (main) memory into the internal memory.

If the page address matches the page register, free access to the internal memory may take place. If the address does not match (page fault), the current page content is written, preferably linearly, into the external (main) memory at the location indicated by the page register.

The memory area in the external (main) memory (page) which begins at the location of the current new page address is written into the internal memory.

In a particularly preferred embodiment, it is possible to specify by configuration whether or not, in the event of a page fault, the new page is to be transferred from the external (main) memory into the internal memory.

In a particularly preferred embodiment, it is possible to specify by configuration whether or not, in the event of a page fault, the old page is to be transferred from the internal memory into the external (main) memory.

The comparison of the page address with the page register preferably takes place within the particular memory. Data transfer control in the event of page faults may be configured accordingly by any PAEs and/or may take place via DMAs (e.g., in the interface modules or external DMAs). In a particularly preferred embodiment, the internal memories are designed as active memories having integrated data transfer control (see, e.g., German Patent Application No. DE 199 26 538.0).

In another possible embodiment, an internal memory may have a plurality (p) of pages, the size of a page then preferably being equal to the size of the memory divided by p. A translation table (translation look-aside buffer=TLB) which is preferably designed like a fully associative cache replaces the page register and translates page addresses to addresses in the internal memory; in other words, a virtual address may be translated into a physical address. If a page is not included in the translation table (TLB), a page fault occurs. If the translation table has no room for new additional pages, pages may be transferred from the internal memory into the external (main) memory and removed from the translation table so that free space is again available in the internal memory.

It should be pointed out explicitly that a detailed discussion is not necessary because a plurality of conventional MMU methods may be used and may be used with only minor and obvious modifications.

The possibility of providing a collector memory, as it is known, has been mentioned above. In this regard, the following details should also be mentioned.

A collector memory (collector) capable of storing larger volumes of data may be connected between the interface modules and IO-FIFOs.

The collector may be used for exchanging data between the interface modules, i.e., between memories assigned to the array (e.g., RAM-PAEs).

The collector may be used as a buffer between data within a reconfigurable module and external data.

A collector may function as a buffer for data between different reconfiguration steps; for example, it may store data of different configurations while different configurations are active and are being configured. At deactivation of configurations, the collector stores their data, and data of the newly configured and active configurations is transmitted to the PA, e.g., to memories assigned to the array (RAM-PAEs).

A plurality of interface modules may have access to the collector and may manage data in separate and/or jointly accessible memory areas.

In a preferred embodiment, the collector may have multiple terminals for interface modules, which may be accessed simultaneously (i.e., it is designed as a multi-port collector device).

The collector has one or more terminals to an external memory and/or external peripherals. These terminals may be connected to the IO-FIFOs in particular.

In an expanded embodiment, processors assigned to the VPU, such as DSPs, CPUs and microcontrollers, may access the collector. This is preferably accomplished via another multi-port interface.

In a preferred embodiment, an address translation table is assigned to the collector. Each interface may have its own address translation table or all the interfaces may share one address translation table. The address translation table may be managed by the PA and/or a CT and/or an external unit. The address translation table is used to assign collector memory areas to any addresses and it operates like an MMU system. If an address area (page) is not present within the collector (pagemiss), this address area may be loaded into the collector from an external memory. In addition, address areas (pages) may be written from the collector into the external memory.

For data transfer to or between the external memory, a DMA is preferably used. A memory area within the collector may be indicated to the DMA for reading or writing transmission; the corresponding addresses in the external memory may be indicated separately or preferably removed by the DMA from the address translation table.

A collector and its address generators (e.g., DMAs) may preferably operate according to or like MMU systems, which are conventional for processors according to the related art. Addresses may be translated by using translation tables (TLB) for access to the collector. According to the present invention, all MMU embodiments and methods described for internal memories may also be used on a collector. The operational specifics will not be discussed further here because they correspond to or closely resemble the related art.

In an expanded or preferred embodiment, a plurality of collectors may be implemented.

According to the present invention, it is possible to optimize access to memory. The following should be pointed out in this regard:

One basic property of the preferred reconfigurable VPU architecture PACT-XPP is the possibility of superimposing reconfiguration and data processing (see, e.g., German Patent No. P 44 16 881.0, and German Patent Application Nos. DE 196 51 075.9, DE 196 54 846.2, DE 196 54 593.5, DE 198 07 872.2, DE 199 26 538.0, DE 100 28 397.7, DE 102 06 857.7).

In other words, for example:

a) the next configuration may already be preloaded during data processing; and/or b) data processing in other already-configured elements may already begin while a number of configurable elements or certain configurations are not yet configured or are in the process of being configured; and/or c) the configuration of various activities is superimposed or decoupled in such a way that they run with a mutual time offset at optimum performance (see 8.1 address generation).

Modern memory protocols (e.g., SDRAM, DDRAM, RAMBUS) usually have the following sequence or a sequence having a similar effect, but steps 2 and 3 may possibly also occur in the opposite order:

1. Initializing access with the address given;
2. A long latency;
3. Rapid transmission of data blocks, usually as a burst.

This property may be utilized in a performance-efficient manner in VPU technology. For example, it is possible to separate the steps of computation of the address(es), initialization of memory access, data transfer and data processing in the array (PA) in such a way that different (chronological) configurations occur, so that largely optimum superpositioning of the memory cycles and data processing cycles may be achieved. Multiple steps may also be combined, depending on the application.

For example, the following method corresponds to this principle:

The application AP, which includes a plurality of configurations (ap=1, 2, . . . , z), is to be executed. Furthermore, additional applications/configurations which are combined under WA are to be executed on the VPU:

1. Read addresses are first computed (in an ap configuration of AP) and the data transfers and IO-FIFOs are initialized;
2. Data transmitted for AP and now present in IO-FIFOs is processed (in an (ap+1) configuration) and, if necessary, stored in FIFOs, buffers or intermediate memories, etc.;
2a. Computation of results may require a plurality of configuration cycles (n) at the end of which the results are stored in an IO-FIFO, and
3. The addresses of the results are computed and the data transfer is initialized; this may take place in parallel or later in the same configuration or in an (ap+n+2) configuration; at the same time or with a time offset, data is then written from the IO-FIFOs into the memories.

Between the steps, any configuration from WA may be executed, e.g., when a waiting time is necessary between steps, because data is not yet available.

Likewise, in parallel with the processing of AP, configurations from WA may be executed during the steps, e.g., if AP does not use the resources required for WA.

It will be self-evident to those skilled in the art that variously modified embodiments of this method are also possible.

In one possible embodiment, the processing method may take place as shown below (Z marks a configuration cycle, i.e., a unit of time):

| Z | Configuration AP | Other configurations (WA) |
|---|---|---|
| | | Any other configurations and/or data processing, read/write processes using IO-FIFOs and/or RAM-PAEs in other resources or |

-continued

| | | time-multiplexed resources via configuration cycles |
|---|---|---|
| 1 | Compute read addresses, initialize access | |
| 2 | Input of data | |
| 3 + k | Process data (if necessary in a plurality of (k) configuration cycles) | |
| 4 + k | Compute write addresses, initialize access | |
| 5 + k | Output of data | |

This sequence may be utilized efficiently by the data processing method described in, for example, German Patent Application No. DE 102 02 044.2 in particular.

The methods and devices described above are preferably operated using special compilers, which are expanded in particular in comparison with traditional compilers. The following should be pointed out in this regard:

For generating configurations, compilers that run on any computer system are used. Typical compilers include, for example, C-compilers and/or even NML compilers for VPU technology, for example. Particularly suitable compiler methods are described in German Patent Application Nos. DE 101 39 170.6, and DE 101 29 237.6, and European Patent No. EP 02 001 331.4, for example.

The compiler, at least partially, preferably takes into account the following particular factors: Separation of addressing into
1. external addressing, i.e., data transfers with external modules,
2. internal addressing, i.e., data transfers among PAEs, in particular between RAM-PAEs and ALU-PAEs,
3. in addition, time decoupling also deserves special attention.

Bus transfers are broken down into internal and external transfers.
bt1) External read accesses are separated and, in one possible embodiment, they are also translated into a separate configuration. Data is transmitted from an external memory to an internal memory.
bt2) Internal accesses are coupled to data processing, i.e., internal memories are read and/or written for data processing.
bt3) External write accesses are separated and, in one possible embodiment, they are also translated into a separate configuration. Data is transmitted from an internal memory into an external memory.

bt1, bt2, and bt3 may be translated into different configurations which may, if necessary, be executed at a different point in time.

This method will now be illustrated on the basis of the following example:

```
function example (a, b : integer) -> x : integer
    for i := 1 to 100
        for j := 1 to 100
            x[i] := a[i] * b[j].
```

This function is transformed by the compiler into three parts, i.e., configurations (subconfig): example#dload: Loads data from externally (memories, peripherals, etc.) and writes it into internal memories. Internal memories are indicated by r# and the name of the original variable.
example#process: Corresponds to the actual data processing. This reads data out of internal operands and writes the results back into internal memories. example#dstore: Writes the results from the internal memory into externally (memories, peripherals, etc.).

```
function example# (a, b : integer) -> x : integer
    subconfig example#dload
        for i := 1 to 100
            r#a[i] := a[i]
        for j := 1 to 100
            r#b[j] := b[j]
    subconfig example#process
        for i := 1 to 100
            for j := 1 to 100
                r#x[i] := r#a[i] * r#b[j]
    subconfig example#dstore
        for i := 1 to 100
            x[i] := r#x[i].
```

An effect of the example method is that instead of i*j=100*100=10,000 external accesses, only i+j=100+100=200 external accesses are performed for reading the operands. These accesses are also completely linear, which greatly accelerates the transfer rate in modern bus systems (burst) and/or memories (SDRAM, DDRAM, RAMBUS, etc.).

Internal memory accesses take place in parallel, because different memories have been assigned to the operands.

For writing the results, i=100 external accesses are necessary and may again be performed linearly at maximum performance.

If the number of data transfers is not known in advance (e.g., WHILE loop) or is very large, a method may be used which reloads the operands as necessary through subprogram call instructions and/or writes the results externally. In a preferred embodiment, the states of the FIFOs may (also) be queried: "empty" if the FIFO is empty and "full" if the FIFO is full. The program flow responds according to the states. It should be pointed out that certain variables (e.g., ai, bi, xi) are defined globally. For performance optimization, a scheduler may execute the configurations example#dloada, example#dloadb before calling up example#process according to the methods already described, so that data is already preloaded. Likewise, example#dstore(n) may still be called up after termination of example#process in order to empty r#x.

```
subconfig example#dloada(n)
    while !full(r#a) AND ai <= n
        r#a[ai] := a[ai]
        ai++
subconfig example#dloadb(n)
    while !full(r#b) AND bi <= n
        r#b[bi] := b[bi]
        bi++
subconfig example#dstore (n)
    while !empty(r#x) AND xi <= n
        x[xi] := r#x[xi]
        xi++
subconfig example#process
    for i := 1 to n
        for j := 1 to m
            if empty(r#a) then example#dloada(n)
            if empty(r#b) then example#dloadb(m)
            if full(r#x) then example#dstore(n)
            r#x[i] := r#a[i] + r#b[j]
        bj := 1.
```

The subprogram call instructions and managing of the global variables are comparatively complex for reconfigurable architectures. Therefore, in a preferred embodiment, the following optimization may be performed; in this optimized method, all configurations are run largely independently and are terminated after being completely processed (terminate). Since data b[j] is required repeatedly, example#dloadb must accordingly be run through repeatedly. To do so, for example, two alternatives will be described:

---

Alternative 1: example#dloadb terminates after each run-through and is reconfigured for each new start by example#process.
Alternative 2: example#dloadb runs infinitely and is terminated by example#process.
While "idle," a configuration is inactive (waiting).
subconfig example#dloada(n)
for i := 1 to n
while full(r#a)
idle
r#a[i] :=a[i]
terminate
subconfig example#dloadb(n)
while 1 // ALTERNATIVE 2
for i := 1 to n
while full(r#b)
idle
r#b[i] := a[i]
terminate
subconfig example#dstore(n)
 for i := 1 to n
while empty(r#b)
idle
x[i] := r#x[i]
 terminate
subconfig example#process
for i := 1 to n
for j := 1 to m
while empty(r#a) or empty(r#b) or full(r#x)
idle
r#x[i] := r#a[i] * r#b[j]
config example#dloadb(n) // ALTERNATIVE 1
terminate example#dloadb(n) // ALTERNATIVE 2
terminate

---

To avoid waiting cycles, configurations may also be terminated as soon as they are temporarily no longer able to continue fulfilling their function. The corresponding configuration is removed from the reconfigurable module but remains in the scheduler. Therefore, the "reenter" instruction is used for this below. The relevant variables are saved before termination and are restored when configuration is repeated:

--- subconfig example#dloada(n)
for ai := 1 to n
if full(r#a) reenter
r#a[ai] := a[ai]
terminate
subconfig example#dloadb(n)
while 1 // ALTERNATIVE 2
for bi := 1 to n
if full(r#b) reenter
r#b[bi] := a[bi]
terminate
subconfig example#dstore(n)
for xi := 1 to n
if empty(r#b) reenter
x[xi] := r#x[xi]
terminate
subconfig example#process
for i := 1 to n
for j := 1 to m
if empty(r#a) or empty(r#b) or full(r#x) reenter
r#x[i] := r#a[i] * r#b[j]
config example#dloadb(n) // ALTERNATIVE 1
terminate example#dloadb (n) // ALTERNATIVE 2
terminate

---

With regard to the preceding discussion and to the following, the possibility of using a 'context switch' according to the present invention should also be pointed out. In this regard, the following should be noted:

Repeated start of configurations, e.g., "reenter," requires that local data (e.g., ai, bi, xi) be backed up and restored. Known related-art methods provide explicit interfaces to memories or to a CT to transmit data. All of these methods may be inconsistent and/or may require additional hardware.

The context switch according to the present invention is implemented in such a way that a first configuration is removed; data to be backed up remains in the corresponding memories (REGs) (memories, registers, counters, etc.).

A second configuration is loaded; this connects the REGs in a suitable manner and in a defined sequence to one or multiple global memory (memories).

The configuration may use address generators, for example, to access the global memory (memories).

The configuration may use address generators, for example, to access REGs designed as memories.

According to the configured connection between the REGs, the contents of the REGs are written into the global memory in a defined sequence, the particular addresses being predetermined by address generators. The address generator generates the addresses for the global memory (memories) in such a way that the memory areas (PUSHAREA) that have been written are unambiguously assigned to the first configuration removed.

In other words, different address areas are preferably provided for different configurations.

The configuration corresponds to a PUSH of ordinary processors.

Other configurations subsequently use the resources.

The first configuration is to be started again, but first a third configuration which connects the REGs of the first configuration in a defined sequence is started.

The configuration may use address generators, for example, to access the global memory or memories. The configuration may use address generators, for example, to access REGs designed as memories.

An address generator generates addresses, so that correct access to the PUSHAREA assigned to the first configuration takes place. The generated addresses and the configured sequence of the REGs are such that data of the REGs is written from the memories into the REGs in the original order. The configuration corresponds to a POP of ordinary processors.

The first configuration is restarted.

In summary, a context switch is implemented in such a way that data to be backed up is exchanged with a global memory by loading particular configurations which operate like processor architectures known from PUSH/POP.

There is also the possibility of providing a special task switch and/or multiconfiguration handling.

In a preferred mode of operation, different data blocks of different configurations may be partitioned. These partitions may be accessed in a time-optimized manner by preloading a portion of the operands of a subsequent configuration P from external (main) memories and/or other (peripheral) data streams into the internal memories, e.g., during execution of a configuration Q, and during the execution of P, the results of Q as a portion of the total result from the internal memories are written into external (main) memories and/or other (peripheral) data streams.

The functioning here differs considerably from that described in, for example, U.S. Pat. No. 6,341,318. A data stream or data block is preferably decoupled by a FIFO structure (e.g., IO-FIFO). Different data streams or data blocks of different configurations in particular are preferably decoupled by different memories and/or FIFO areas and/or assignment marks in the FIFOs.

The optional MMU methods described above may be used for decoupling and buffering external data. In one type of application, a large external data block may be broken down into a plurality of segments, each may be processed within a VPU.

In an additional preferred mode of operation, different data blocks of different configurations may be broken down into partitions according to the method described above, these partitions now being defined as pages for an MMU. In this way, time-optimized access is possible by preloading the operands of a subsequent configuration P as a page from external (main) memories and/or other (peripheral) data streams into the internal memories, e.g., during execution of a configuration Q in the PA, and during the execution of P, the results of Q as a page from the internal memories are written into external (main) memories and/or other (peripheral) data streams.

For the methods described above, preferably internal memories capable of managing a plurality of partitions and/or pages are used.

These methods may be used for RAM-PAEs and/or collector memories.

Memories having a plurality of bus interfaces (multi-port) are preferably used to permit simultaneous access of MMUs and/or the PA and/or additional address generators/data transfer devices.

In one embodiment, identifiers are also transmitted in the data transfers, permitting an assignment of data to a resource and/or an application. For example, the method described in German Patent Application No. DE 101 10 530.4 may be used. Different identifiers may also be used simultaneously.

In a particularly preferred embodiment, an application identifier (APID) is also transmitted in each data transfer along with the addresses and/or data. An application includes a plurality of configurations. On the basis of the APID, the transmitted data is assigned to an application and/or to the memories or other resources (e.g., PAEs, buses, etc.) intended for an application. To this end, the APIDs may be used in different ways.

Interface modules, for example, may be selected by APIDs accordingly.

Memories, for example, may be selected by APIDs accordingly.

PAEs, for example, may be selected by APIDs accordingly.

For example, memory segments in internal memories (e.g., RAM-PAEs, collector(s)) may be assigned by APIDs. To do so, the APIDs, like an address part, may be entered into a TLB assigned to an internal memory so that a certain memory area (page) is assigned and selected as a function of an APID.

This method yields the possibility of efficiently managing and accessing data of different applications within a VPU.

There is the option of explicitly deleting data of certain APIDs (APID-DEL) and/or writing into external (main) memories and/or other (peripheral) data streams (APID-FLUSH). This may take place whenever an application is terminated. APID-DEL and/or APID-FLUSH may be triggered by a configuration and/or by a higher-level loading unit (CT) and/or externally.

The following processing example is presented to illustrate the method.

An application Q (e.g., APID=Q) may include a configuration for reading operands (e.g., ConfigID=j), a configuration for processing operands (e.g., ConfigID=w), and a configuration for writing results (e.g., ConfigID=s).

Configuration j is executed first to read the operands chronologically optimally decoupled. Configurations of other applications may be executed simultaneously. The operands are written from external (main) memories and/or (peripheral) data streams into certain internal memories and/or memory areas according to the APID identifier.

Configuration w is executed to process the stored operands. To do so, the corresponding operands in the internal memories and/or memory areas are accessed by citation of APIDs. Results are written into internal memories and/or memory areas accordingly by citation of APIDs. Configurations of other applications may be executed simultaneously. In conclusion, configuration s writes the stored results from the internal memories and/or memory areas into external (main) memories and/or other (peripheral) data streams. Configurations of other applications may be executed simultaneously.

To this extent, the basic sequence of the method corresponds to that described above for optimization of memory access.

If data for a certain APID is not present in the memories or if there is no longer any free memory space for this data, a page fault may be triggered for transmission of the data.

While a module was initially assumed in which a field of reconfigurable elements is provided having little additional wiring, such as memories, FIFOs, and the like, it is also possible to use the ideas according to the present invention for systems known as "systems on a chip" (SoC). For SoCs the terms "internal" and "external" are not completely applicable in the traditional terminology, e.g., when a VPU is linked to other modules (e.g., peripherals, other processors, and in particular memories) on a single chip. The following definition of terms may then apply; this should not be interpreted as restricting the scope of the invention but instead is given only as an example of how the ideas of the present invention may be applied with no problem to constructs which traditionally use a different terminology:

internal: within a VPU architecture and/or areas belonging to the VPU architecture and IP, external: outside of a VPU architecture, i.e., all other modules, e.g., peripherals, other processors, and in particular memories on a SoC and/or outside the chip in which the VPU architecture is located.

A preferred embodiment will now be described.

In a particularly preferred embodiment, data processing PAEs are located and connected locally in the PA (e.g., ALUs, logic, etc.). RAM-PAEs may be incorporated locally into the PA, but in a particularly preferred embodiment they are remote from the PA or are placed at its edges (see, e.g., German Patent Application No. DE 100 50 442.6). This takes place so as not to interfere with the homogeneity of the PA in the case of large RAM-PAE memories, where the space required is much greater than with ALU-PAEs and because of a gate/transistor layout (e.g., GDS2) of memory cells, which usually varies greatly. If the RAM-PAEs have dedicated connections to an external bus system (e.g., global bus), they are preferably located at the edges of a PA for reasons of layout, floor plan, and manufacturing.

The configurable bus system of the PA is typically used for the physical connection.

In an expanded embodiment, PAEs and interface modules, as well as additional configurable modules, if necessary, have a dedicated connection to a dedicated global bus, e.g., a GlobalTrack.

Interface modules and in particular protocol converters are preferably remote from the PA and are placed outside of its configuration. This takes place so as not to interfere with the homogeneity of the PA and because of a gate/transistor layout (e.g., GDS2) of the interface modules/protocol converters, which usually varies greatly. In addition, the connections to external units are preferably placed at the edges of a PA for reasons of layout, floor plan, and manufacturing. The interface modules are preferably connected to the PA by the configurable bus system of the PA, the interface modules being connected to its outer edges. The bus system allows data exchange to take place configurably between interface modules and any PAEs within the PA. In other words, within one or different configurations, some interface modules may be connected to RAM-PAEs, for example, while other interface modules may be connected to ALU-PAEs, for example.

The IO-FIFOs are preferably integrated into the protocol converter. To permit a greater flexibility in the assignment of the internal data streams to the external data streams, the interface modules and protocol converters are designed separately and are connected via a configurable bus system.

The present invention is explained in greater detail below only as an example and in a nonrestrictive manner with reference to the drawings.

FIG. 1 shows a particularly preferred design of a reconfigurable processor which includes a core (array PA) (0103) including, for example, a configuration of ALU-PAEs (0101) (for performing computations) and RAM-PAEs (0102) (for saving data) and thus corresponds to the basic principle described in, for example, German Patent Application No. DE 196 54 846.2. The RAM-PAEs are preferably not integrated locally into the core, but instead are remote from the ALU-PAEs at the edges of or outside the core. This takes place so as not to interfere with the homogeneity of the PA in the case of large RAM-PAE memories where the space requirement is far greater than that of ALU-PAEs and because of a gate/transistor layout (e.g., GDS2) of memory cells which usually varies greatly. If the RAM-PAEs have dedicated connections to an external bus system (e.g., dedicated global bus; GlobalTrack; etc.), then they are preferably placed at the edges of a PA for reasons of layout, floor plan, and manufacturing.

The individual units are interlinked via bus systems (0104). Interface modules (interface modules and protocol converters, if necessary) (0105) are located at the edges of the core and are connected to external buses (IO), as similarly described in German Patent Application No. DE 196 54 595.1. The interface modules may have different designs, depending on the implementation, and may fulfill one or more of the following functions, for example:
1. Combining and synchronizing a plurality of bus systems to synchronize addresses and data for example,
2. Address generators and/or DMAs,
3. FIFO stages for decoupling data and/or addresses,
4. Interface controllers (e.g., for AMBA bus, RAMBUS, RapidIO, USB, DDRRAM, etc.).

FIG. 2 shows a different embodiment of the architecture according to the present invention, depicting a configuration 0201 of ALU-PAEs (PA) linked to a plurality of RAM-PAEs (0202). External buses (IOs) (0204) are connected via FIFOs (0203).

FIG. 2A shows a direct FIFO to PA coupling.

FIG. 2B shows the IO (0204) connected to 0201 via the RAM-PAEs (0202). The connection occurs typically via the configurable bus system 0104 or a dedicated bus system. Multiplexers/demultiplexers (0205) switch a plurality of buses (0104) to the IOs (0204). The multiplexers are triggered by a configuration logic and/or address selector logic and/or an arbiter (0206). The multiplexers may also be triggered through the PA.

FIG. 2C corresponds to FIG. 2B, but FIFOs (0203) have been connected upstream from the IOs.

The diagrams in FIG. 3 correspond to those in FIG. 2, which is why the same reference numbers are used. FIG. 3 illustrates the preferred data processing method in a VPU. FIG. 3A: data passes through the IO (0204) into an input FIFO (0303 corresponding to 0203) and is loaded from this into the PA (0201) and/or beforehand into memory 0202.

FIGS. 3B-E show the data execution in which data is transmitted between the memories. During this period of time, the FIFOs may still transmit input data (0301) and/or output data (0302).

In FIG. 3F, data is loaded from the PA and/or from the memories into the output FIFO (0304).

It should be pointed out again that input of data from the input FIFO into the RAM-PAEs or 0201 and writing of data from 0201 or the RAM-PAEs may take place simultaneously.

It should likewise be pointed out that the input/output FIFOs are able to receive and/or send external data continuously during steps a-f.

FIG. 4 shows the same method in a slightly modified version in which multiplexers/demultiplexers (0401) are connected between the FIFOs and 0201 for simple data distribution. The multiplexers are triggered by a configuration logic and/or address selector logic and/or an arbiter (0402).

Multiple configurations take place for data processing (a-e).

The data may be read into memories and/or directly (0403) into the PA from the FIFOs (input FIFOs). During the input operation, data may be written from the PA and/or memories into FIFOs (output FIFOs) (0404). For data output, data may be written from the memories and/or directly (0405) from the PA into the FIFOs. Meanwhile, new data may be written from the input FIFOs into memories and/or the PA (0406).

New data (0407) may already be entered during a last configuration, for example.

During the entire processing, data may be transmitted from externally into the input FIFOs (0408) and/or from the output FIFOs to externally (0409).

Figure 5:
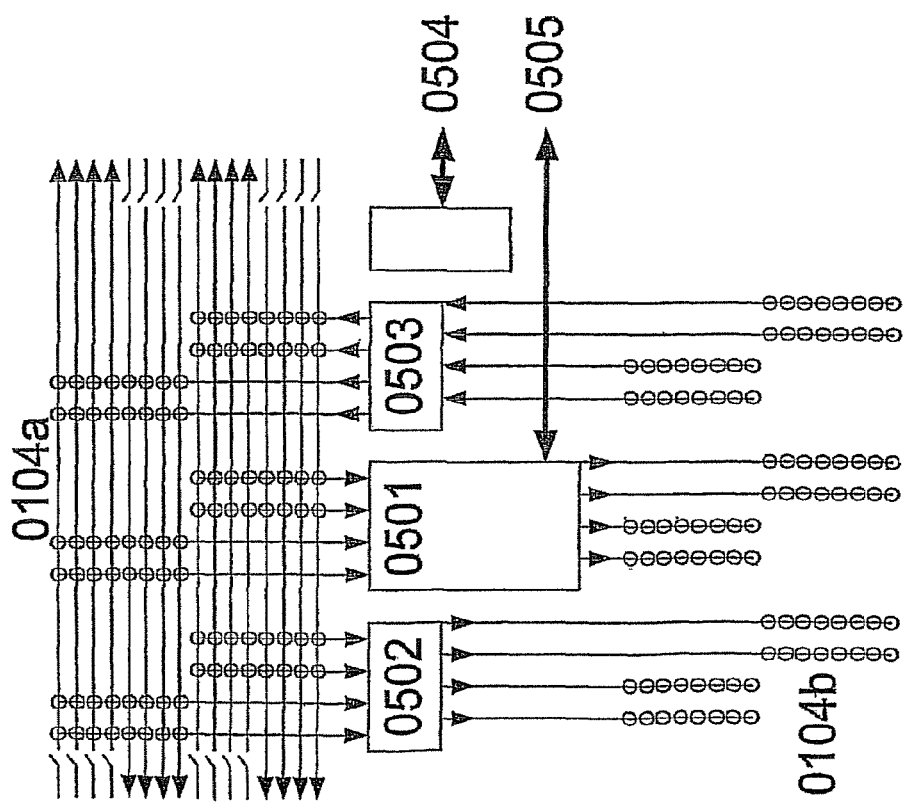
FIG. 5 shows an example embodiment of a PAE.

FIG. 5 shows a possible embodiment of a PAE. A first bus system (0104 *a*) is connected to a data processing unit (0501), the results of which are transmitted to a second bus system (0104 *b*). The vertical data transfer is carried over two register/multiplexer stages (FREG 0502, BREG 0503), each with a different transfer direction. Preferably simple ALUs, e.g., for addition, subtraction, and multiplex operations, may be integrated into the FREG/BREG. The unit is configured in its function and interconnection by a configuration unit (CT) via an additional interface (0504). In a preferred embodiment, there is the possibility of setting constants in registers and/or memories for data processing. In another embodiment, a configuration unit (CT) may read out data from the working registers and/or memories.

In an expanded embodiment, a PAE may additionally have a connection to a dedicated global bus (0505) (e.g., a GlobalTrack) and may thus communicate directly with a global, and if necessary also an external memory and/or peripheral unit, for example. In addition, a global bus may be designed so that different PAEs may communicate directly with one another via this bus, and in a preferred embodiment they may also communicate with modules for an external connection (e.g., interface modules). A bus system such as that described in German Patent Application No. DE 197 04 742.4, for example, may be used for such purposes.

The data processing unit (0501) may be designed for ALU-PAEs as an arithmetic logic unit (ALU), for example. Different ALU-PAEs may use different ALUs and bus connection systems. One ALU may have more than two bus connections to 0104 *a* and/or 0104 *b*, for example.

The data processing unit (0501) may be designed as a memory for RAM-PAEs, for example. Different RAM-PAEs may use different memories and bus connection systems. For example, a memory may have a plurality, in particular, more than two bus connections to 0104 *a* and/or 0104 *b* to allow access of a plurality of senders/receivers to one memory, for example. Accesses may preferably also take place simultaneously (multi-port).

The function of the memory includes, for example, the following functions or combinations thereof: random access, FIFO, stack, cache, page memory with MMU method.

In addition, in a preferred embodiment, the memory may be preloaded with data from the CT (e.g., constants, lookup tables, etc.). Likewise, in an expanded embodiment, the CT may read back data from the memory via 0504 (e.g., for debugging or for changing tasks).

In another embodiment, the RAM-PAE may have a dedicated connection (0505) to a global bus. The global bus connects a plurality of PAEs among one another and in a preferred embodiment also to modules for an external connection (e.g., interface modules). The system described in German Patent Application No. DE 197 04 742.4 may be used for such a bus system.

RAM-PAEs may be wired together in such a way that an n-fold larger memory is created from a plurality (n) of RAM-PAEs.

Figure 6:
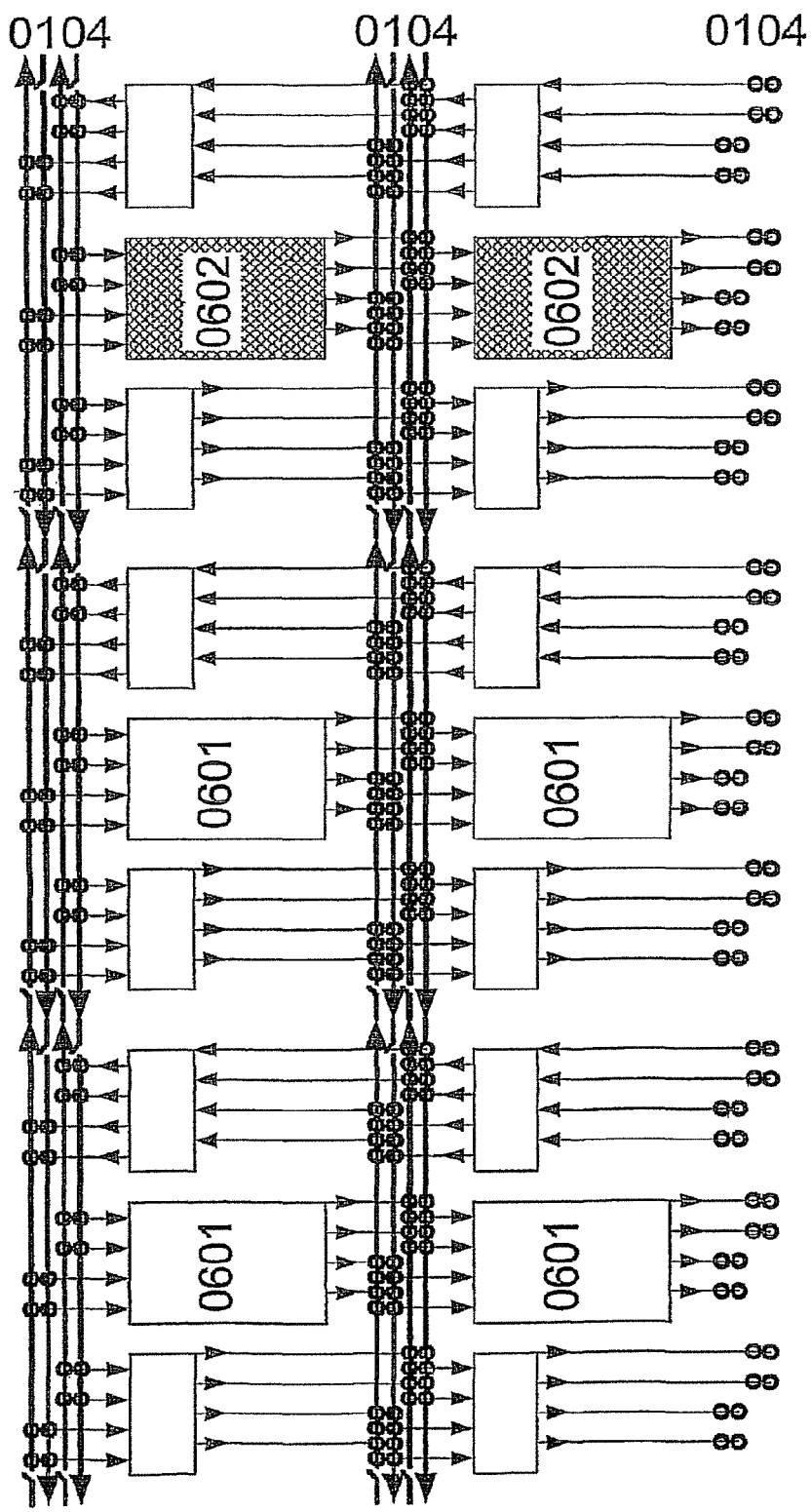
FIG. 6 shows an example of a wiring connection of ALU-PAEs and RAM-PAEs via a bus system.

FIG. 6 shows an example of a wiring connection of ALU-PAEs (0601) and RAM-PAEs (0602) via a bus system 0104. FIG. 1 shows a preferred example of a wiring connection for a reconfigurable processor.

Figure 7B:
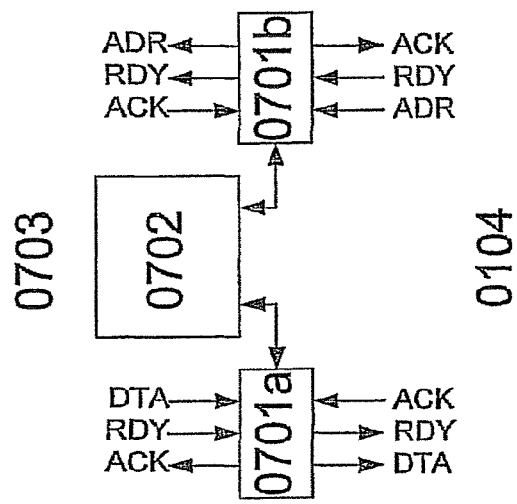
FIG. 7B shows a circuit for reading data.
Figure 7A:
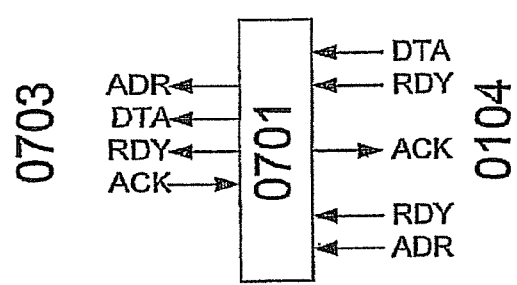
FIG. 7A shows a circuit for writing data.

FIGS. 7A and 7B show a simple embodiment variant of an IO circuit corresponding to 0105. Addresses (ADR) and data (DTA) are transmitted together with synchronization lines (RDY/ACK) between the internal bus systems (0104) and an external bus system (0703). The external bus system leads to IO-FIFOs and/or protocol converters, for example.

FIG. 7A shows a circuit for writing data. The addresses and data arriving from 0104 are linked together (0701). A FIFO stage for decoupling may be provided between 0104 and 0703 in the interface circuit (0701).

FIG. 7B shows a circuit for reading data, in which an acknowledgment circuit (0702, e.g., FIFO, counter) is provided for coordinating the outgoing addresses with the incoming data. In 0701*a* and/or in 0701*b*, a FIFO stage for decoupling may be provided between 0104 and 0703. If a FIFO stage is provided in 0701 *b*, it may also be used for acknowledgment circuit 0702.

Figure 8:
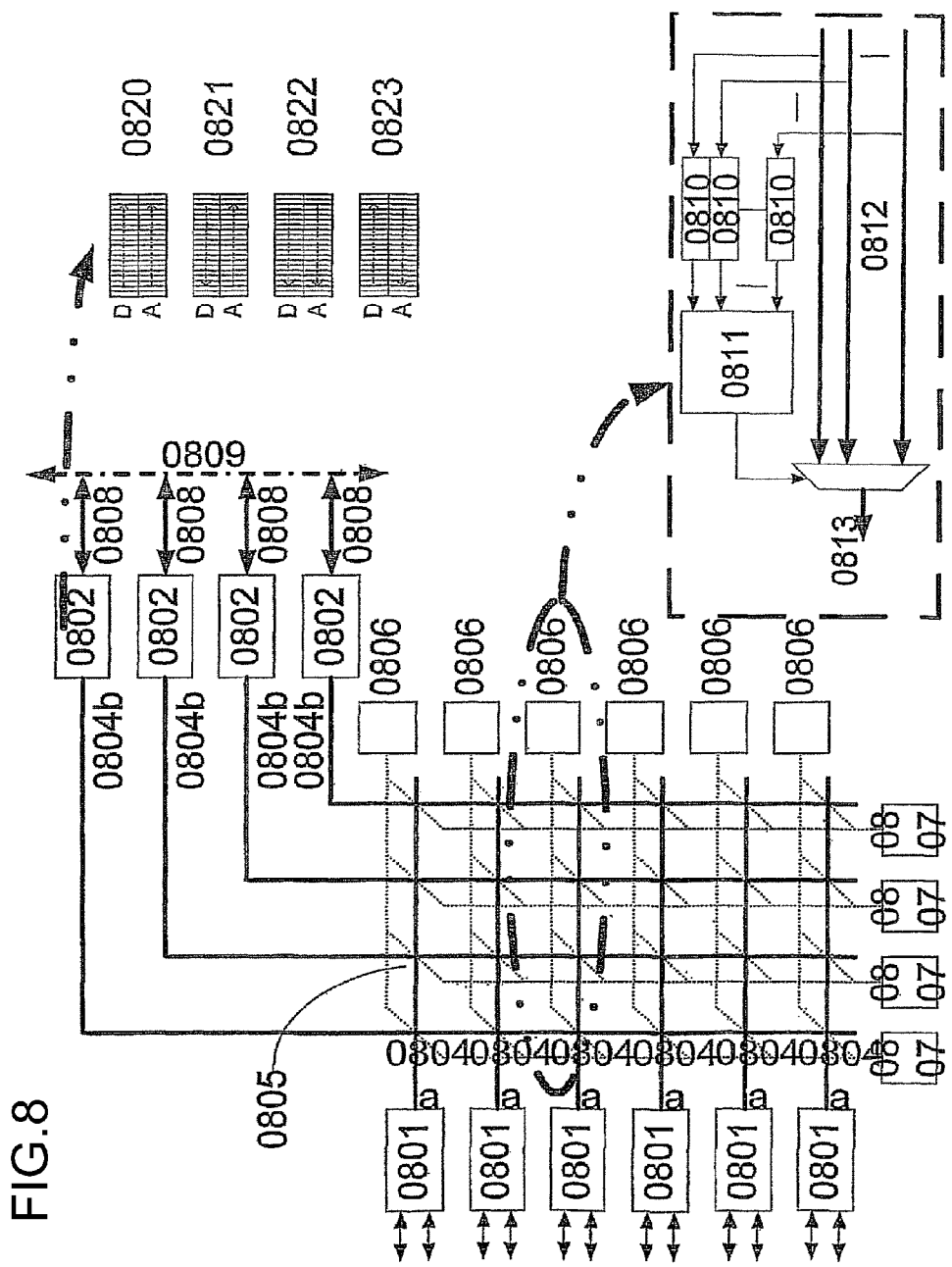
FIG. 8 shows an example connection between interface modules and/or PAEs to numerous and/or other data streams.

FIG. 8 shows a possible connection structure between interface modules and/or PAEs having a dedicated global bus (0801) and protocol converters (0802) to external (main) memories and/or other (peripheral) data streams. Interface modules are connected (0803) to a PA, preferably via their network according to 0104.

A bus system (0804 *a*, 0804 *b*) is provided between interface modules and/or PAEs having a dedicated global bus (0801) and protocol converters (0802). In a preferred embodiment, 0804 is able to transmit pipelined data over a plurality of register stages. 0804 *a* and 0804 *b* are interconnected via switches (e.g., 0805) which are designed as transmission gates and/or tristate buffers and/or multiplexers, for example. The multiplexers are triggered by rows and columns. Triggering units (0806) control the data transfer of the interface modules and/or PAEs having a dedicated global bus (0801) to the protocol converters (0802), i.e., in the transfer direction 0804 *a* to 0804 *b*. Triggering units (0807) control the data transfer of the protocol converters (0802) to the interface modules and/or the PAEs having a dedicated global bus (0801), i.e., in the transfer direction 0804 *b* to 0804 *a*. The triggering units (0806) each decode address areas for selection of the protocol converters (0802); the triggering units (0807) each decode IOIDs for selection of the interface modules and/or PAEs having a dedicated global bus (0801).

Triggering units may operate according to different types of triggering, e.g., fixed connection without decoding; decoding of addresses and/or IOIDs; decoding of addresses and/or IOIDs and arbitration. One or multiple data words/address words may be transmitted per arbitration. Arbitration may be performed according to different rules. The interface modules may preferably have a small FIFO for addresses and/or data in the output direction and/or input direction. A particular arbitration rule preferably arbitrates an interface module having a FULL FIFO or an EMPTY FIFO or a FIFO to be emptied (FLUSH), for example.

Triggering units may be designed as described in German Patent Application No. DE 199 26 538.0 (FIG. 32), for example. These triggering units may be used for 0807 or 0806. When used as 0806, 0812 corresponds to 0804 *a*, and 0813 corresponds to 0804 *b*. When used as 0807, 0812 corresponds to 0804 *b*, and 0813 corresponds to 0804 *a*. Decoders (0810) decode the addresses/IOIDs of the incoming buses (0812) and trigger an arbiter (0811), which in turn switches the incoming buses to an output bus (0813) via a multiplexer.

The protocol converters are coupled to external bus systems (0808), a plurality of protocol converters optionally being connected to the same bus system (0809), so that they are able to utilize the same external resources.

The IO-FIFOs are preferably integrated into the protocol converters, a FIFO (BURST-FIFO) for controlling burst transfers for the external buses (0808) being connected downstream from them if necessary. In a preferred embodiment, an additional FIFO stage (SYNC-FIFO) for synchronizing the outgoing addresses with the incoming data is connected downstream from the FIFOs.

Various programmable/configurable FIFO structures are depicted in 0820-0823, where A indicates the direction of travel of an address FIFO, D indicates the direction of travel of a data FIFO. The direction of data transmission of the FIFOs depends on the direction of data transmission and the mode of operation. If a VPU is operating as a bus master, then data and addresses are transmitted from internally to the external bus in the event of a write access (0820), and in the event of a read access (0821) addresses are transmitted from internally to externally and data from externally to internally.

If a VPU is operating as a bus slave, then data and addresses are transmitted from the external bus to internally in the event of a write access (0822) and in the event of a read access (0823) addresses are transmitted from externally to internally and data is transmitted from internally to externally.

In all data transfers, addresses and/or data and/or IOIDs and/or APIDs may be assigned and also stored in the FIFO stages.

In a particularly preferred embodiment, the transfer rate (operating frequency) of the bus systems 0104, 0804, and 0808/0809 may each be different due to the decoupling of the data transfers by the particular FIFO stages. In particular the external bus systems (0808/0809) may operate at a higher transfer rate, for example, than the internal bus systems (0104) and/or (0804).

Figure 9:
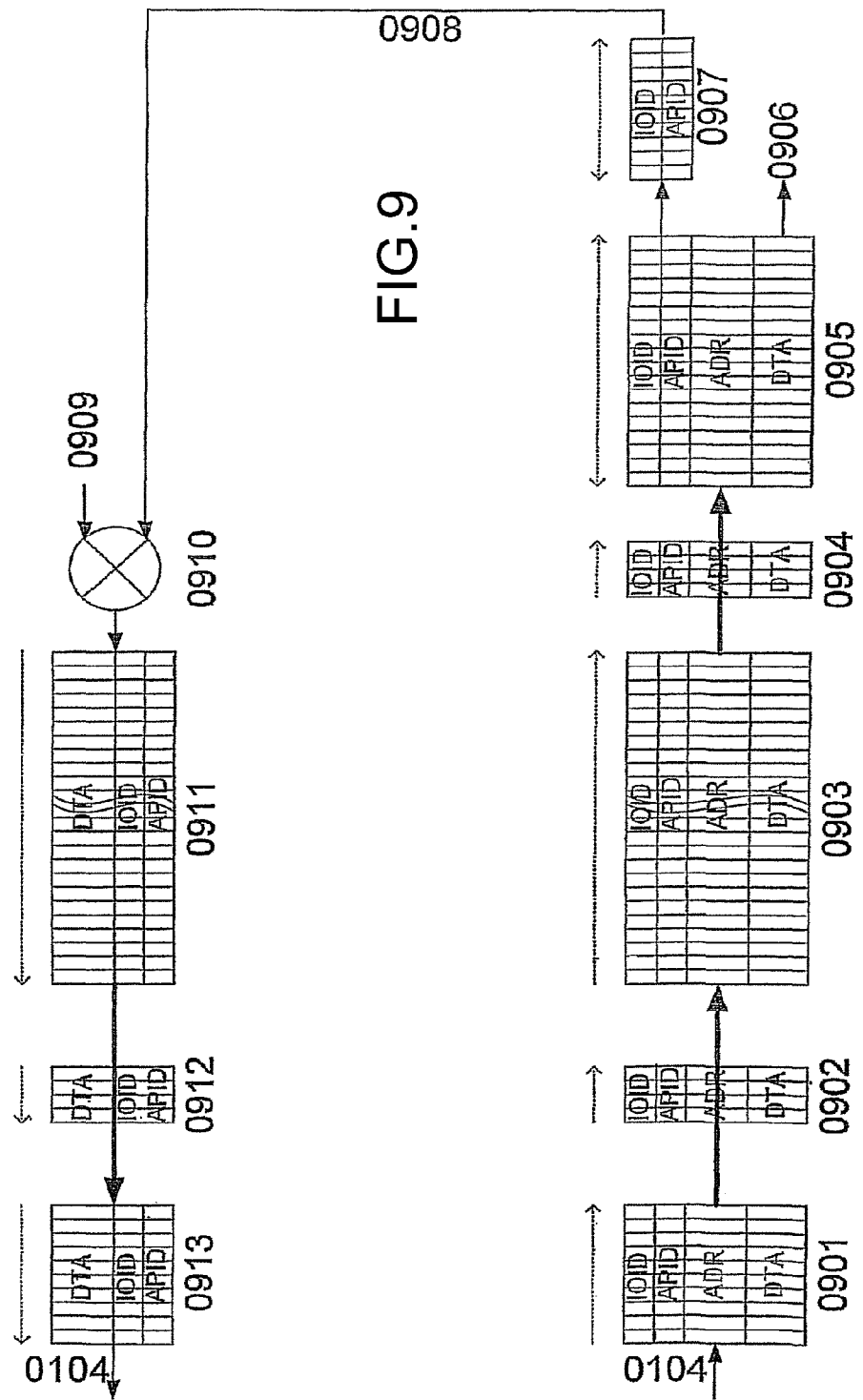
FIG. 9 shows an example sequence of a data read transfer via the circuit of FIG. 8.

FIG. 9 shows a possible sequence of a data read transfer via the circuit according to FIG. 8.

Addresses (preferably identifiers, e.g., with IOIDs and/or APIDs) are transmitted via internal bus system 0104 to interface modules and/or PAEs having a dedicated global bus, which preferably have an internal FIFO (0901). The addresses are transmitted to an IO-FIFO (0903) via a bus system (e.g., 0804) which preferably operates as a pipeline (0902). The addresses are transmitted to a BURST-FIFO (0905) via another bus (0904) which may be designed as a pipeline but which is preferably short and local. The BURST-FIFO ensures correct handling of burst transfers via the external bus system, e.g., for controlling burst addresses and burst sequences and repeating burst cycles when errors occur. IOIDs and/or APIDs of addresses (0906) which are transmitted via the external bus system may be transmitted together with the addresses and/or stored in an additional SYNC-FIFO (0907). The SYNC-FIFO compensates for the latency between the outgoing address (0906) and the incoming data (0909). Incoming data may be assigned IOIDs and/or APIDs (0908) of the addresses referencing them via the SYNC-FIFO (0910). Data (and preferably IOIDs and/or APIDs) is buffered in an IO-FIFO (0911) and is subsequently transmitted via a bus system (e.g., 0804), which preferably functions as a pipeline (0912), to an interface module and/or PAE having a dedicated global bus (0913), preferably including an internal FIFO. Data is transmitted from here to the internal bus system (0104).

Instead of to the IO-FIFO (0911), incoming data may optionally be directed first to a second BURST-FIFO (not shown), which behaves like BURST-FIFO 0905 if burst-error recovery is also necessary in read accesses. Data is subsequently relayed to 0911.

Figure 10:
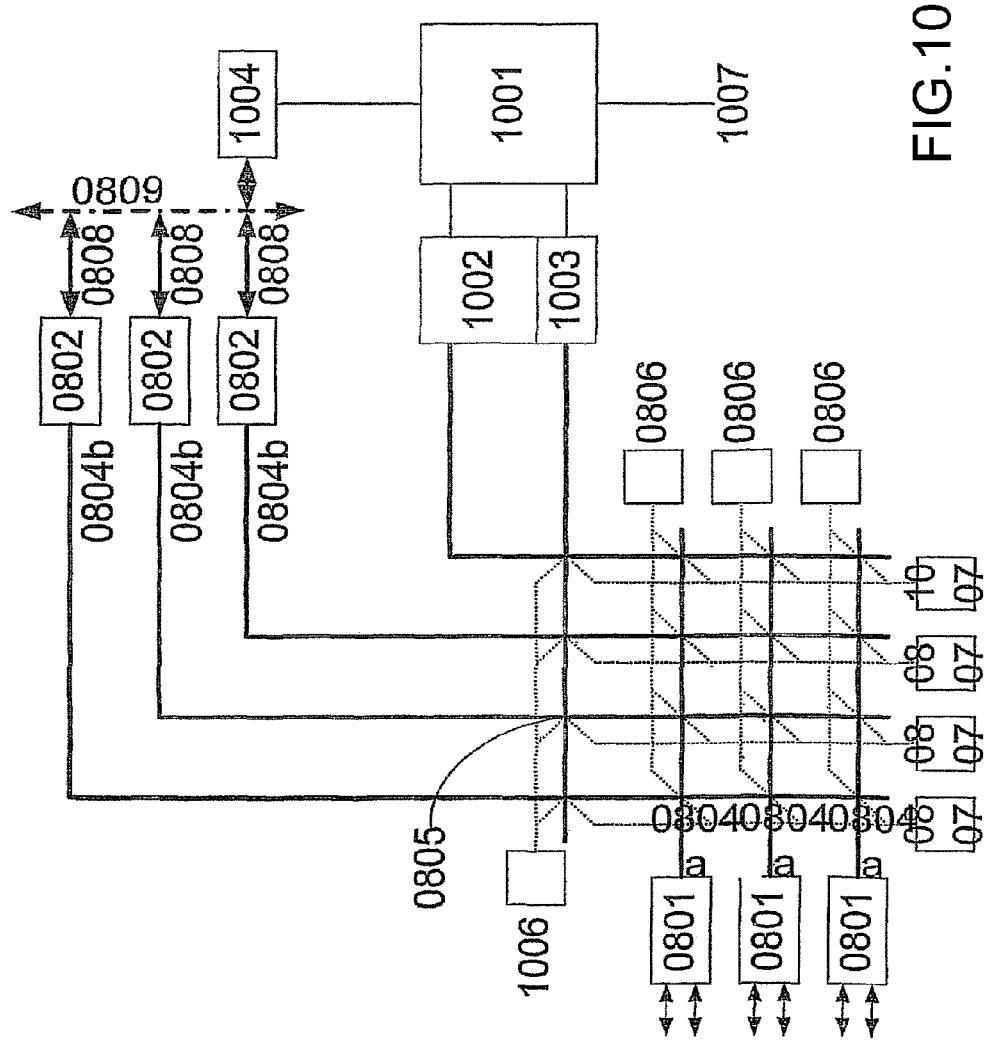
FIG. 10 shows example shows example interface module connections with data input and output via a collector, according to an example embodiment of the present invention.

FIG. 10 corresponds in principle to FIG. 8, which is why the same reference numbers have been used. In this embodiment, which is given as an example, fewer interface modules and/or PAEs having a dedicated global bus (0801) and fewer protocol converters (0802) to external (main) memories and/or other (peripheral) data streams are shown. In addition, a collector (1001) is shown which is connected to bus systems 0804 in such a way that data is written from the interface modules and protocol converters into the collector and/or is read out from the collector. The collector is switched to bus systems 0804 *a* via triggering unit 1007 which corresponds to 0807, and the collector is switched to bus systems 0804 *b* via triggering unit 1006, which corresponds to 0806.

Multiple collectors may be implemented for which multiple triggering units 10021And 10022Are used.

A collector may be segmented into multiple memory areas. Each memory area may operate independently in different memory modes, e.g., as random access memory, FIFO, cache, MMU page, etc.

A translation table (TLB) (1002) may be assigned to a collector to permit an MMU-type mode of operation. Page management may function, e.g., on the basis of segment addresses and/or other identifiers, e.g., APIDs and/or IOIDs.

A DMA or multiple DMAs are preferably assigned to a collector to perform data transfers with external (main) memories and/or other (peripheral) data streams, in particular to automatically permit the MMU function of page management (loading, writing). DMAs may also access the TLB for address translation between external (main) memories and/or other (peripheral) data streams and collector. In one possible mode of operation, DMAs may receive address specifications from the array (PA), e.g., via 0804.

DMAs may be triggered by one or more of the following units: an MMU assigned to the collector, e.g., in the case of page faults; the array (PA); an external bus (e.g., 0809); an external processor; a higher-level loading unit (CT).

Collectors may have access to a dedicated bus interface (1004), preferably DMA-controlled and preferably master/slave capable, including a protocol converter, corresponding to or similar to protocol converters 0802 having access to external (main) memories and/or other (peripheral) data streams.

An external processor may have direct access to collectors (1007).

Figure 11:
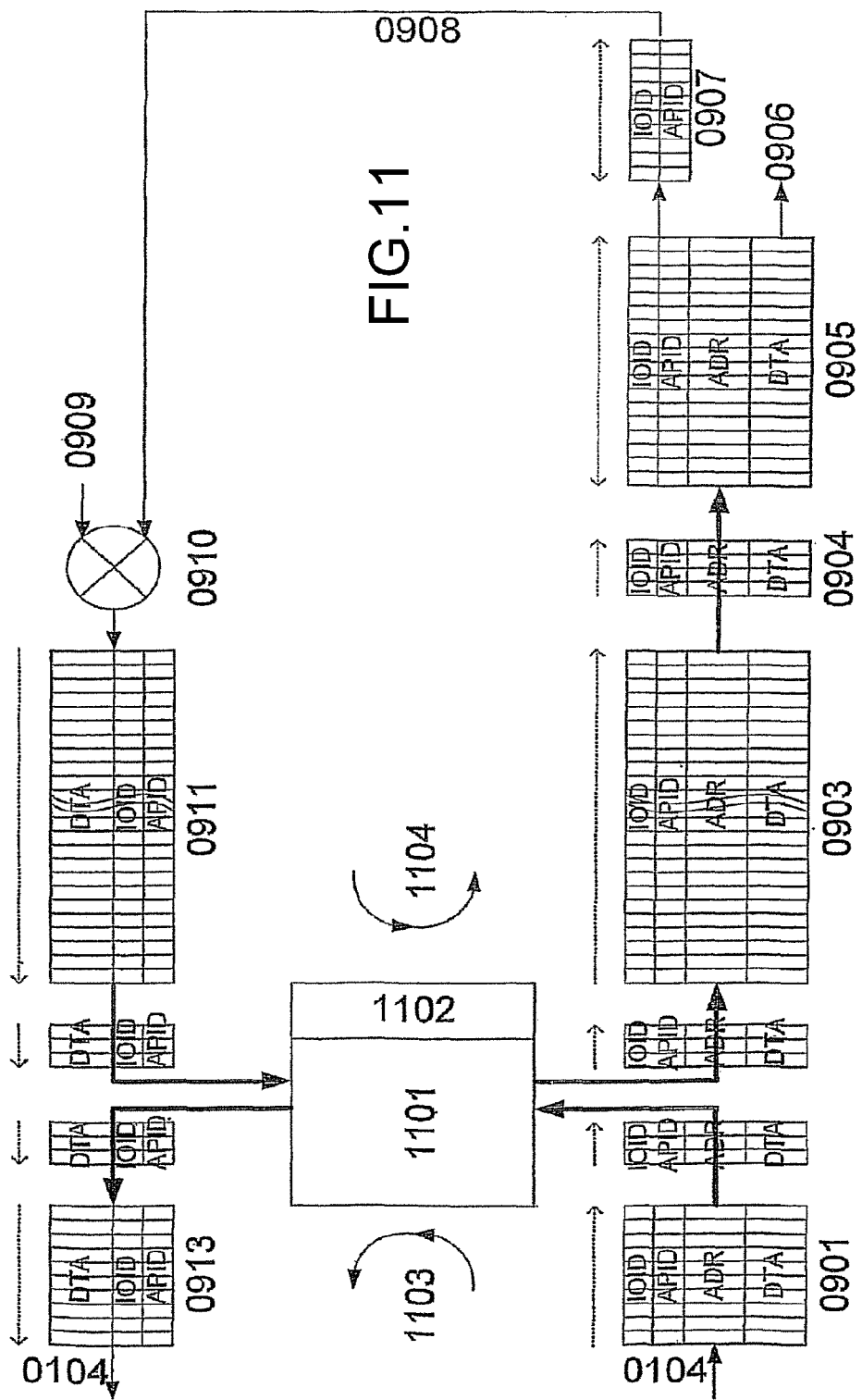
FIG. 11 shows an example sequence of data transfer with a data collector.

FIG. 11 corresponds in principle to FIG. 9, which is why the same reference numbers have been used. A collector (1101) including assigned transfer control (e.g., DMA preferably with TLB) (1102) is integrated into the data stream. The array (PA) now transmits data preferably using the collector (1103), which preferably exchanges data with external (main) memories and/or other (peripheral) data streams (1104), largely automatically and controlled via 1102. The collector preferably functions in a segmented MMU-type mode of operation, where different address areas and/or identifiers such as APIDs and/or IOIDs are assigned to different pages. Preferably 1102 may be controlled by page faults.

Figure 12:
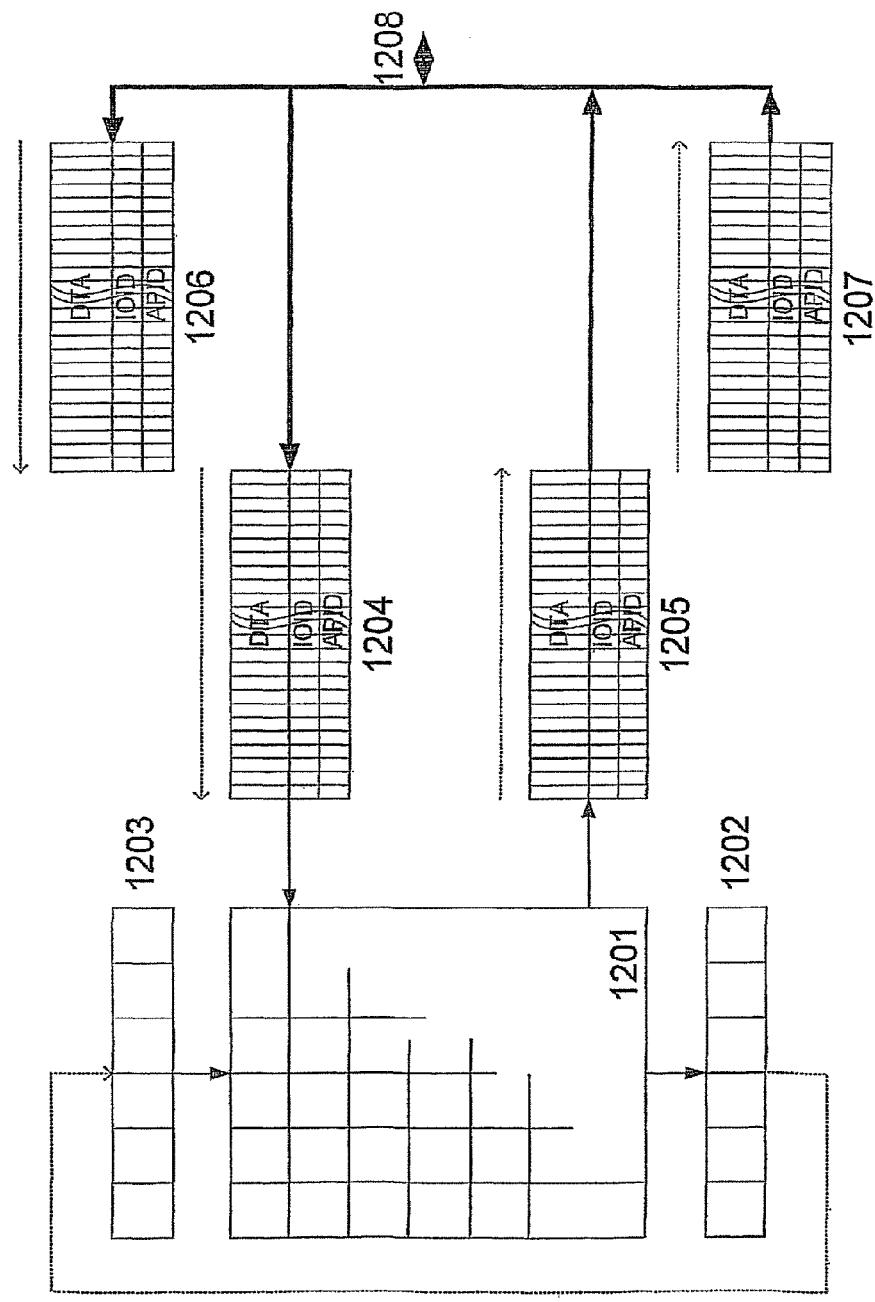
FIG. 12 shows a flow of data transfers for different applications, according to an example embodiment of the present invention.

FIG. 12 shows a flow chart of data transfers for different applications. An array (PA) processes data according to the method described in German Patent Application No. DE 196 54 846.2 by storing operands and results in memories 1202 and 1203. In addition, a data input channel (1204) and a data output channel (1205) are assigned to the PA, through which the operands and/or results are loaded and/or stored. The channels may lead to external (main) memories and/or other (peripheral) data streams (1208). The channels may include internal FIFO stages and/or PAE-RAMs/PAE-RAM pages and/or collectors/collector pages. The addresses (CURR-ADR) may be computed currently by a configuration running in 1201 and/or may be computed in advance and/or computed by DMA operations of a (1003). In particular, an address computation within 1201 (CURR-ADR) may be sent to a collector or its DMA to address and control the data transfers of the collector. The data input channel may be preloaded by a configuration previously executed on 1201.

The channels preferably function in a FIFO-like mode of operation to perform data transfers with 1208.

In the example depicted here, a channel (1207), which has been filled by a previous configuration or application, is still being written to 1208 during data processing within 1201 described here. This channel may also include internal FIFO stages and/or PAE-RAMs/PAE-RAM pages and/or collectors/collector pages. The addresses may be computed currently by a configuration (OADR-CONF) running in parallel in 1201 and/or computed in advance and/or computed by DMA operations of a (1003). In particular, an address computation within 1201 (OADR-CONF) may be sent to a collector or its DMA to address and control the data transfers of the collector.

In addition, data for a subsequent configuration or application is simultaneously loaded into another channel (1206). This channel too may include internal FIFO stages and/or PAE-RAMs/PAE-RAM pages and/or collectors/collector pages. The addresses may be computed currently by a configuration (IADR-CONF) running in parallel in 1201 and/or computed in advance and/or computed by DMA operations of a (1003). In particular, an address computation within 1201 (IADR-CONF) may be sent to a collector or its DMA to address and control the data transfers of the collector. Individual entries into the particular channels may have different identifiers, e.g., IOIDs and/or APIDs, enabling them to be assigned to a certain resource and/or memory location.

Figure 13A:
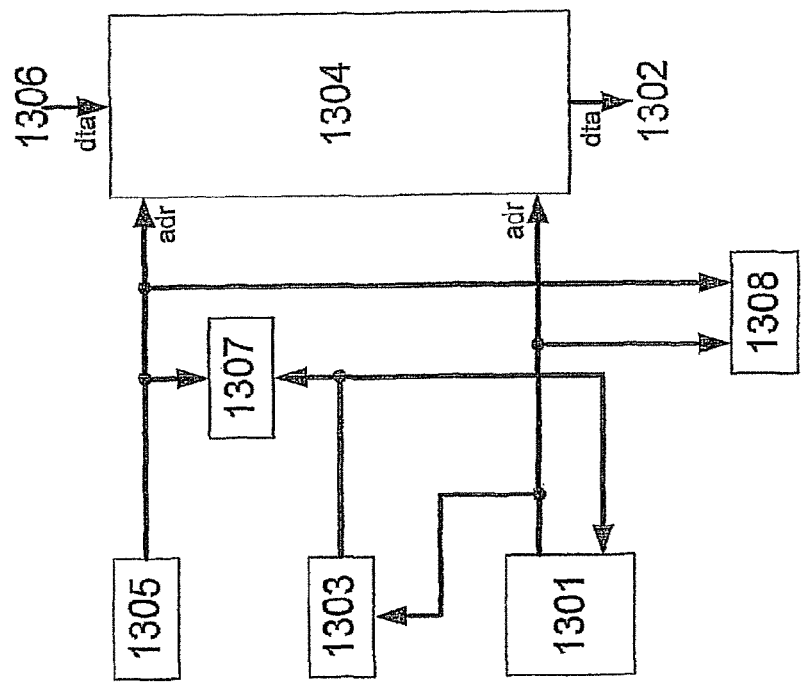
FIG. 13A shows a BURST-FIFO according to an example embodiment of the present invention.

FIG. 13A shows a preferred implementation of a BURST-FIFO.

The function of an output FIFO which transmits its values to a burst-capable bus (BBUS) is to be described first. A first pointer (1301) points to the data entry within a memory (1304) currently to be output to the BBUS. With each data word output (1302), 1301 is moved by one position. The value of pointer 1301 prior to the start of the current burst transfer has been stored in a register (1303). If an error occurs during the burst transfer, 1301 is reloaded with the original value from 1303 and the burst transfer is restarted.

A second pointer (1305) points to the current data input position in the memory (1304) for data to be input (1306). To prevent overwriting of any data still needed in the event of an error, pointer 1305 is compared (1307) with register 1303 to indicate that the BURST-FIFO is full. The empty state of the BURST-FIFO may be ascertained by comparison (1308) of the output pointer (1301) with the input pointer (1305).

If the BURST-FIFO operates for input data from a burst transfer, the functions change as follows:

1301 becomes the input pointer for data 1306. If faulty data has been transmitted during the burst transfer, the position prior to the burst transfer is stored in 1303. If an error occurs during the burst transfer, 1301 is reloaded with the original value from 1303 and the burst transfer is restarted.

The pointer points to the readout position of the BURST-FIFO for reading out the data (1302). To prevent premature readout of data of a burst transfer that has not been concluded correctly, 1305 is compared with the position stored in 1303 (1307) to indicate an empty BURST-FIFO. A full BURST-FIFO is recognized by comparison (1308) of input pointer 1301 with the output pointer (1305).

Figure 13B:
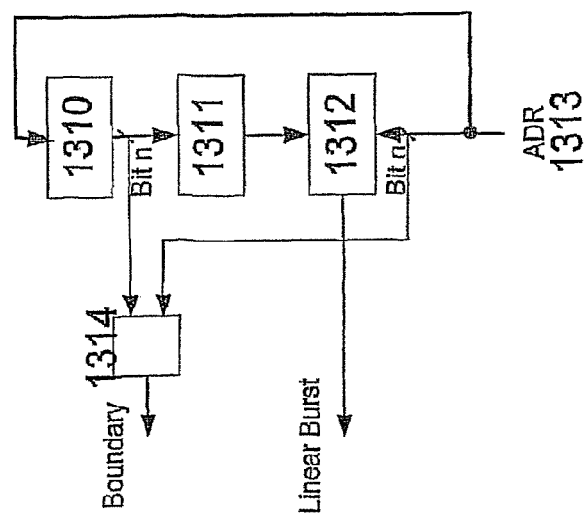
FIG. 13B shows a burst circuit according to an example embodiment of the present invention.

FIG. 13B shows one possible implementation of a burst circuit which recognizes possible burst transfers and tests boundary limits. The implementation has been kept simple and recognizes only linear address sequences. Data transfers are basically started as burst transfers. The burst transfer is aborted at the first nonlinear address. Burst transfers of a certain length (e.g., 4) may also be detected and initialized by expanding a look-ahead logic, which checks multiple addresses in advance.

The address value (1313) of a first access is stored in a register (1310). The address value of a subsequent data transfer is compared (1312) with the address value (1311) of 1310, which has been incremented by the address difference between the first data transfer and the second data transfer of the burst transfer (typically one word wide). If the two values are the same, then the difference between the first address and the second address corresponds to the address difference of the burst transfer between two burst addresses. Thus, this is a correct burst. If the values are not the same, the burst transfer must be aborted.

The last address (1313) checked (the second address in the writing) is stored in 1325And then compared with the next address (1313) accordingly.

To ascertain whether the burst limits (boundaries) have been maintained, the address bit(s) at which the boundary of the current address value (1313) is located is (are) compared with the address bits of the preceding address value (1310) (e.g., XOR 1314). If the address bits are not the same, the boundary has been exceeded and the control of the burst must respond accordingly (e.g., termination of the burst transfer and restart).

FIG. 14 shows as an example various methods of connecting memories, in particular PAE-RAMS, to form a larger cohesive memory block.

FIGS. 14A-14D use the same reference numbers whenever possible.

Write data (1401) is preferably sent to the memories via pipeline stages (1402). Read data (1403) is preferably removed from the memories also via pipeline stages (1404). Pipeline stage 1404 includes a multiplexer, which forwards the particular active data path. The active data path may be recognized, for example, by a RDY handshake applied.

A unit (RangeCheck, 1405) for monitoring the addresses (1406) for correct values within the address space may optionally be provided.

In FIG. 14A, the addresses are sent to the memories (1408 *a*) via pipeline stages (14022A). The memories compare the higher-value address part with a fixedly predetermined or configurable (e.g., by a higher-level configuration unit CT) reference address, which is unique for each memory. If they are identical, that memory is selected. The lower-value address part is used for selection of the memory location in the memory.

In FIG. 14B, the addresses are sent to the memories (1408 *b*) via pipeline stages having an integrated decrementer (subtraction by 1) (14022B). The memories compare the higher-value address part with the value zero. If they are identical, that memory is selected. The lower-value address part is used for selection of the memory location in the memory.

In FIG. 14C, the addresses are sent to the memories (1408 *c*) via pipeline stages (14022C). The memories compare the higher-level address part with a reference address, which is unique for each memory. The reference address is generated by an adding or subtracting chain (1409), which preselects another unique reference address for each memory on the basis of a starting value (typically 0). If they are identical, that memory is selected. The lower-value address part is used for selection of the memory location in the memory.

In FIG. 14D, the addresses are sent to the memories (1408 *d*) via pipeline stages (1407 *d*). The memories compare the higher-value address part with a reference address which is unique for each memory. The reference address is generated by an addressing or subtracting chain (1410), which is integrated into the memories and preselects another unique reference address for each memory on the basis of a starting value (typically 0). If they are identical, that memory is selected. The lower-value address part is used for selection of the memory location in the memory.

For example, FREGs of the PAEs according to FIG. 5 may be used for 1402, 1404, and 1407. Depending on the direction of travel of the reference address, FREG or BREG may be used for 1409. The design shown here as an example has the advantage in particular that all the read/write accesses have the same latency because the addresses and data are sent to the BREG/FREG via register stages.

Figure 15:
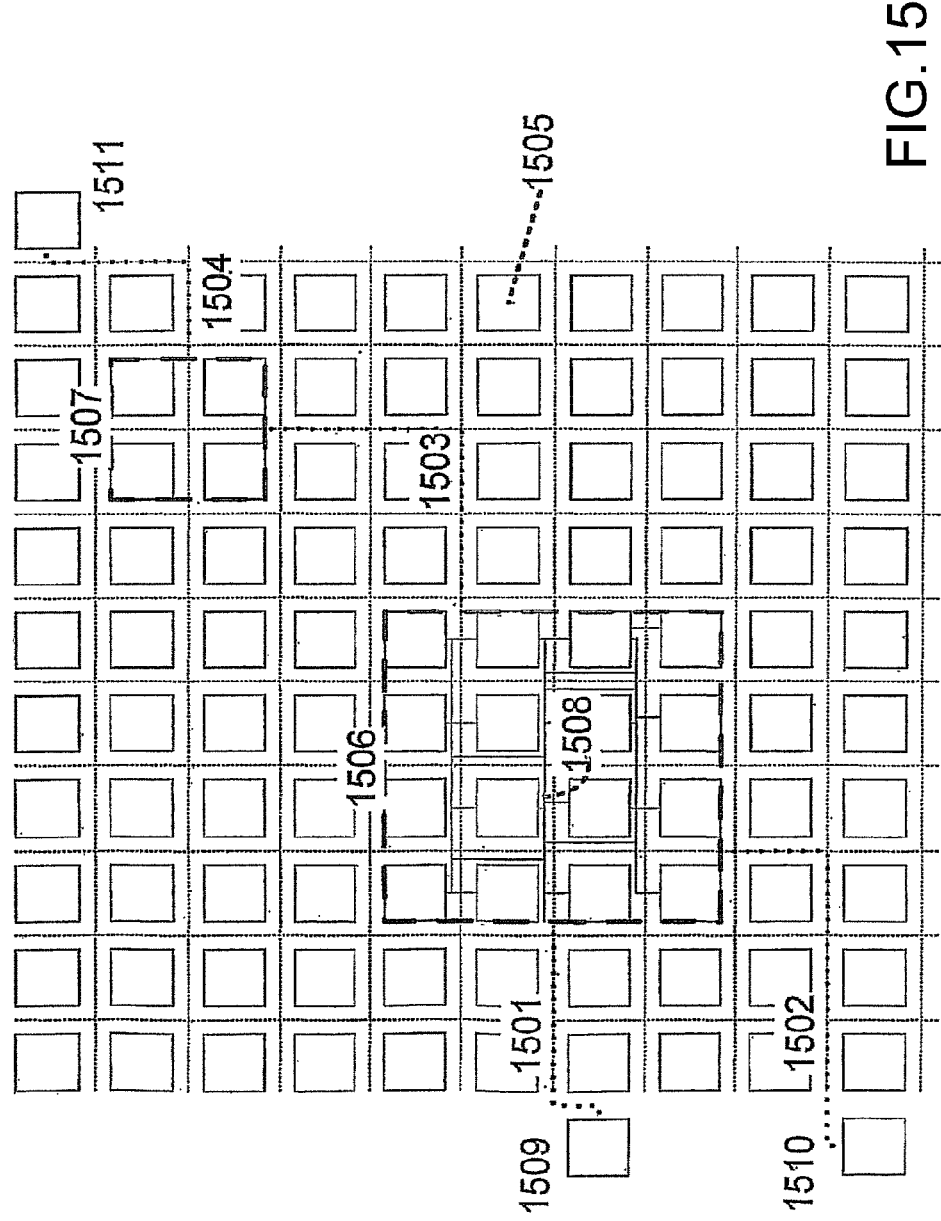
FIG. 15 shows configuration couplings according to an example embodiment of the present invention.

FIG. 15 shows the use of GlobalTrack bus systems (1501, 1502, 1503, 1504) for coupling configurations which were configured in any way as configuration macros (1506, 1507) within a system of PAEs (1505) (see also DE 198 07 872.2, DE 199 26 538.0, DE 100 28 397.7). The configuration macros have (1508) their own internal bus connections, e.g., via internal buses (0104). The configuration macros are interconnected via 1503 for data exchange. 1506 is connected to interface modules and/or local memories (RAM-PAEs) (1509, 1510) via 1501, 1502. 1507 is connected to interface modules and/or local memories (RAM-PAEs) (1511) via 1504.

Referencing FIGS. 16A-31C:

The configurable cells of a VPU must be synchronized for the proper processing of data. Two different protocols are used for this purpose; one for the synchronization of the data traffic and another one for sequence control of the data processing. Data is preferably transmitted via a plurality of configurable bus systems. Configurable bus system means in particular that any PAEs transmit data and the connection to the receiving PAEs and the receiving PAEs themselves in particular are configurable in any desired manner.

The data traffic is preferably synchronized using handshake protocols, which are transmitted with the data. In the following description, simple handshakes as well as complex procedures are described, whose preferred use depends on the particular application to be executed or the amount of applications.

Sequence control takes place via signals (triggers) which indicate the status of a PAE. Triggers may be transmitted independently of the data via freely configurable bus systems, i.e., they may have different transmitters and/or receivers and preferably also have handshake protocols. Triggers are generated by a status of a transmitting PAE (e.g., zero flag, overflow flag, negative flag) by relaying individual states or combinations.

Data processing cells (PAEs) within a VPU may assume different processing states, which depend on the configuration status of the cells and/or incoming or received triggers:
"not configured":
no data processing
"configured":
GO all incoming data is computed.
STOP incoming data is not computed.
STEP one computation is performed.
GO, STOP, and STEP are triggered by the triggers described below:

Handshake Synchronization

A particularly simple yet powerful handshake protocol, which is preferably used when transmitting data and triggers, is described in the following. The control of the handshake protocol is preferably hard-wired in the hardware and may be an important component of a VPU's data processing paradigm. The principles of this protocol have been described in PACT02.

A RDY signal which indicates the validity of the information is also transmitted with each piece of information transmitted by a transmitter via any bus.

The receiver only processes information that is provided with a RDY signal; all other information is ignored.

As soon as the information has been processed by the receiver and the receiver is able to receive new information, it indicates, by sending an acknowledgment signal (ACK) to the transmitter, that the transmitter may transmit new information. The transmitter always waits for the arrival of ACK before it sends data again.

A distinction is made between two operating modes:
a) "dependent": All inputs that receive information must have a valid RDY before the information is processed. Then ACK is generated.
b) "independent": as soon as an input that receives information has a valid RDY, an ACK is generated for this particular input if the input is able to receive data, i.e., the preceding data has been processed; otherwise it waits for the data to be processed.

Data processing synchronization and control may be performed according to the related art via a hardwired state machine (see PACT02), a state machine having a fine-grained configuration (see PACT01, PACT04) or, preferably, via a programmable sequencer (PACT13). The programmable state machine is configured according to the sequence to be executed. Altera's EPS448 module (ALTERA Data Book 1993) implements such a programmable sequencer, for example.

One particular function of handshake protocols for VPUs is the performance of pipeline-type data processing, in which in each cycle data may be processed in each PARE in particular. This requirement results in particular demands on the operation of the handshakes. The problem and the achievement of this object are shown using the example of a RDY/ACK protocol:

FIG. 16A shows a configuration of a pipeline within a VPU. The data is sent via (preferably configurable) bus systems (0107, 0108, 0109) to registers (0101, 0104), which have an optionally data processing logic (0102, 0105) connected downstream. The logic has an associated output stage (0103, 0106), which preferably also has a register for sending the results to a bus again. The RDY/ACK synchronization protocol is preferably transmitted both via the bus systems (0107, 0108, 0109) and via the data processing logic (0102, 0105).

The two meanings of the terms of the RDY/ACK protocol are as follows:
a) ACK means "receiver will receive data," having the effect that the pipeline operates in each cycle. However, the problem arises that due to the hard-wiring, in the event of a pipeline stall, the ACK runs asynchronously through all the stopped stages of the pipeline. This results in considerable timing problems, in particular in the case of large VPUs and/or high clock frequencies.
b) ACK means "receiver has received data," having the effect that the ACK always runs only to the next stage where there is a register. The problem that arises here is that the pipeline only operates in every other cycle due to the delay of the register that is required in the hardwired implementation.

Herein, both meanings are combined as shown in FIG. 16B, which illustrates a section of stages 0101 through 0103. Protocol b) is used on bus systems (0107, 0108, 0109) in that a register (0110) delays the incoming RDY by one cycle by writing the transmitted data into an input register, and relays it again onto the bus as an ACK. This stage (0110) operates almost as a protocol converter between a bus protocol and the protocol within a data processing logic.

The data processing logic uses protocol a), which is generated by a downstream protocol converter (0111). The 0111 unit has the distinguishing feature that a preliminary statement must be made about whether the incoming data from the data processing logic is actually also received by the bus system. This is accomplished by introducing an additional buffer register (0112) in the output stages (0103, 0106) for the data to be transmitted to the bus system. The data generated by the data processing logic is written to the bus system and into the buffer register at the same time. If the bus is unable to receive the data, i.e., no ACK is sent by the bus system, the data is stored in the buffer register and is sent to the bus system via a multiplexer (0113) as soon as the bus system is ready. If the bus system is immediately ready to receive the data, the data is relayed directly to the bus via the multiplexer (0113). The buffer register enables acknowledgment in the meaning a), because acknowledgment may be sent using "receiver will receive data" as long as the buffer register is empty, because writing into the buffer register ensures that the data is not lost.

Triggers

Triggers, whose operating principles are described in PACT08, are used in VPU modules for transmitting simple information. Triggers are transmitted using a unidimensional or multidimensional bus system divided into segments. The individual segments may be equipped with drivers for improving the signal quality. The particular trigger connections, which are implemented by the interconnection of various segments, are programmed by the user and configured via the CT.

Triggers for example transmit mainly, but not exclusively, the following information or any possible combinations thereof:

Status information of arithmetic units (ALUs), such as
carry
division by zero
zero
negative
underflow/overflow
Results of comparisons and/or loops
n bit information (for small n)
Interrupt requests generated internally or externally.

Triggers are generated by any cells and are activated by any events in the individual cells. In particular, triggers may be generated by a CT or an external unit located outside the cell array or the module.

Triggers are received by any cells and analyzed by any possible method. In particular, triggers may by analyzed by a CT or an external unit located outside the cell array or the module.

Triggers are mainly used for sequence control within a VPU, for example, for comparisons and/or loops. Data paths and/or branchings may be enabled or disabled by triggers.

Another important area of application of triggers is the synchronization and activation of sequences and their information exchange, as well as the control of data processing in the cells.

Triggers may be managed and data processing may be controlled according to the related art by a hardwired state machine (see PACT02, PACT08), a state machine having a fine-grained configuration (see PACT01, PACT04, PACT08), (Chameleon), or preferably by a programmable state machine (PACT13). The programmable state machine is configured in accordance with the sequence to be executed. Altera's EPS448 module (ALTERA Data Book 1993) implements such a programmable sequencer, for example.

Basic Method

The simple synchronization method using RDY/ACK protocols makes the processing of complex data streams difficult, because observing the correct sequence ties up considerable resources. The correct implementation is the programmer's responsibility. Additional resources are also required for the implementation.

In the following, a simple method for achieving this object is described.

1:n Transmission

This case is trivial: The transmitter writes the data onto the bus. The data is stable on the bus until the ACK is received as acknowledgment from all receivers (the data "resides"). RDY is pulsed, i.e., is applied for one cycle to prevent the data from being incorrectly read multiple times. Since RDY activates multiplexers and/or gates and/or other appropriate transmission elements which control the data transfer depending on the implementation, this activation is stored (RdyHold) for the time of the data transmission. This causes the position of gates and/or multiplexers and/or other appropriate transmission elements to remain valid even after the RDY pulse and thus valid data to remain on the bus.

As soon as a receiver has received the data, it acknowledges using an ACK (see PACT02). It should be mentioned again that the correct data remains on the bus until it is received by the receiver(s). ACK is also preferably transmitted as a pulse. If an ACK passes through a multiplexer and/or gate, and/or another appropriate transmission element in which RDY was previously used for storing the activation (see RdyHold), this activation is now cleared.

To transmit 1:n, it may be advisable to hold ACK, i.e., to use no pulsed ACK, until a new RDY is received, i.e., ACK also "resides." The ACKs received are AND-gated at each bus node representing a branching to a plurality of receivers. Since the ACKs "reside," a "residing" ACK which represents the ACKs of all receivers remains at the transmitter. In order to keep the running time of the ACK chain through the AND gate as low as possible, it is recommended that a tree-shaped configuration be chosen or generated during the routing of the program to be executed.

Residing ACKs may cause, depending on the implementation, the problem that RDY signals for which there was actually no ACK are ACK-ed because an old ACK resided for too long. One way of avoiding this problem is to basically pulse ACK and to store the incoming ACK of each branch at a branching. An ACK pulse is not relayed toward the transmitter and all stored ACKs (AckHold) and possibly the RdyHolds are not cleared until the ACKs of all branches have been received.

FIG. 16C shows the principle of the example method. A transmitter 0120 transmits data via a bus system 0121 together with a RDY 0122. A plurality of receivers (0123, 0124, 0125, 0126) receive the data and the particular RDY (0122). Each receiver generates an ACK (0127, 0128, 0129, 0130), which are gated via an appropriate boolean logic (0131, 0132, 0133), for example a logical AND function, and sent to the transmitter (0134).

FIG. 16D shows one possible example embodiment having two receivers (a, b). An output stage (0103) transmits data and the associated (in this case pulsed) RDY (0131). RdyHold stages (0130) upstream from the target PAEs translate the pulsed RDY into a residing RDY. In this example, a residing RDY should have the boolean value b'1. The contents of all RdyHold stages are returned to 0103 via a chain of logical OR functions (0133). If a target PAE acknowledges the receipt of data, the corresponding RdyHold stage is only reset by the incoming ACK (0134). Thus, the meaning of the returned signal is b'1="some PAE or other has not received the data." As soon as all RdyHold stages have been reset, the information b'0="all PAEs have received the data" is received by 0103 via the OR chain (0133), which is evaluated as ACK. The outputs (0132) of the RdyHold stages may also be used for activating bus switches as described previously.

A logical b'0 is supplied to the last input of an OR chain to ensure proper operation of the chain.

n:1 Transmission

This case is relatively complex. (F1) On the one hand, a plurality of transmitters must be multiplexed onto one receiver; (F2) on the other hand, the time sequence of the transmissions must generally be observed. In the following, several methods are described to achieve this object. It should be pointed out that in principle no method is to be preferred. Rather, the most suitable method should be selected according to the system and the algorithms to be executed from the point of view of programmability, complexity, and cost.

A simple n:1 transmission may be implemented by connecting a plurality of data paths to the inputs of each PAE. The PAEs are configured as multiplexer stages. Incoming triggers control the multiplexer and select one of the plurality of data paths. If necessary, tree structures may be constructed from PAEs configured as multiplexers to merge a plurality of data streams (large n). The example method requires special attention on the programmer's part to ensure correct chronological sorting of the different data streams. In particular, all data paths should have the same length and/or delay to ensure the correct sequence of the data.

Other effective methods for merging are described below: Since F1 seems to be easily implementable using any arbiter and a downstream multiplexer, the discussion begins with F2.

Figure 17:
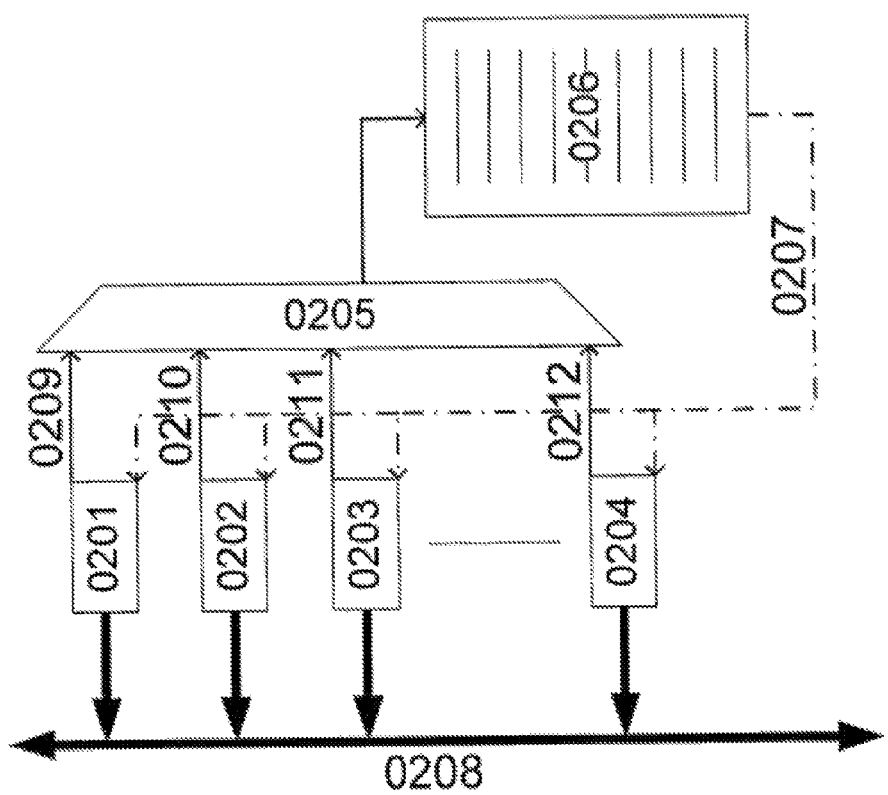
FIG. 17 shows a first embodiment of implementation.
Figure 18:
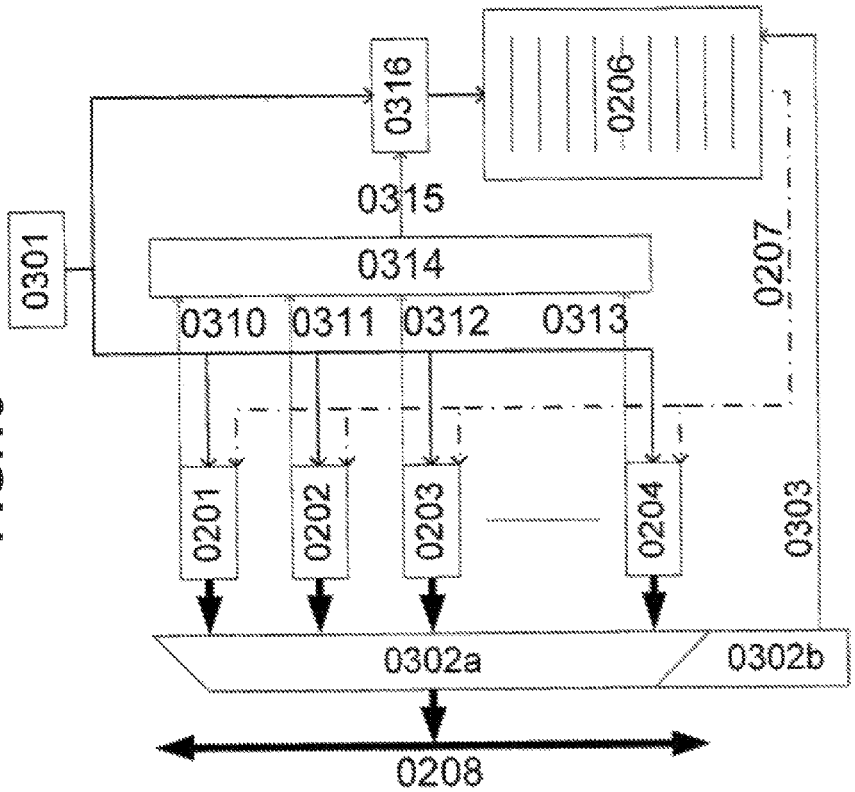
FIG. 18 shows an implementation with a plurality of transmitters.

The time sequence cannot be observed using simple arbiters. FIG. 17 shows a first possible example of implementation. A FIFO (0206) is used to store on a bus system (0208) and execute the time sequences of transmission requests correctly. For this purpose, a unique number representing its address is assigned to each transmitter (0201, 0202, 0203, 0204). Each transmitter requests a data transmission to bus system 0208 by displaying its address on a bus (0209, 0210, 0211, 0212). The particular addresses are stored in a FIFO (0206) via a multiplexer (0205) according to the sequence of the transmission requests. The FIFO is executed step-by-step, and the address of the particular FIFO entry is displayed on another bus (0207). This bus addresses the transmitters and the transmitter having the corresponding address receives access to bus 0208. The internal memories of the VPU technology may be used, for example, as FIFO for such a procedure (see PACT04, PACT13).

However, on closer examination, the following problem may arise: as soon as a plurality of transmitters wish to access the bus, one transmitter must be selected whose address is then stored in the FIFO. In the next cycle, the next transmitter is then selected, and so forth. The selection may take place via an arbiter (0205). This eliminates the simultaneity, which however generally represents no problem. For real time applications, a prioritizing arbiter might be used. The method, however, fails because of this simple reason: At time t, three transmitters S1, S2, S3 request receiver E. S1 is stored at t, S2 is stored at t+1, and S3 is stored at t+2. However, at t+1 S4 and S5, at t+2 also S21 And again S1 request the receiver. Because the new requests overlap with the old ones, processing very quickly becomes extremely complex and requires considerable additional hardware resources.

Thus, the example method shown in FIG. 17 may be used for simple n:1, which, if possible, have no simultaneous bus requests.

According to this discussion, it may be advisable not to store one transmitter per cycle, but the set of all transmitters that request the transmission in a given cycle. In the following cycle, the new set is then stored. If several transmitters request the transmission in the same cycle, these are arbitrated at the time the memory is processed.

Storing a plurality of transmitter addresses at the same time may be very complicated. A simple implementation is achieved by the following example embodiment in FIG. 18:

An additional counter (REQCNT, 0301) counts the number of cycles T. Each transmitter (0201, 0202, 0203, 0204) which requests the transmission at cycle t stores the value of REQCNT (REQCNT(t)) at cycle t as its address.

Each transmitter which requests the transmission at cycle t+1 stores the value of REQCNT (REQCNT(t+1)) at cycle t+1 as its address.

. . . .

Each transmitter which requests the transmission at cycle t+n stores the value of REQCNT (REQCNT(t+n)) at cycle t+n as its address.

The FIFO (0206) stores the values of REQCNT(tb) at a given cycle tb.

The FIFO displays a stored value of REQCNT as a transmission request on a separate bus (0207). Each transmitter compares this value with the one it has stored. If the values are identical, it transmits the data. If a plurality of transmitters have the same value, i.e., simultaneously wish to transmit data, the transmission is now arbitrated by a suitable arbiter (CHNARB, 0302 b) and sent to the bus by a multiplexer (0302 a) activated by the arbiter. A possible exemplary embodiment of the arbiter is described in the following.

If no transmitter responds to a REQCNT value, i.e., the arbiter has no more bus requests for arbitration (0303), the FIFO switches to the next value. If the FIFO has no more valid entries (empty), the values are identified as invalid to prevent erroneous bus access.

In a preferred embodiment, only those values of REQCNT are stored in the FIFO (0206) for which there was a bus request of a transmitter (0201, 0202, 0203, 0204). For this purpose, each transmitter signals its bus request (0310, 0311, 0312, 0313), which are logic gated (0314), e.g., by an OR function. The resulting transmission request of all transmitters (0315) is supplied to a gate (0316) which supplies only those REQCNT values to the FIFO (0206) at which there was an actual bus request.

Figure 19:
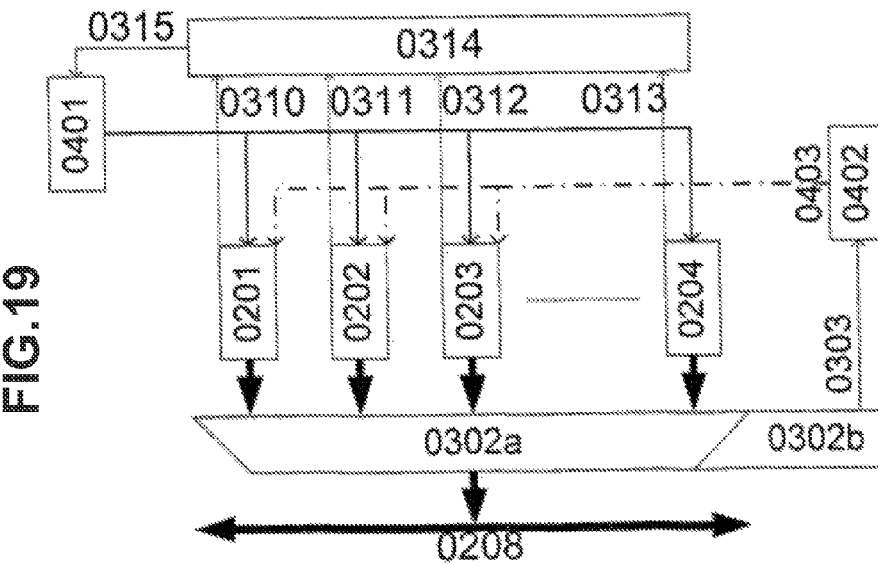
FIG. 19 shows an example embodiment of the present invention.

The above-described procedure may be further optimized according to an example embodiment corresponding to FIG. 19 as follows: A linear sequence of values (REQCNT(tb)) is generated by REQCNT (0410) if, instead of all cycles t, only those cycles are counted in which there is a bus request by a transmitter (0315). The FIFO is now replaceable by a simple counter (SNDCNT, 0402), which now also counts linearly and whose value (0403) enables the particular transmitters according to 0207, due to the linear sequence of values, generated by REQCNT, which now has no gaps. SNDCNT continues to increment as long as no transmitter responds to the value from SNDCNT. As soon as the value of REQCNT is identical to the value of SNDCNT, SNDCNT stops counting, since the last value has been reached.

It is true for all implementations that the maximum required width of REQCNT is equal to $\log_2$(number_of_transmitters). When the largest possible value is exceeded, REQCNT and SNDCNT restart at the minimum value (usually 0).

Arbiters

A plurality of arbiters may be used as CHNARB according to the related art. Depending on the application, prioritized or unprioritized arbiters may be better suited, prioritized arbiters having the advantage that they are able to give preference to certain tasks for real time tasks.

A serial arbiter, which is implementable in the VPU technology in a particularly simple and resource-saving manner, is described in the following. In addition, the arbiter offers the advantage of working in a prioritizing mode, which permits preferred processing of certain transmissions.

A possible basic configuration of a bus system is initially described in FIG. 20. Modules of the generic VPU type have a network of parallel data bus systems (0502), each PAE having connection to at least one data bus for data transmission. A network is usually made up of a plurality of equivalent parallel data buses (0502); each data bus may be configured for one data transmission. The remaining data buses may be freely available for other data transmissions.

It should be furthermore mentioned that the data buses may be segmented, i.e., using configuration (0521) a bus segment (0502) may be switched through to the adjacent bus segment (0522) via gates (G). The gates (G) may be made up of transmission gates and preferably have signal amplifiers and/or registers.

A PAE (0501) preferably picks up data from one of the buses (0502) via multiplexers (0503) or a comparable circuit. The enabling of the multiplex system is configurable (0504).

The data (results) generated by a PAE are preferably supplied to a bus (0502) via a similar independently configurable (0505) multiplexer circuit.

The circuit described in FIG. 20 is labeled using bus nodes.

Figure 21A:
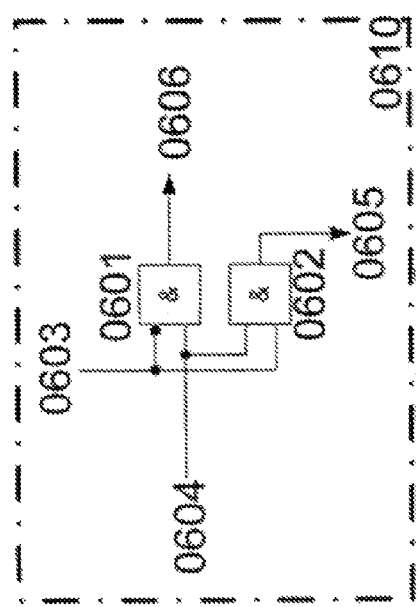
FIGS. 21A and 21B shows and example of a simple arbiter for a bus node.

A simple arbiter for a bus node may be implemented as illustrated in FIG. 21A as follows:

Basic element 0610 of a simple serial arbiter may be made up by two AND gates (0601, 0602), FIG. 21A. The basic element has an input (RDY, 0603) through which an input bus shows that it is transmitting data and requesting an enable to the receiver bus. Another input (ACTIVATE, 0604) which in this example shows via a logical 1 level, that none of the preceding basic elements has currently arbitrated the bus and therefore arbitration by this basic element is allowed. Output RDY_OUT (0605) shows, for example, to a downstream bus node that the basic element has enabled the bus access (if there is a bus request (RDY)) and ACTIVATE_OUT (0606) shows that the basic element is not currently performing any (more) enabling because no bus request (RDY) exists (any longer) and/or no previous arbiter stage has occupied the receiver bus (ACTIVE).

Figure 21B:
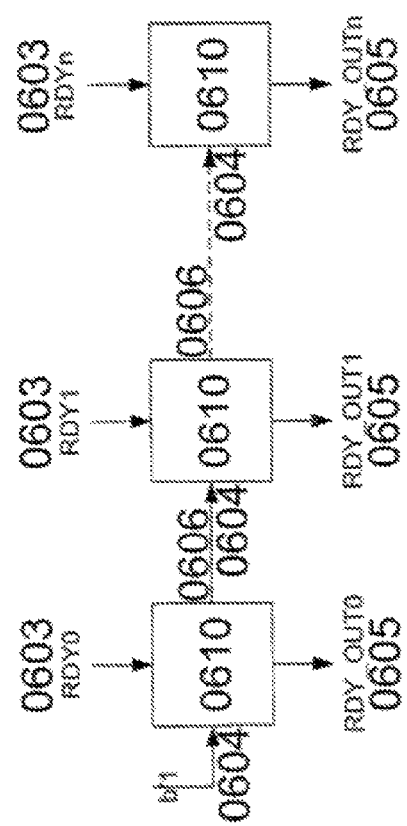

A serial prioritizing arbiter is obtained by the serial chaining of ACTIVATE and ACTIVATE_OUT via basic elements 0610, the first basic element according to FIG. 21B, whose ACTIVATE input is always activated, having the highest priority.

The above-described protocol ensures that within the same SNDCNT value each PAE only performs one data transmission, because a subsequent data transmission would have another SNDCNT value. This condition is required for proper operation of the serial arbiter, because this ensures the processing sequence of the enable requests (RDY) necessary for prioritization. In other words, an enable request (RDY) cannot appear later during an arbitration on the basic elements which already show, via ACTIVATE_OUT, that they enable no bus access.

Locality and Running Time

The example method is applicable, in principle, over long paths. Beyond a length depending on the system frequency, transmission of the data and execution of the protocol are no longer possible in a single cycle.

One approach is to design the data paths to be of exactly the same length and merge them at one point. This makes all control signals for the protocol local, which makes it possible to increase the system frequency. To balance the data paths, FIFO stages may be used, which operate as delay lines having configurable delays. They will be described in more detail below.

A very advantageous approach in which data paths may also be merged in a tree shape may be constructed as follows:

Modified Protocol, Time Stamp

The prerequisite is that a data path be divided into a plurality of branches and re-merged later. This is usually accomplished at branching points such as programmer-constructed "IF" or "CASE" nodes; FIG. 22A shows a CASE-like configuration as an example.

A REQCNT (0702) is assigned to the last PAE upstream from a branching (0701), at the latest; REQCNT assigns a value (time stamp), which is then to be always transmitted together with the data word, to each data word. REGCNT increments linearly with each data word, so that the position of a data word within a data stream is determinable via a unique value. The data words subsequently branch off into different data paths (0703, 0704, 0705). The associated value (time stamp) is transmitted via the data paths with each data word.

A multiplexer (0707) re-sorts the data words into the correct sequence upstream from the PAE(s) (0708) which further process the merged data path. For this purpose, a linearly counting SNDCNT (0706) is associated with the multiplexer.

The value (time stamp) assigned to each data word is compared to the value of SNDCNT. The multiplexer selects the matching data word. If no matching data word is found at a certain point in time, no selection is made. SNDCNT increments only if a matching data word has been selected.

To achieve maximum clock frequency, the data paths are merged locally to the highest possible degree. This minimizes the conductor lengths and keeps the associated run times short.

If necessary, the data path lengths are to be adjusted via register stages (pipelines) until it is possible to merge all data paths at a common point. Attention should be paid to making the lengths of the pipelines approximately the same to prevent excessive time shifts between the data words.

Use of the Time Stamp for Multiplexing

The output of a PAE (PAE-S) is connected to a plurality of PAEs (PAE-E). Only one of the PAEs should process the data in each cycle. Each PAE-E has a different hard-wired address, which is compared with the TimeStamp bus. The PAE-S selects the receiving PAE by outputting the address of the receiving PAE to the TimeStamp bus. In this way the PAE for which the data is intended is addressed.

Predictive Design and Task Switch

The problem of predictive design is known from conventional microprocessors. It occurs when the data processing depends on a result of the preceding data processing; however, processing of the dependent data is begun in advance—without the required results being available—for reasons of performance. If the result is different from what has been assumed, the data based on erroneous assumptions must be reprocessed (misprediction). This may also occur in VPUs in general.

By re-sorting and similar procedures this problem may be minimized; however, its occurrence may never be ruled out.

A similar problem occurs when the data processing is aborted, before it has been completed, due to a unit (such as the task scheduler of an operating system, real-time request, etc.) of a higher level than data processing within the PAs. In this case, the status of the pipeline must be saved so that the data processing resumes downstream from the point of the operands that resulted in the computation of the last finished result.

Two relevant states occur in a pipeline:
  RD At the beginning of a pipeline, the reception or request of new data is displayed;
  DONE At the end of a pipeline, the correct processing of data for which no misprediction occurred is displayed.

Furthermore, the MISS_PREDICT state may be used, which shows that a misprediction occurred. It may be helpful to generate this status by negating the DONE status at the appropriate point in time.

Special FIFOs

PACT04 and PACT13 describe methods in which data is kept in memories from which it is read for processing and in which results are stored. For this purpose, a plurality of independent memories may be used, which may operate in different operating modes; in particular, direct access, stack mode, or FIFO operating mode may be used.

Data is normally processed linearly in VPUs, so that the FIFO operating mode is often preferentially used. For example, a special extension of the memories should be considered for the FIFO operating mode, which directly supports prediction and enables reprocessing of mispredicted data in the event of misprediction. Furthermore, the FIFO supports task switches at any point in time.

We shall initially discuss the extended FIFO operating modes using the example of a memory providing read access (read side) within a given data processing run. The exemplary FIFO is illustrated in FIG. 23.

The configuration of the write circuit having a conventional write pointer (WR_PTR, 0801) which advances with each write access (0810) corresponds to the related art. The read circuit has the conventional counter (RD_PTR, 0802), for example, which counts each read word according to a read signal (0811) and modifies the read address of the memory (0803) accordingly. Novel, with respect to the related art, is an additional circuit (DONE_PTR, 0804), which does not document the data which has been read out, but the data which has been read out and correctly processed; in other words, only the data where no error has occurred and whose result was output at the end of the computation and a signal (0812) was displayed as a sign of the correct end of the computation. Possible circuits are described in the following.

The FULL flag (0805) (according to the related art), which shows that the FIFO is full and unable to store additional data, is now generated by a comparison (0806) of DONE_PTR with WR_PTR which ensures that data which may have to be reused due to a possible misprediction is not overwritten.

The EMPTY flag (0807) is generated, according to the conventional configuration, by comparison (0808) of RD_PTR with the WR_PTR. If a misprediction (MISS_PREDICT, 0809) occurred, the read pointer is loaded with the value DONE_PTR+1. Data processing is thus restarted at the value that triggered the misprediction.

Two possible exemplary configurations of DONE_PTR should be discussed in more detail.

a) Implementation by a Counter

DONE_PTR is implemented as a counter, which is set equal to RD_PTR when the circuit is reset or at the beginning of a data processing run. An incoming signal (DONE) indicates that the data has been processed successfully (i.e., without misprediction). DONE_PTR is then modified so that it points to the next data word being processed.

b) Implementation by a Subtractor

As long as the length of the data processing pipeline is always exactly known and it is assured that the length is constant (i.e., no branching into pipelines of different lengths occurs), a subtractor may be used. The length of the pipeline from when the memory is connected to the recognition of a possible misprediction is stored in an associated register. After a misprediction, data processing must therefore be reinitialized at the data word which may be computed via the difference.

On the write side, in order to save the result of the data processing of a configuration, an appropriately configured memory is required, the function of DONE_PTR being implemented for the write pointer to overwrite (mis)computed results during a new data processing run. In other words, the functions of the read/write pointer are reversed according to the addresses in brackets in the drawing.

If data processing is interrupted by another source (e.g., task switch of an operating system), it is sufficient to save DONE_PTR and to reinitialize the data processing at a later point in time at DONE_PTR+1.

FIFOs for Input/Output Stages, e.g., 0101, 0103

In order to balance data paths and/or states of different edges of a graph or different branches of a data processing run (trigger, see PACT08, PACT13), it is useful to use configurable FIFOs at the outputs or inputs of the PAEs. The FIFOs have adjustable latencies, so that the delay of different edges/branches, i.e., the run times of data over different but usually parallel data paths, are adjustable to one another.

As a pipeline may be held up within a VPU by pending data or a pending trigger, the FIFOs are also useful for compensating such delays. The FIFOs described in the following accomplish both functions:

A FIFO stage may be configured, for example, as follows (see FIG. 24): A multiplexer (0902) is connected downstream from a register (0901). The register stores the data (0903) and also its correct existence, i.e., the associated RDY (0904). Data is written into the register when the adjacent FIFO stage which is situated closer to the FIFO output (0920) indicates that it is full 0905) and a RDY (0904) exists for the data. The multiplexer relays the incoming data (0903) directly to the output (0906) until the data has been written into the register and thus the FIFO stage itself is full, which is indicated (0907) to the adjacent FIFO stage, which is situated closer to the input (0921) of the FIFO. Receipt of data in a FIFO stage is acknowledged with an input acknowledge (IACK, 0908). The output of data from a FIFO is acknowledged by an output acknowledge (OACK, 0909). OACK reaches all FIFO stages at the same time and causes the data to be shifted forward in the FIFO by one stage.

Individual FIFO stages may be cascaded to form FIFOs of any desired length (FIG. 24A). For this purpose, all IACK outputs are logically gated with one another, for example, by an OR function (0910).

The mode of operation is elucidated using the example of FIG. 25A, FIG. 25B.

Appending a Data Word

A new data word is passed on via the multiplexers of the individual FIFO stages to the registers. The first full FIFO stage (1001) signals to the upstream stage (1002), using the stored RDY, that it cannot receive data. The upstream stage (1002) has no RDY stored, but is aware of the "full" status of the downstream stage (1001). Therefore the stage stores the data and the RDY (1003) and acknowledges the storage by an ACK to the transmitter. The multiplexer (1004) of the FIFO stage switches over in such a way that, instead of the data path, it relays the contents of the register to the downstream stage.

Removing a Data Word

If an ACK (1011) is received by the last FIFO stage, the data of each upstream stage is transmitted to the particular downstream stage (1010). This is accomplished by applying a global write cycle to each stage. Because all multiplexers are already set according to the register contents, all data slips one line downward in the FIFO.

Removing and Simultaneously Appending a Data Word

If the global write cycle has been applied, no data word is stored in the first free stage. Because the multiplexer of this stage still forwards the data to the downstream stage, the first full stage (1012) stores the data. Its data is stored by the downstream stage in the same cycle as described above. In other words: new data to be written automatically slips into the now first free FIFO stage (1012), i.e., the previously last full FIFO stage, which has been emptied by the arrival of ACK.

Configurable Pipeline

For certain applications it may be advantageous to switch, using a switch (0930), individual multiplexers of the FIFO in the FIFO stage shown in FIG. 24 as an example in such a way that basically the corresponding register is switched on. A fixed settable latency or delay time is thus configurable via the switch for the data transmission.

Merging Data Streams

Three methods are available for merging data streams, each being best suited to particular applications:
a) local merge,
b) tree merge,
c) memory merge.

Local Merge

Local merge is the simplest variant, where all data streams are preferably merged at a single point or relatively locally and immediately split again if appropriate. A local SNDCNT selects, via a multiplexer, the exact data word whose time stamp corresponds to the value of SNDCNT and therefore is now expected. Two options are explained in more detail on the basis of FIGS. 22A and 22B.

a) A counter SNDCNT (0706) is incremented for each incoming data packet. A comparator which compares the particular count with the time stamp of the data path is connected downstream in each data path. If the values coincide, the current data packet is relayed to the downstream PAEs via the multiplexer.

b) The approach of a) is extended by assigning a target data path to the currently active data path, preferably via a translation procedure, for example, a CT configurable lookup table (0710), after the selection of this data path as the source data path. The source data path is determined by comparing (0712) the time stamp arriving with the data according to method a) with a SNDCNT (0711), the coinciding data path is addressed (0714) and selected via a multiplexer (0713). Using the lookup table (0710), for example, the address (0714) is assigned to a target data path address (0715), which selects the target path via a demultiplexer (0716). If the above-described structure is implemented in bus nodes as in FIG. 22B, the data link of the PAE (0718) associated with the bus node may also be established via the exemplary lookup table (0710), for example, via a gate function (transmission gates) (0717) to the input of the PAE.

Figure 22B:
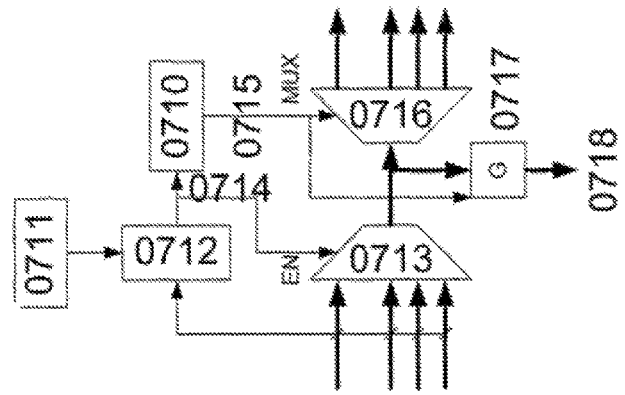
FIGS. 22A-C show examples of a local merge.
Figure 22A:
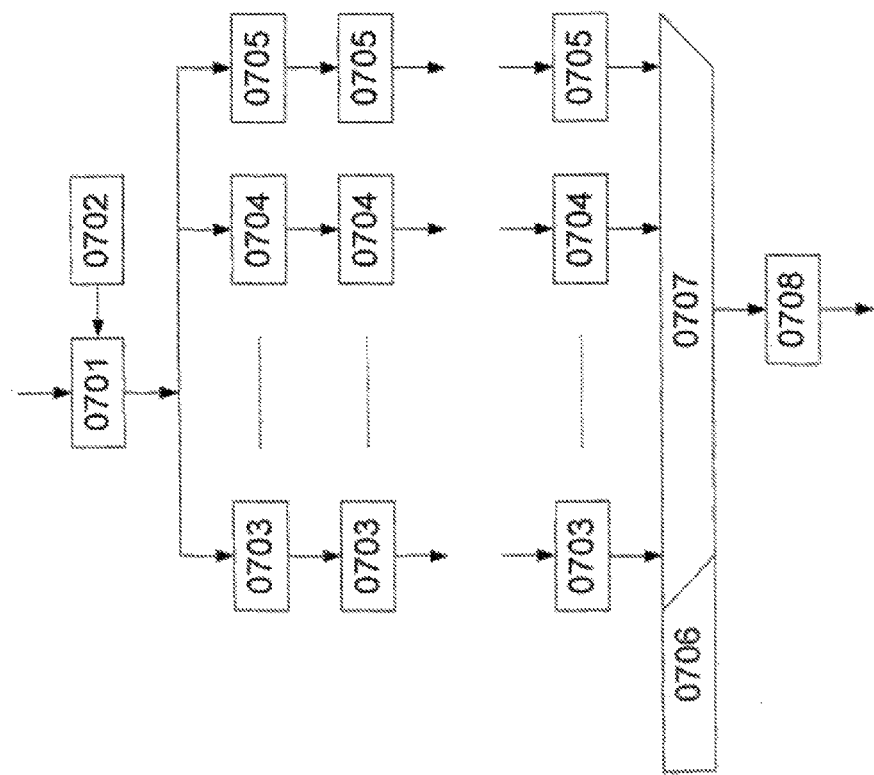
Figure 22C:
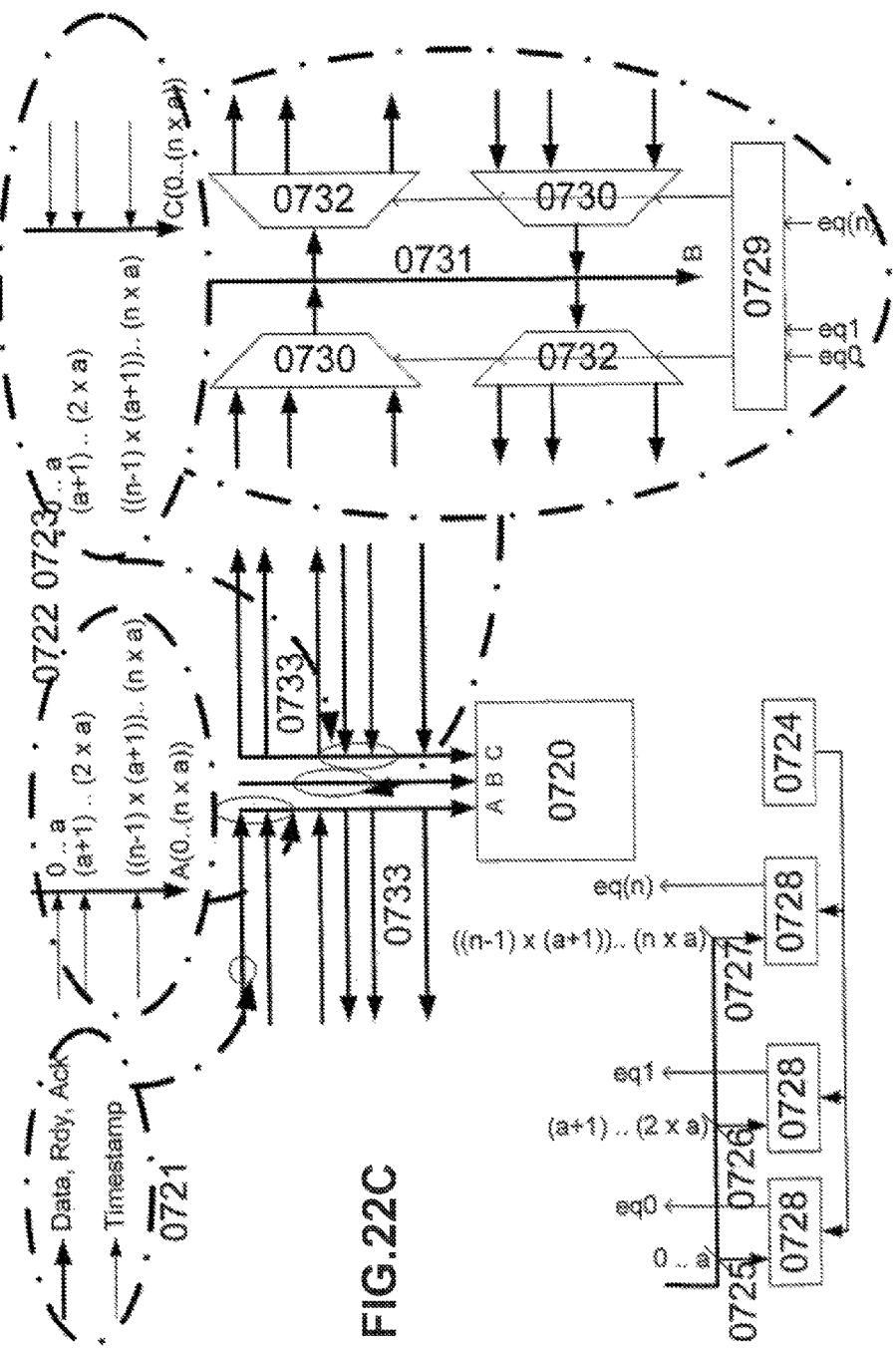

A particularly effective exemplary circuit is illustrated in FIG. 22C. A PAE (0720) has three data inputs (A, B, C) as in the XPU128ES, for example. The bus system (0733) connections to the data inputs, for example, may be configurable and/or multiplexable, and selectable for each clock cycle. Each bus system transmits data, handshakes, and the associated time stamp (0721). Inputs A and C of the PAE (0720) are used for relaying the time stamp of the data channels to the PAE (0722, 0723). The individual time stamps may be bundled by the SIMD bus system described in the following, for example. The bundled time stamps are unbundled again in the PAE and each time stamp (0725, 0726, 0727) is individually compared (0728) to an SNDCNT (0724) implemented/configured in the PAE. The results of the comparisons are used for activating the input multiplexers (0730) in such a way that the bus system is connected to a bus (0731) using the correct time stamp. The bus is preferably connected to input B to permit data to be relayed to the PAE according to 0717, 0718. The output demultiplexers (0732) for relaying the data to different bus Systems are also activated by the results, the results being preferably re-sorted by a flexible translation, for example, by a lookup table (0729), to enable the results to be freely assigned to selecting bus systems via demultiplexers (0732).

Tree Merge

In many applications it is desirable to merge parts of a data stream at a plurality of points, which results in a tree-like structure. The problem is that it is impossible to make a central decision on the selection of a data word, but the decision is distributed over multiple nodes. Therefore, the particular value of SNDCNT must be transferred to all nodes. However, in the case of high clock frequencies, this is only accomplishable with a latency, which occurs, for example, due to a plurality of register stages during the transmission. Therefore, this approach initially yields no reasonable performance.

A method for improving the performance is allowing local decisions to be made in each node, independently of the value of SNDCNT. A simple approach, for example, is to select the data word with the smallest time stamp at a node. This approach, however, becomes problematic if a data path delivers no data word to a node during a cycle. Then it may be impossible to decide which data path is to be preferred.

The following algorithm improves on this situation:
a) Each node receives a standalone SNDCNT counter $SNDCNT_K$.
b) Each node should have n input data paths ($P_0, \ldots P_n$).
c) Each node may have a plurality of output data paths, which are selected via a translation procedure, for example, a lookup table which is configurable by a higher-level configuration unit CT, depending on the input data path.
d) The root node has a main SNDCNT to which all $SNDCNT_K$ are synchronized if appropriate.

The following algorithm is used to select the correct data path:

I. If data appears on all input data paths $P_n$:
  a) select the data path $P_{(Ts)}$ having the smallest time stamp Ts.
  b) assign K:=Ts+1; SNDCNT>Ts+1, then $SNDCNT_K$:= SNDCNT.

II. If data does not appear on all input data paths Pn:
  a) select a data path only if the time stamp Ts==$SNDCNT_K$.
  b) $SNDCNT_K$:=SNDCNT+1.
  c) SNDCNT:=SNDCNT+1.

III. If no assignment takes place in a cycle, then:
  a) $SNDCNT_K$:=SNDCNT.

IV. The root node has the SNDCNT which is incremented for each selection of a valid data word and ensures the correct sequence of the data words at the root of the tree. All other nodes are synchronized to the value of SNDCNT if necessary (see 1-3). There is a latency which corresponds to the number of registers, which must be introduced for bridging the segment from SNDCNT to $SNDCNT_K$.

FIG. 26 shows a possible tree, which is constructed, for example, of PAEs in a manner similar to those of the XPU128ES VPU. A root node (1101) has an integrated SNDCNT, whose value is available at output H (1102). The data words at inputs A and C are selected according to the above-described procedure and the particular data word is supplied to output L in the correct sequence.

The PAEs of the next hierarchical level (1103) and on each additional higher hierarchical level (1104, 1105) work similarly, but with the following difference: The integrated $SNDCNT_K$ is local, and the particular value is not forwarded. $SNDCNT_K$ is synchronized with SNDCNT, whose value is applied to input B, according to the above-described procedure.

SNDCNT may be pipelined between all nodes, however, in particular between the individual hierarchical levels, for example, via registers.

Memory Merge

In this procedure, memories are used for merging data streams. A memory location is assigned to each value of the time stamp. The data is then stored in the memory according to the value of its time stamp; in other words, the time stamp is used as the address of the memory location for the assigned data. This creates a data space which is linear to the time stamp, i.e., is sorted according to the time stamp. The memory is not enabled for further processing, i.e., read out linearly, until the data space is complete, i.e., all the data is stored. This is easily determinable, for example, by counting how many pieces of data have been written into a memory. If as many pieces of data have been written as the memory has data entries, it is full.

The following problem arises during the execution of the basic principle: Before the memory is filled without any gap, a time stamp overrun may occur. An overrun is defined as follows: A time stamp is a number from a finite linear arithmetic space (TSR). The time stamp is specified strictly monotonously, whereby each specified time stamp is unique within the TSR arithmetic space. If the end of the arithmetic space is reached when a time stamp is specified, the specification is continued from the beginning of TSR; this results in a point of discontinuity. The time stamps specified now are no longer unique with respect to the preceding ones. It must always be ensured that these points of discontinuity are taken into account during processing. The arithmetic space (TSR) must therefore be selected to be sufficiently large for no ambiguity to be created in the most unfavorable case by two identical time stamps occurring within the data processing. In other words, the TSR must be sufficiently large for no identical time stamps to exist within the processing pipelines and/or memories in the most unfavorable case which may occur within the subsequent processing pipelines and/or memories.

If a time stamp overrun occurs, the memories must always be able to respond to such overrun. It must therefore be assumed that, after an overrun, the memories will contain both data having the time stamp before the overrun ("old data") and data having the time stamp after the overrun ("new data").

The new data cannot be written into the memory locations of the old data, since they have not yet been read out. Therefore several (at least two) independent memory blocks are provided, so that the old and new data may be written separately.

Any method may be used to manage the memory blocks. Two example options are discussed in more detail:
a) If it is always ensured that the old data of a given time stamp value is received before the new data of this time stamp value, it is tested whether the memory location for the old data is still free. If this is the case, old data is present, and the data is written to the memory location; if not, new data is being applied, and the data is written to the memory location for the new data.
b) If it is not ensured that the old data of a given time stamp value is received before the new data of this time stamp value, the time stamp may be provided with an identifier which differentiates the old time stamp from the new time stamp. This identifier may be one or more bits long. In the event of time stamp overrun, the identifier is linearly modified. In this way, old and new data is provided with unique time stamps. The data is assigned to one of the multiple data blocks according to the identifier.

Identifiers whose maximum numerical value is considerably less than the maximum numerical value of the time stamps are preferably used. A preferred ratio may be given by the following formula:

$$\text{identifier}_{max} < \text{time stamp}_{max}/2.$$

Use of Memories for Partitioning Wide Graphs

As described in from PACT13, large algorithms should be partitioned, i.e., divided into a plurality of partial algorithms so that they fit a given arrangement and number of PAEs of a VPU. The partitioning should be performed both efficiently with respect to performance and naturally, while preserving the correctness of the algorithm. One aspect is the management of data and states (triggers) of the particular data paths. In the following, methods are presented for improved and simplified management.

In many cases it is not possible to section a data flow graph at one edge only (see FIG. 27A for example), because the graph is too wide, for example, or there are too many edges (1201, 1202, 1203) at the section point (1204).

Figure 27B:
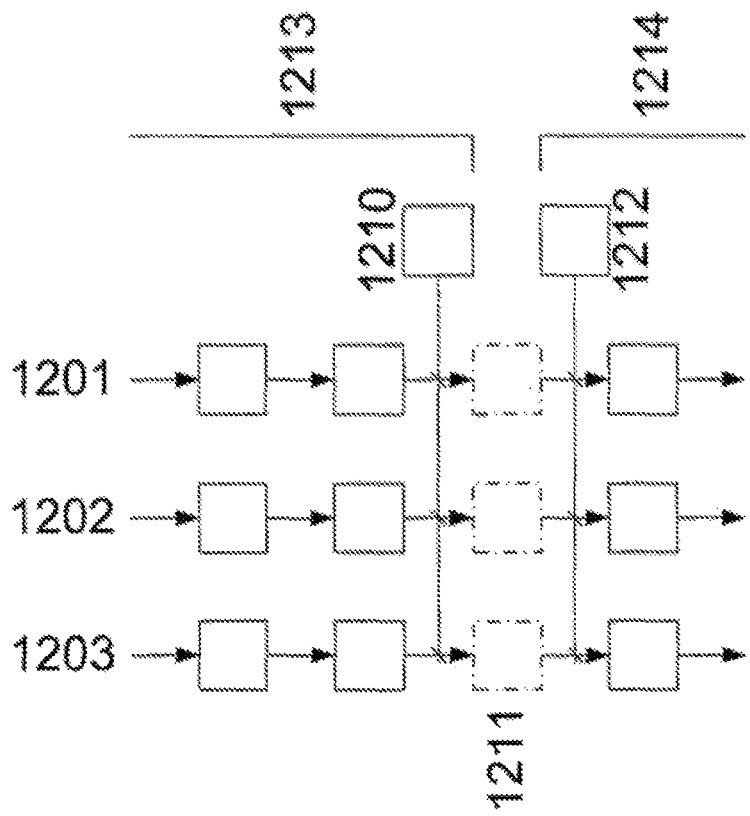
FIGS. 27A and 27B show a wide graph and partitioning a wide graph.
Figure 27A:
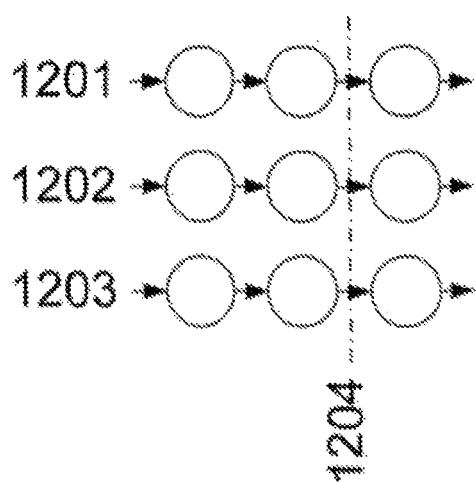

Partitioning may be performed according to an example embodiment of the present invention by sectioning along all edges according to FIG. 27B. The data of each edge of a first configuration (1213) is written into a separate memory (1211).

It should be pointed out that, together with (or possibly also separately from) the data, all relevant status information of the data processing also runs over the edges (for example, in FIG. 27B) and may be written into the memories. The status information is represented in VPU technology by triggers (see, e.g., PACT08), for example.

After reconfiguration, the data and/or status information of a subsequent configuration (1214) is read out from the memories and processed further by this configuration.

The memories work as data receivers of the first configuration (i.e., in a mainly write mode) and as data transmitters of the subsequent configuration (i.e., in a mainly read mode). The memories (1211) themselves are a part/resource of both configurations.

To correctly process the data further, it is necessary to know the correct chronological sequence in which the data was written into the memories.

Basically this may be ensured by
a) sorting the data streams when writing into a memory, and/or
b) sorting the data streams when reading out from a memory, and/or
c) saving the sorting sequence with the data and making it available to the subsequent data processing.

For this purpose, control units which are responsible for managing the data sequences and data relationships both when writing the data (1210) into the memories (1211) and when reading out the data from the memories (1212) are assigned to the memories. Depending on the configuration, different management modes and corresponding control mechanisms may be used.

Figure 28A:
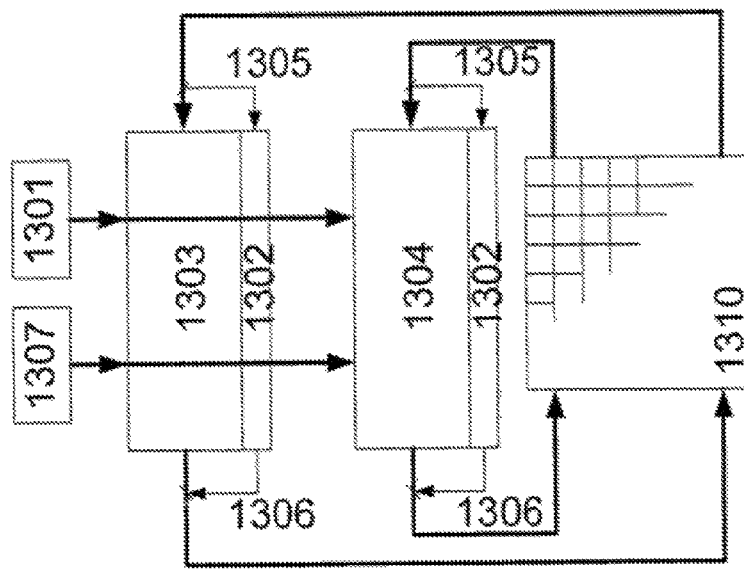
FIGS. 28A and 28B show further details of partitioning.
Figure 28B:
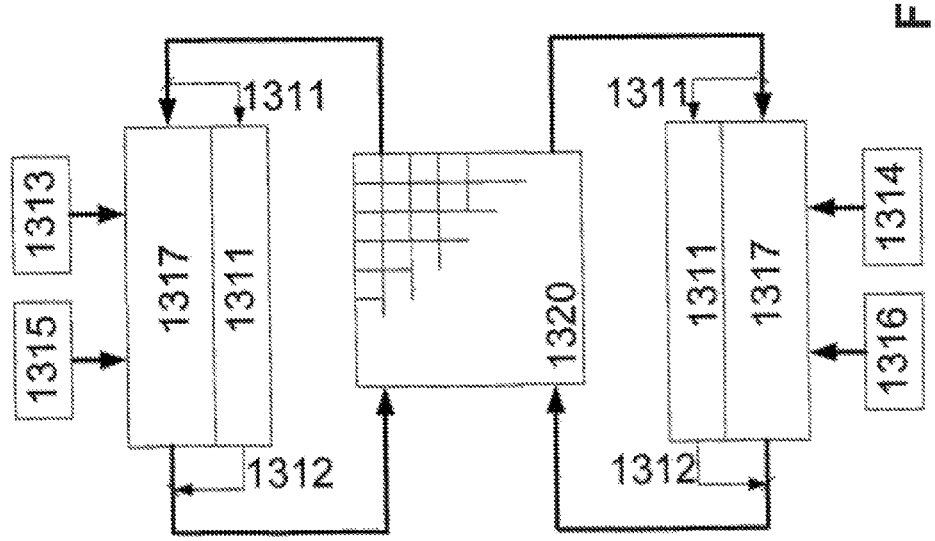

Two possible corresponding methods should be elucidated in more detail with reference to FIGS. 28A and B. The memories are assigned to an array (1310, 1320) of PAEs, in a manner similar to the data processing method described in PACT04.

a) In FIG. 28A, the memories generate their addresses synchronously, for example, by common address generators, which are independent but synchronized. In other words, the write address (1301) is incremented in each cycle regardless of whether a memory actually has valid data to be stored. Thus, a plurality of memories (1303, 1304) have the same time base, i.e., write/read address. An additional flag (VOID, 1302) for each data memory position in the memory indicates whether valid data has been written into a memory address. The VOID flag may be generated by the RDY flag (1305) assigned to the data; accordingly, when reading out a memory, the data RDY flag (1306) is generated from the VOID flag. For reading out the data by the subsequent configuration, a common read address (1307), which is advanced in each cycle, is generated similarly to the writing of the data.

b) In the example of FIG. 28B it is more efficient to assign a time stamp to each data word according to the previously described method. The data (1317) is stored with the particular time stamp (1311) in the particular memory position. Thus, no gaps are formed in the memories, which are more efficiently utilized Each memory has independent write pointers (1313, 1314) for the data-writing configuration and read pointers (1315, 1316) for the subsequent data-reading configuration. According to a conventional method (e.g., according to FIG. 22A or FIG. 26), the chronologically correct data word is selected when reading on the basis of the associated time stamp stored (1312) with it.

The data may also be sorted into the memories/from the memories according to different algorithmically suitable methods such as
 a) by assigning a memory location using the time stamp;
 b) by sorting into the data stream according to the time stamp;
 c) by storing in each cycle together with a VALID flag;
 d) by storing the time stamp and forwarding it to the subsequent algorithm when reading out the memory.

Depending on the application, a plurality of (or all) data paths may also be merged upstream from the memories via the merge method according to the present invention. Whether this is done generally depends on the available resources. If too few memories are available, merging upstream from the memories is necessary or desirable. If too few PAEs are available, preferably no additional PAEs are used for a merge.

Extension of the Peripheral Interface (IO) Using Time Stamp

In the following, a method of assigning time stamps to IO channels for peripheral modules and/or external memories is described. The method may serve different purposes such as to allow proper sorting of data streams between transmitter and receiver and/or selecting unique data stream sources and/or targets.

The following discussion will be illustrated using the example of the interface cells from PACT03. PACT03 describes a method of bundling buses internal to the VPU and of data exchange between different VPUs or VPUs and peripherals (IO).

One disadvantage of this method is that the data source is no longer identifiable by the receiver, nor is the correct chronological sequence ensured.

The following novel methods eliminate this problem; some or more of the methods described may be used and possibly combined according to the specific application.

a) Identification of the Data Source

Figure 29:
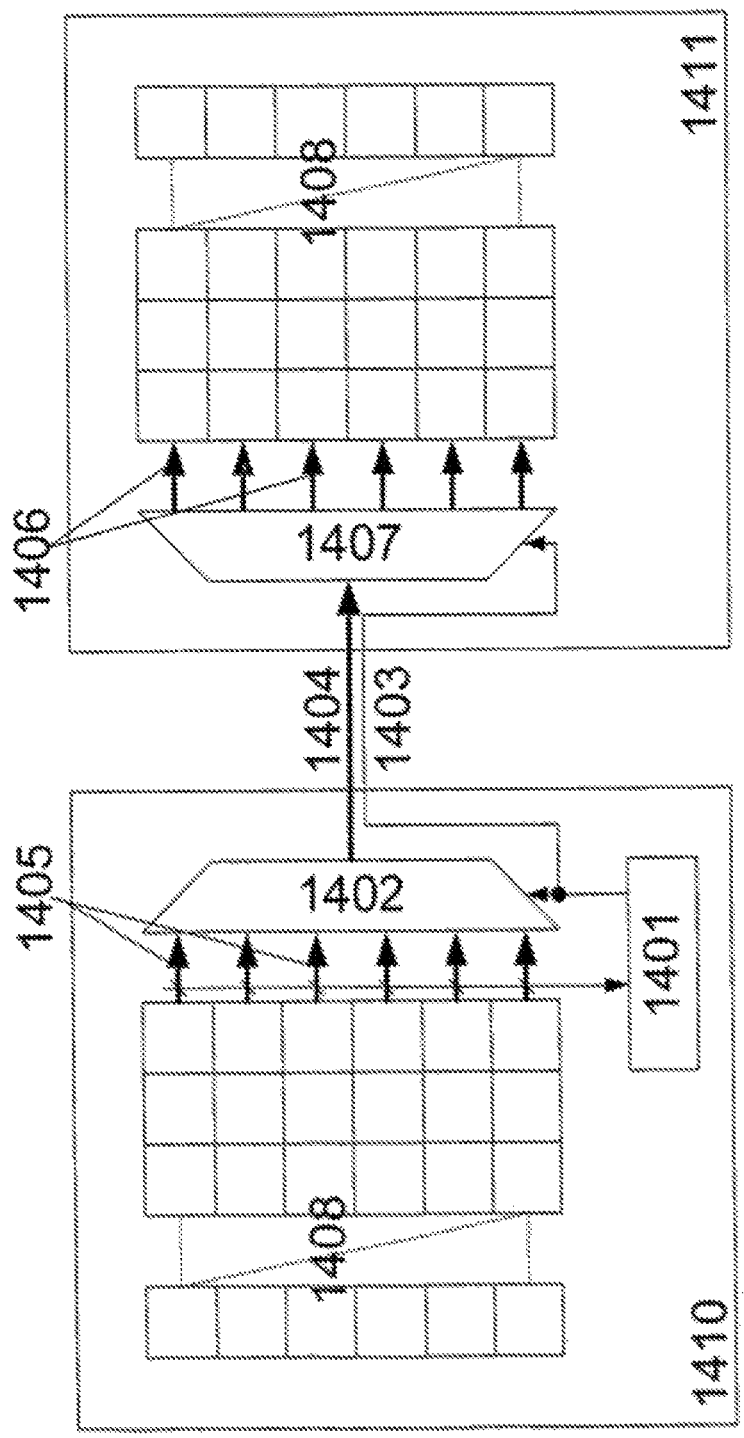
FIG. 29 shows an example of an identification between arrays made up of reconfigurable elements (PAEs) of two VPUs.

FIG. 29 as an example describes such an identification between arrays (PAs, 1408) made up of reconfigurable elements (PAEs) of two VPUs (1410, 1420). An arbiter (1401) selects on a data transmission module (VPU, 1410) one of the possible data sources (1405) to connect it to the IO via a multiplexer (1402). The address of the data source (1403), together with the data (1404), is sent to the IO. The data-receiving module (VPU, 1411) selects, according to the address (1403) of the data source, the particular receiver (1406) via a demultiplexer (1407). The address transmitted (1403) may be assigned to the receiver (1406) in a flexible manner via a translation procedure, for example, a lookup table which is configurable by a higher-level configuration unit (CT), for example.

It should be expressly pointed out that interface modules connected upstream from the multiplexers (1402) and/or downstream from the demultiplexers (1407) according to PACT03 and/or PACT15 may be used for the configurable connection of bus systems.

b) Compliance with the chronological sequence b1) The simplest procedure is to send the time stamp to the and to leave the evaluation to the receiver which receives the time stamp.

b2) In another version, the time stamp is decoded by the arbiter which selects only the transmitter having the correct time stamp and sends to the IO. The receiver receives the data in the correct sequence.

Methods a) and b) are usable together or separately depending on the requirements of the particular application.

Furthermore, the method may be extended by specifying and identifying channel numbers. A channel number identifies a given transmitter area. For example, a channel number may be composed of a plurality of IDs, such as that of the bus within a module, the module, and/or the module group. This also makes identification easy, even in applications with a large number of PAEs and/or a combination of several modules.

In using channel numbers, instead of transmitting individual data words, a plurality of data words are preferably combined into a data packet and then transmitted with the specification of the channel number. The individual data words may be combined via a suitable memory such as described in PACT18 (BURST-FIFO), for example.

It should be pointed out that the addresses and/or time stamps which have been transmitted may preferably be used as identifiers or parts of identifiers in bus systems according to PACT15.

The method according to PACT07 is included in its entirety in the present patent, which may also be extended by the above-described identification method. Furthermore, the data transmission methods according to PACT18, for which the above-described method may also be applied, are included in their entirety.

Sequencer Structure

The use of time stamps or comparable methods makes a simpler structure of sequencers made up of PAE groups possible. The buses and basic functions of the circuit are configured, and the detail function and data addresses are flexibly set via an OpCode at run time.

A plurality of these sequencers may also be constructed and operated within a PA (PAE arrays).

The sequencers within a VPU may be constructed according to the algorithm. Examples have been given in multiple documents of the inventor which are incorporated in the present invention in their entirety. In particular, reference should be made to PACT13, where the construction of sequencers from a plurality of PAEs is described, which is to be also used as an exemplary basis for the description that follows.

In detail, the following configurations of sequencers may be freely adapted, for example:
 type and number of IO/memories
 type and number of interrupts (e.g., via triggers)
 instruction set
 number and type of registers.

A simple sequencer may be constructed from, for example,
 1. an ALU for performing the arithmetic and logical functions;

2. a memory for storing data, similar to a register set;
3. a memory as a code source for the program (e.g., normal memory according to PACT22/24/28And/or CT according to PACT10/PACT28And/or special sequencers according to PACT04).

If appropriate, the sequencer is extended by IO elements (PACT03, PACT22/24). In addition, additional PAEs may be added as data sources or data receivers.

Depending on the code source used, the method described in PACT08 may be used, which allows OpCodes of a PAE to be directly set via data buses, as well as data sources/targets to be specified.

The addresses of the data sources/targets may be transmitted by time stamp methods, for example. Furthermore, the bus may be used for transmitting the OpCodes.

Figure 30:
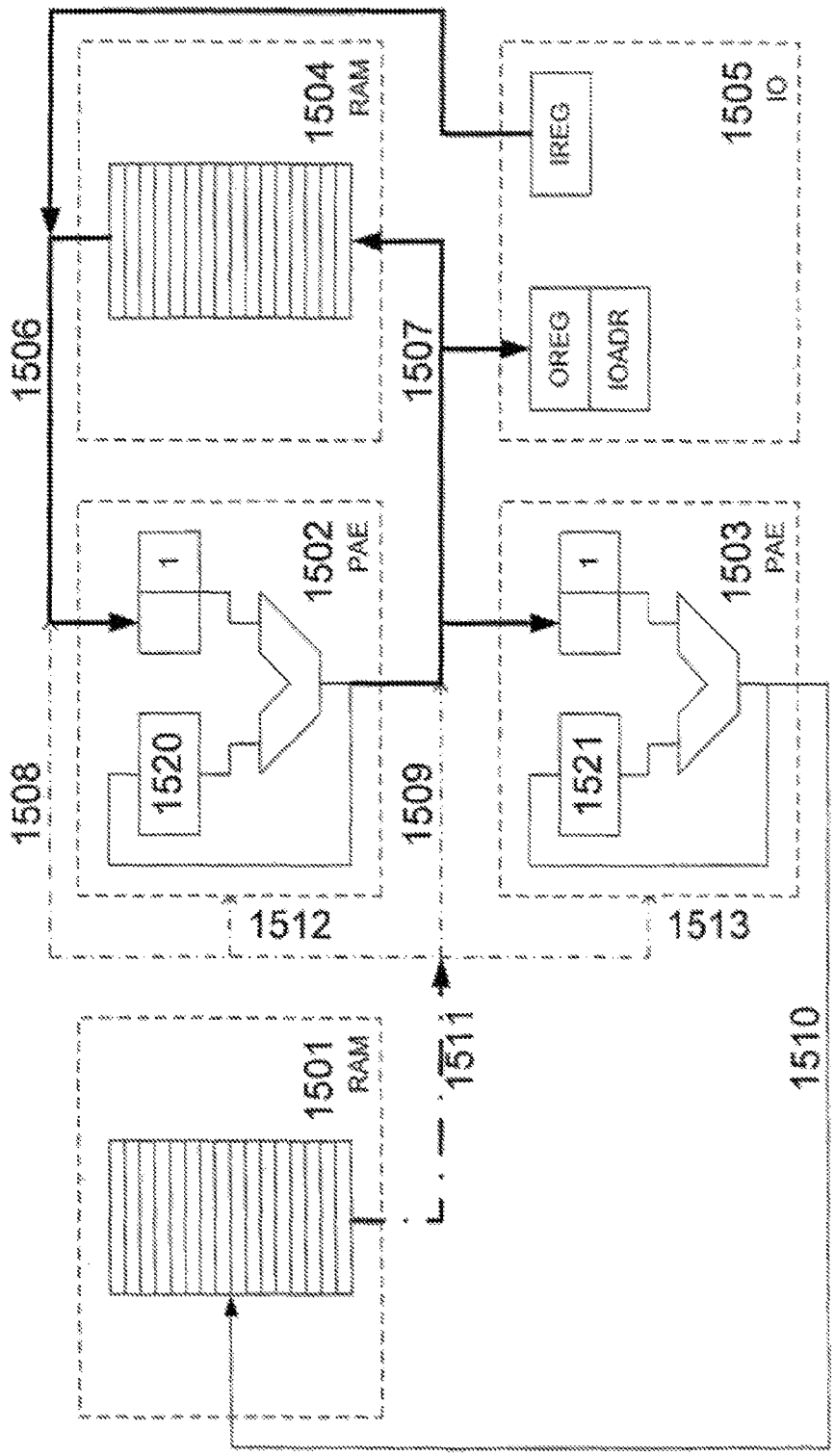
FIG. 30 shows an example sequencer.

In an exemplary implementation according to FIG. 30, a sequencer has a RAM for storing the program (1501), a PAE for computing the data (ALU) (1502), a PAE for computing the program pointer (1503), a memory as a register set (1504), and an IO for external devices (1505).

The interconnection creates two bus systems: an input bus to ALU IBUS (1506) and an output bus from ALU OBUS (1507). A four-bit wide time stamp is assigned to each bus, which addresses the source IBUS-ADR (1508) and the target OBUS-ADR (1509), respectively.

The program pointer (1510) is transmitted from 1504 to 1501. 1501 returns the OpCode (1511). The OpCode is split into instructions for the ALU (1512) and the program pointer (1513), as well as the data addresses (1508, 1509). The SIMD procedures and bus systems described in the following may be used for splitting the bus.

1502 is configured as an accumulator machine and supports the following functions, for example;

| | |
|---|---|
| ld <reg> | load accumulator (1520) from register |
| add_sub <reg> | add/subtract register to/from accumulator |
| sl_sr | shift accumulator |
| rl_rr | rotate accumulator |
| st <reg> | write accumulator into register |

Three bits are needed for the instructions. A fourth bit specifies the type of operation: adding or subtracting, shifting right or left.

1502 delivers the ALU status carry to trigger port 0 and 0 to trigger port 1.
<reg> is coded as follows:

| | |
|---|---|
| 0-7 | data register in 1504 |
| 8 | input register (1521) program pointer computation |
| 9 | IO data |
| 10 | IO addresses |

Four bits are used for the addresses.
1503 supports the following operations via the program pointer:

| | |
|---|---|
| jmp | jump to address in input register (2321) |
| jt0 | jump to address in input register given when trigger0 set |
| jt1 | jump to address in input register given when trigger1 set |
| jt2 | jump to address in input register given when trigger2 set |
| jmpr | jump to PP plus address in input register |

Three bits are used for the instructions. A fourth bit specifies the type of operation: adding or subtracting.

OpCode 1511 is also split into three groups having four bits each: (1508, 1509), 1512, 1513. 1508 and 1509 may be identical for the given instruction set. 1512, 1528 Are sent to the C register of the PAEs (see PACT22/24), for example, and decoded as instruction within the PAEs (see PACT08).

According to PACT28And/or PACT11, the sequencer may be built into a more complex structure. For example, additional data sources, which may originate from other PAEs, are addressable via <reg>=11, 12, 13, 14, 15. Additional data receivers may also be addressed. Data sources and data receivers may have any structure, in particular PAEs.

It should be noted that the circuit illustrated needs only 27 Bits of OpCode 1511. Thus, for a 32-bit architecture, 20 bits are optionally available for extending the basic circuit.

The multiplexer functions of the buses may be implemented according to the above-described time stamp method. Other designs are also possible; for example, PAEs may be used as multiplexer stages.

SIMD Arithmetic Units and SIMD Bus Systems

When using reconfigurable technologies for executing algorithms, an important paradox occurs: On the one hand, complex ALUs are needed to obtain maximum computing performance, while the complexity should be minimum for the reconfiguration; on the other hand, the ALUs should be as simple as possible to facilitate efficient bit level processing; also, the reconfiguration and data management should be accomplished intelligently and quickly in such a way that it is programmed in an efficient and simple manner.

Previous technologies use a) very small ALUs having little reconfiguration support (FPGAs) and are efficient on the bit level; b) large ALUs (Chameleon) having little reconfiguration support, c) a mixture of large ALUs and small ALUs having reconfiguration support and data management (VPUs).

Since the VPU technology represents the most powerful technique, an optimum method should be built on this technology. It should be expressly pointed out that this method may also be used for the other architectures.

The surface needed for effective control of reconfiguration is relatively high with approx. 10,000 to 40,000 gates per PAE. If fewer gates are used, only simple sequence control may be possible, which considerably limits the programmability of VPUs and may rule out their use as general purpose processors. Since the object is to achieve a particularly rapid reconfiguration, additional memories must be provided, which again considerably increases the number of required gates.

Therefore, to obtain a reasonable compromise between reconfiguration complexity and computing performance, large ALUs (extensive functionality and/or large bit width) should be used. However, using excessively large ALUs decreases the usable parallel computing performance per chip. For excessively small ALUs (e.g., 4 bits), the complexity for configuring complex functions (e.g., 32-bit multiplication) is excessively high. In particular, the wiring complexity grows into ranges that may no longer be commercially feasible.

11.1 Use of SIMD Arithmetic Units

To reach an ideal compromise between processing of small bit widths, wiring complexity, and the configuration of complex functions, the use of SIMD arithmetic units is proposed. Arithmetic units having bit width m are split so that n individual blocks having bit width b=m/n are obtained. For each arithmetic unit it is specified via configuration whether an arithmetic unit is to operate without being split or whether it should be split into one or more blocks of the same or different bit widths. In other words, an arithmetic unit may also be split in such a way that different word widths are configured simultaneously within an arithmetic unit (e.g., 32-bit width split into 1×16, 1×8, and 2×4 bits). The data is transmitted between the PAEs in such a way that the split data words (SIMD-WORD) are combined to data words having bit width m and transmitted over the network as a packet.

The network always transmits a complete packet, i.e., all data words are valid within a packet and are transmitted according to the conventional handshake method.

11.1.1 Re-Sorting the SIMD-WORD

For efficient use of SIMD arithmetic units, a flexible and efficient re-sorting of the SIMD-WORD within a bus or between different buses may be required.

The bus switch according to FIGS. 5, 22B, c may be modified so that the individual SIMD-WORDs are interconnected in a flexible manner. For this purpose, the multiplexers are designed to be splittable according to the arithmetic units in such a way that the split may be defined by the configuration. In other words, instead of using one multiplexer having a width m bits per bus, for example, n individual multiplexers having a width b=m/n bits are used. It is thus possible to configure the data buses for a data width of b bits. The matrix structure of the buses (FIG. 20) permits the data to be re-sorted in a simple manner, as shown in FIG. 31C. A first PAE sends data via two buses (1601, 1602), which are each divided into four partial buses. A bus system (1603) connects the individual partial buses to additional partial buses located on the bus. A second PAE contains partial buses sorted differently on its two input buses (1604, 1605).

The handshakes of the buses between two PAEs having two arithmetic units (1614, 1615), for example, are logically gated in FIG. 31A so that a common handshake (1610) is generated for the re-sorted bus (1611) from the handshakes of the original buses. For example, a RDY may be generated for a re-sorted bus from a logical AND gating of all RDYs of the data for buses delivering to this bus. The ACK of a bus which delivers data may also be generated from an AND gating of the ACKs of all buses which process the data further.

The common handshake controls a control unit (1613) for managing the PAEs (1612). Bus 1611 is split into two arithmetic units (1614, 1615) within the PAE.

In a first embodiment variant, the handshakes are gated within each individual bus node. This permits a bus system having width m, containing n partial buses having width b, to be assigned a single handshake protocol.

In a further, particularly preferred embodiment, all bus systems are designed to have width b, which corresponds to the smallest implementable input/output data width b of a SIMD word. Corresponding to the width of the PAE data paths (m), an input/output bus is now composed of m/b=n partial buses of width b. For example, in the case of a smallest SIMD word width of 8 bits, a PAE having three 32-bit input buses and two 32-bit output buses actually has 3×4 eight-bit input buses and 2×4 eight-bit output buses.

All handshake and control signals are assigned to each of the partial buses.

The output of a PAE transmits them, using the same control signals, to all n partial buses. Incoming acknowledge signals of all partial buses are gated logically, for example, using an AND function. The bus systems are able to freely connect and independently route each partial bus. The bus system and, in particular, the bus nodes, do not process or gate the handshake signals of the individual buses independently of their routing, arrangement, and sorting. For data received by a PAE, the control signals of all n partial buses are gated in such a way that a control signal of overall validity, similar to a bus control signal, is generated for the data path.

For example, in a "dependent" operating mode according to the definition, RdyHold stages may be used for each individual data path, and the data is not received by the PAE until all RdyHold stages signal the presence of data.

In an "independent" operating mode according to the definition, the data of each partial bus is written individually into the input register of the PAE and acknowledged, which immediately frees the partial bus for a subsequent data transmission. The presence of all required data from all partial buses in the input registers is detected within the PAE by the appropriate logical gating of the RDY signals stored for each partial bus in the input register, whereupon the PAE starts the data processing.

One important advantage of this method may be that the SIMD property of PAEs has no specific influence on the bus system used. Only more buses (n) (1620) of a smaller width (b) and the associated handshakes (1621) are needed, as illustrated in FIG. 31B. The interconnection itself remains unaffected. The PAEs link and manage the control lines locally. This makes additional hardware unnecessary in the bus systems for managing and/or linking the control lines.

The invention claimed is:

1. A method, comprising:
providing a plurality of data processors,
providing a plurality of applications each identified by an APID,
associating respective one or more of said plurality of data processors with said one or more of said plurality of applications;
providing a memory, wherein said memory is composed of a plurality of separately addressable pages and further wherein said APID is used to address individual pages; and
communicating data to and from said memory and said plurality of data processors according to said APID.

2. The method according to claim 1 wherein the higher order bits of an address addresses different memories.

3. The method according to claim 1 wherein said plurality of applications are processed in parallel.

4. The method according to claim 1 where the memory is located on the same physical chip as the plurality of data processors.

5. The method according to claim 4, wherein the memory comprises a plurality of separately addressable memories.

6. The method according to claim 1 where an APID comprises an address.

7. The method according to claim 1 where an APID comprises higher order bits of an address.

8. The method of claim 1 wherein the method of communicating data from the one or more processors associated with an application to a memory comprises communicating data, a data address and the APID.

9. The method of claim 8 where the APID comprises an address.

10. A method, comprising:
providing a plurality of data processors,
providing a plurality of applications each identified by an APID,
associating respective one or more of said plurality of data processors with said one or more of said plurality of applications;
providing a memory, wherein said memory comprises a plurality of different memories and said APID is used to address individual memories; and
communicating data to and from said memory and said plurality of data processors according to said APID.

* * * * *